United States Patent
Chihara et al.

(10) Patent No.: US 8,423,916 B2
(45) Date of Patent: Apr. 16, 2013

(54) INFORMATION PROCESSING APPARATUS, PROCESSING METHOD THEREOF, AND COMPUTER-READABLE STORAGE MEDIUM

(75) Inventors: Yusuke Chihara, Funabashi (JP); Hiroki Urashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 12/614,135

(22) Filed: Nov. 6, 2009

(65) Prior Publication Data

US 2010/0125787 A1 May 20, 2010

(30) Foreign Application Priority Data

Nov. 20, 2008 (JP) .................................. 2008-297094
Nov. 20, 2008 (JP) .................................. 2008-297096

(51) Int. Cl.
*G06F 3/033* (2006.01)
*G06F 3/03* (2006.01)

(52) U.S. Cl.
USPC ........... 715/863; 345/156; 345/157; 345/173; 715/701; 715/702; 715/764; 715/810; 715/864

(58) Field of Classification Search .......... 345/156–157, 345/173–179; 715/230, 702, 860, 863, 838
See application file for complete search history.

(56) References Cited

U.S. PATENT DOCUMENTS

| | | | | |
|---|---|---|---|---|
| 4,725,829 A | * | 2/1988 | Murphy | 715/860 |
| 5,053,760 A | * | 10/1991 | Frasier et al. | 345/473 |
| 5,252,951 A | * | 10/1993 | Tannenbaum et al. | 345/156 |
| 5,465,325 A | * | 11/1995 | Capps et al. | 345/441 |
| 5,471,578 A | * | 11/1995 | Moran et al. | 715/863 |
| 5,485,565 A | * | 1/1996 | Saund et al. | 345/442 |
| 5,500,935 A | * | 3/1996 | Moran et al. | 715/863 |
| 5,509,114 A | * | 4/1996 | Moran et al. | 345/443 |
| 5,523,775 A | * | 6/1996 | Capps | 345/179 |
| 5,596,699 A | * | 1/1997 | Driskell | 715/834 |
| 5,615,384 A | * | 3/1997 | Allard et al. | 715/800 |
| 5,689,667 A | * | 11/1997 | Kurtenbach | 715/810 |
| 5,714,977 A | * | 2/1998 | Mc Neil | 345/157 |
| 5,745,116 A | * | 4/1998 | Pisutha-Arnond | 715/863 |
| 5,764,222 A | * | 6/1998 | Shieh | 345/173 |
| 5,781,662 A | * | 7/1998 | Mori et al. | 382/189 |

(Continued)

FOREIGN PATENT DOCUMENTS

| | | |
|---|---|---|
| JP | 60-075980 | 4/1985 |
| JP | 2003-319244 | 11/2003 |
| JP | 2006-122407 | 5/2006 |
| JP | 2006-230483 | 9/2006 |

*Primary Examiner* — Steven B Theriault

(74) *Attorney, Agent, or Firm* — Cowan, Liebowitz & Latman, P.C.

(57) ABSTRACT

An information processing apparatus inputs a coordinate value of a position designated on a screen which displays one or a plurality of objects, compares an input locus expressed by the input coordinate value string with a second locus, which is defined in advance as a locus used to give the instruction to execute a process for an object, and determines whether the input locus is a first locus or the second locus. When it is determined that the input locus is the first locus, the apparatus selects an object from the one or plurality of objects based on the display positions of the input locus and the object on the screen. When it is determined that the input locus is the second locus, the apparatus executes a process designated by the input locus with respect to the selected object.

14 Claims, 47 Drawing Sheets

U.S. PATENT DOCUMENTS

| | | | | |
|---|---|---|---|---|
| 5,781,663 | A * | 7/1998 | Sakaguchi et al. | 382/189 |
| 5,798,769 | A * | 8/1998 | Chiu et al. | 345/442 |
| 5,825,352 | A * | 10/1998 | Bisset et al. | 345/173 |
| 5,847,708 | A * | 12/1998 | Wolff | 715/764 |
| 5,861,886 | A * | 1/1999 | Moran et al. | 715/863 |
| 5,872,559 | A * | 2/1999 | Shieh | 345/157 |
| 5,880,743 | A * | 3/1999 | Moran et al. | 345/473 |
| 5,966,122 | A * | 10/1999 | Itoh | 715/838 |
| 6,006,227 | A * | 12/1999 | Freeman et al. | 707/695 |
| 6,072,490 | A * | 6/2000 | Bates et al. | 715/821 |
| 6,097,387 | A * | 8/2000 | Sciammarella et al. | 715/784 |
| 6,249,316 | B1 * | 6/2001 | Anderson | 348/333.05 |
| 6,253,218 | B1 * | 6/2001 | Aoki et al. | 715/201 |
| 6,317,141 | B1 * | 11/2001 | Pavley et al. | 715/732 |
| 6,320,601 | B1 * | 11/2001 | Takasu et al. | 715/764 |
| 6,453,078 | B2 * | 9/2002 | Bubie et al. | 382/305 |
| 6,459,442 | B1 * | 10/2002 | Edwards et al. | 715/863 |
| 6,476,834 | B1 * | 11/2002 | Doval et al. | 715/863 |
| 6,501,489 | B1 * | 12/2002 | Kobayashi | 715/833 |
| 6,563,913 | B1 * | 5/2003 | Kaghazian | 379/93.24 |
| 6,590,568 | B1 * | 7/2003 | Astala et al. | 345/173 |
| 6,629,104 | B1 * | 9/2003 | Parulski et al. | 382/307 |
| 6,744,529 | B2 * | 6/2004 | Winter et al. | 358/1.15 |
| 6,798,412 | B2 * | 9/2004 | Cowperthwaite | 345/428 |
| 6,833,848 | B1 * | 12/2004 | Wolff et al. | 715/719 |
| 6,883,145 | B2 * | 4/2005 | Jaeger | 715/767 |
| 6,938,220 | B1 * | 8/2005 | Shigematsu et al. | 715/863 |
| 6,938,222 | B2 * | 8/2005 | Hullender et al. | 715/863 |
| 6,948,123 | B2 * | 9/2005 | Endou et al. | 715/700 |
| 6,956,562 | B1 * | 10/2005 | O'Hara et al. | 345/173 |
| 6,993,157 | B1 * | 1/2006 | Oue et al. | 382/103 |
| 7,000,197 | B1 * | 2/2006 | Bou et al. | 715/812 |
| 7,017,124 | B2 * | 3/2006 | Jaeger | 715/863 |
| 7,047,503 | B1 * | 5/2006 | Parrish et al. | 715/863 |
| 7,055,110 | B2 * | 5/2006 | Kupka | 715/823 |
| 7,089,507 | B2 * | 8/2006 | Lection et al. | 715/855 |
| 7,093,202 | B2 * | 8/2006 | Saund et al. | 715/863 |
| 7,098,896 | B2 * | 8/2006 | Kushler et al. | 345/168 |
| 7,148,909 | B2 * | 12/2006 | Yui et al. | 345/660 |
| 7,158,675 | B2 * | 1/2007 | Gounares et al. | 382/187 |
| 7,184,592 | B2 * | 2/2007 | Iga et al. | 382/188 |
| 7,240,300 | B2 * | 7/2007 | Jaeger | 715/863 |
| 7,327,347 | B2 * | 2/2008 | Hilbert et al. | 345/156 |
| 7,340,678 | B2 * | 3/2008 | Chiu et al. | 715/734 |
| 7,342,586 | B2 * | 3/2008 | Jaeger | 345/473 |
| 7,366,995 | B2 * | 4/2008 | Montague | 715/798 |
| 7,370,065 | B1 * | 5/2008 | Rys | 1/1 |
| 7,383,503 | B2 * | 6/2008 | Banks | 715/273 |
| 7,411,575 | B2 * | 8/2008 | Hill et al. | 345/156 |
| 7,417,680 | B2 * | 8/2008 | Aoki et al. | 348/333.05 |
| 7,454,717 | B2 * | 11/2008 | Hinckley et al. | 715/863 |
| 7,458,038 | B2 * | 11/2008 | Rimas-Ribikauskas et al. | 715/862 |
| 7,469,388 | B1 * | 12/2008 | Baudisch et al. | 715/856 |
| 7,506,245 | B2 * | 3/2009 | Jaeger | 715/230 |
| 7,509,321 | B2 * | 3/2009 | Wong et al. | 1/1 |
| 7,515,135 | B2 * | 4/2009 | Varanda | 345/156 |
| 7,526,737 | B2 * | 4/2009 | Simmons et al. | 715/856 |
| 7,542,994 | B2 * | 6/2009 | Anderson | 1/1 |
| 7,543,248 | B2 * | 6/2009 | Denoue et al. | 715/863 |
| 7,548,936 | B2 * | 6/2009 | Liu et al. | 1/1 |
| 7,554,530 | B2 * | 6/2009 | Mizobuchi et al. | 345/173 |
| 7,561,740 | B2 * | 7/2009 | Denoue et al. | 382/187 |
| 7,577,919 | B2 * | 8/2009 | Hoshino | 715/781 |
| 7,583,265 | B2 * | 9/2009 | Shiraishi et al. | 345/427 |
| 7,587,680 | B2 * | 9/2009 | Wada | 715/804 |
| 7,600,243 | B2 * | 10/2009 | Brain et al. | 725/44 |
| 7,603,628 | B2 * | 10/2009 | Park et al. | 715/764 |
| 7,603,633 | B2 * | 10/2009 | Zhao et al. | 715/863 |
| 7,629,966 | B2 * | 12/2009 | Anson | 345/173 |
| 7,637,813 | B2 * | 12/2009 | Katayama et al. | 463/31 |
| 7,643,012 | B2 * | 1/2010 | Kim et al. | 345/173 |
| 7,657,845 | B2 * | 2/2010 | Drucker et al. | 715/833 |
| 7,701,457 | B2 * | 4/2010 | Bae | 345/442 |
| 7,716,604 | B2 * | 5/2010 | Kataoka et al. | 715/835 |
| 7,737,995 | B2 | 6/2010 | Vronay et al. | 345/619 |
| 7,743,348 | B2 * | 6/2010 | Robbins et al. | 715/863 |
| 7,765,482 | B2 * | 7/2010 | Wood et al. | 715/744 |
| 7,765,486 | B2 * | 7/2010 | Jaeger | 715/764 |
| 7,771,279 | B2 * | 8/2010 | Miyamoto et al. | 463/31 |
| 7,821,503 | B2 * | 10/2010 | Stephanick et al. | 345/173 |
| 7,828,660 | B2 * | 11/2010 | Kando et al. | 463/37 |
| 7,839,512 | B2 * | 11/2010 | Kotani et al. | 358/1.13 |
| 7,844,914 | B2 * | 11/2010 | Andre et al. | 715/773 |
| 7,884,834 | B2 * | 2/2011 | Mouilleseaux et al. | 345/619 |
| 7,886,236 | B2 * | 2/2011 | Kolmykov-Zotov et al. | 715/863 |
| 7,889,928 | B2 * | 2/2011 | Shieh | 382/188 |
| 7,895,533 | B2 * | 2/2011 | Fagans | 715/838 |
| 7,916,125 | B2 * | 3/2011 | Shin et al. | 345/173 |
| 7,916,979 | B2 * | 3/2011 | Simmons | 382/321 |
| 7,925,996 | B2 * | 4/2011 | Hofmeister et al. | 715/863 |
| 7,930,638 | B2 * | 4/2011 | Jaeger | 715/731 |
| 7,956,847 | B2 * | 6/2011 | Christie | 345/173 |
| 7,995,078 | B2 * | 8/2011 | Baar | 345/660 |
| 8,028,251 | B2 * | 9/2011 | Park et al. | 715/863 |
| 8,037,417 | B2 * | 10/2011 | Jarrett et al. | 715/763 |
| 8,181,122 | B2 * | 5/2012 | Davidson | 715/863 |
| 2002/0109737 | A1 * | 8/2002 | Jaeger | 345/863 |
| 2003/0090504 | A1 * | 5/2003 | Brook et al. | 345/716 |
| 2003/0122863 | A1 * | 7/2003 | Dieberger et al. | 345/730 |
| 2003/0128244 | A1 * | 7/2003 | Iga et al. | 345/863 |
| 2003/0179235 | A1 * | 9/2003 | Saund et al. | 345/764 |
| 2004/0027398 | A1 * | 2/2004 | Jaeger | 345/863 |
| 2004/0046744 | A1 * | 3/2004 | Rafii et al. | 345/168 |
| 2004/0046791 | A1 * | 3/2004 | Davis et al. | 345/762 |
| 2004/0047001 | A1 * | 3/2004 | Gehring et al. | 358/1.18 |
| 2004/0095395 | A1 * | 5/2004 | Kurtenbach | 345/810 |
| 2004/0119763 | A1 * | 6/2004 | Mizobuchi et al. | 345/863 |
| 2004/0134978 | A1 * | 7/2004 | Hara et al. | 235/375 |
| 2004/0150657 | A1 * | 8/2004 | Wittenburg et al. | 345/619 |
| 2004/0217947 | A1 * | 11/2004 | Fitzmaurice et al. | 345/183 |
| 2005/0034083 | A1 * | 2/2005 | Jaeger | 715/863 |
| 2005/0144567 | A1 * | 6/2005 | Kurtenbach et al. | 715/810 |
| 2005/0146508 | A1 * | 7/2005 | Kirkland et al. | 345/169 |
| 2005/0188326 | A1 * | 8/2005 | Ikeda | 715/788 |
| 2006/0026523 | A1 * | 2/2006 | Kitamaru et al. | 715/708 |
| 2006/0026535 | A1 * | 2/2006 | Hotelling et al. | 715/863 |
| 2006/0067577 | A1 * | 3/2006 | Marggraff et al. | 382/187 |
| 2006/0085767 | A1 * | 4/2006 | Hinckley et al. | 715/863 |
| 2006/0090141 | A1 * | 4/2006 | Loui et al. | 715/764 |
| 2006/0109517 | A1 * | 5/2006 | Catalan | 358/302 |
| 2006/0230056 | A1 * | 10/2006 | Aaltonen | 707/102 |
| 2007/0038938 | A1 * | 2/2007 | Canora et al. | 715/731 |
| 2007/0055940 | A1 * | 3/2007 | Moore et al. | 715/738 |
| 2007/0077034 | A1 * | 4/2007 | Okuyama et al. | 386/112 |
| 2007/0098263 | A1 * | 5/2007 | Furukawa et al. | 382/181 |
| 2007/0273664 | A1 * | 11/2007 | Kim et al. | 345/173 |
| 2008/0036772 | A1 * | 2/2008 | Bae | 345/442 |
| 2008/0036773 | A1 * | 2/2008 | Bae | 345/442 |
| 2008/0052945 | A1 * | 3/2008 | Matas et al. | 34/173 |
| 2008/0120576 | A1 * | 5/2008 | Kariathungal et al. | 715/863 |
| 2008/0150908 | A1 * | 6/2008 | Someno | 345/173 |
| 2008/0155458 | A1 * | 6/2008 | Fagans et al. | 715/781 |
| 2008/0155474 | A1 * | 6/2008 | Duhig | 715/830 |
| 2008/0307303 | A1 * | 12/2008 | Louch et al. | 715/273 |
| 2009/0077501 | A1 * | 3/2009 | Partridge et al. | 715/846 |
| 2009/0228792 | A1 * | 9/2009 | van Os et al. | 715/702 |
| 2009/0228841 | A1 * | 9/2009 | Hildreth | 715/863 |
| 2009/0300554 | A1 * | 12/2009 | Kallinen | 715/863 |
| 2010/0090964 | A1 * | 4/2010 | Soo et al. | 345/173 |
| 2010/0146388 | A1 * | 6/2010 | Makela et al. | 715/702 |
| 2010/0251167 | A1 * | 9/2010 | DeLuca et al. | 715/786 |
| 2011/0016150 | A1 * | 1/2011 | Engstrom et al. | 707/778 |
| 2011/0035705 | A1 * | 2/2011 | Faenger et al. | 715/811 |
| 2011/0099501 | A1 * | 4/2011 | Mull et al. | 715/771 |
| 2011/0185320 | A1 * | 7/2011 | Hinckley et al. | 715/863 |
| 2012/0026100 | A1 * | 2/2012 | Migos et al. | 345/173 |

* cited by examiner

| LOCUS | LOCUS COORDINATE DATA | METADATA |
|---|---|---|
| A | ... ...<br>... ...<br>... ... | ... ... ... ... ... ... |
| B | ... ...<br>... ... | ... ... ... ... ... ... |

1807

F I G. 24
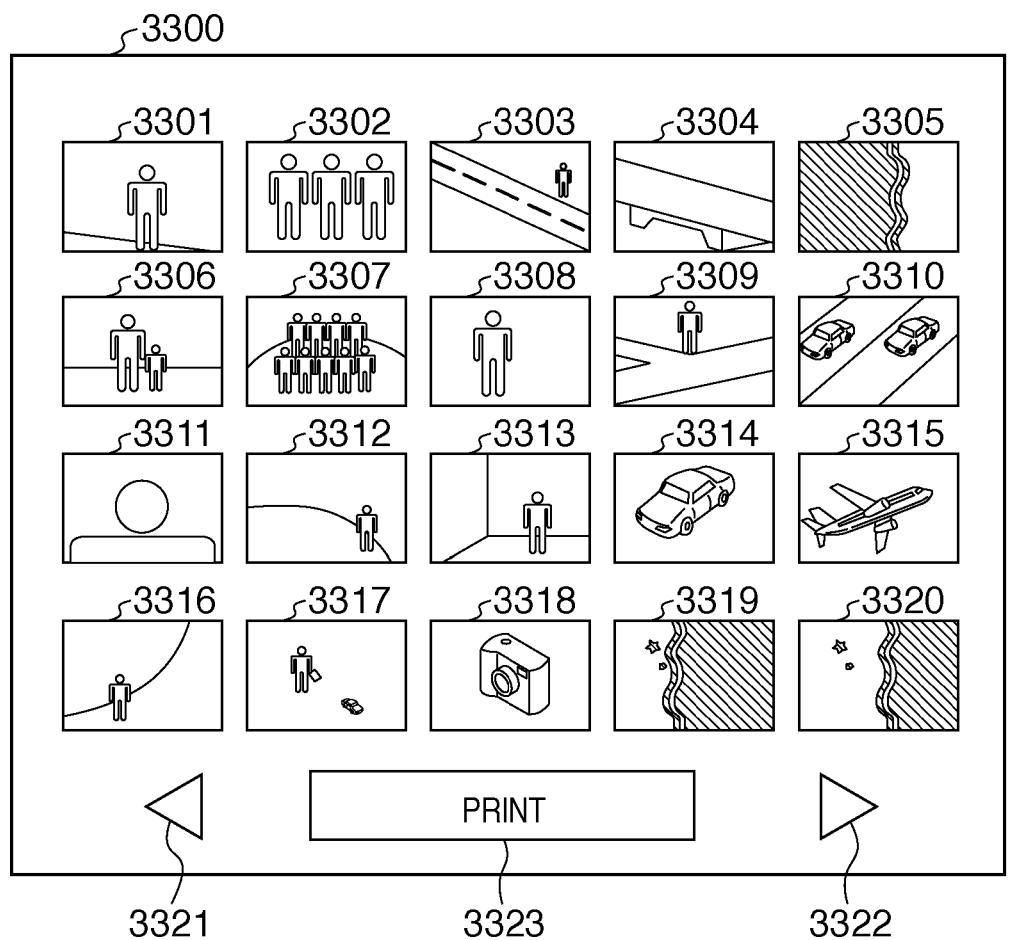

F I G. 29
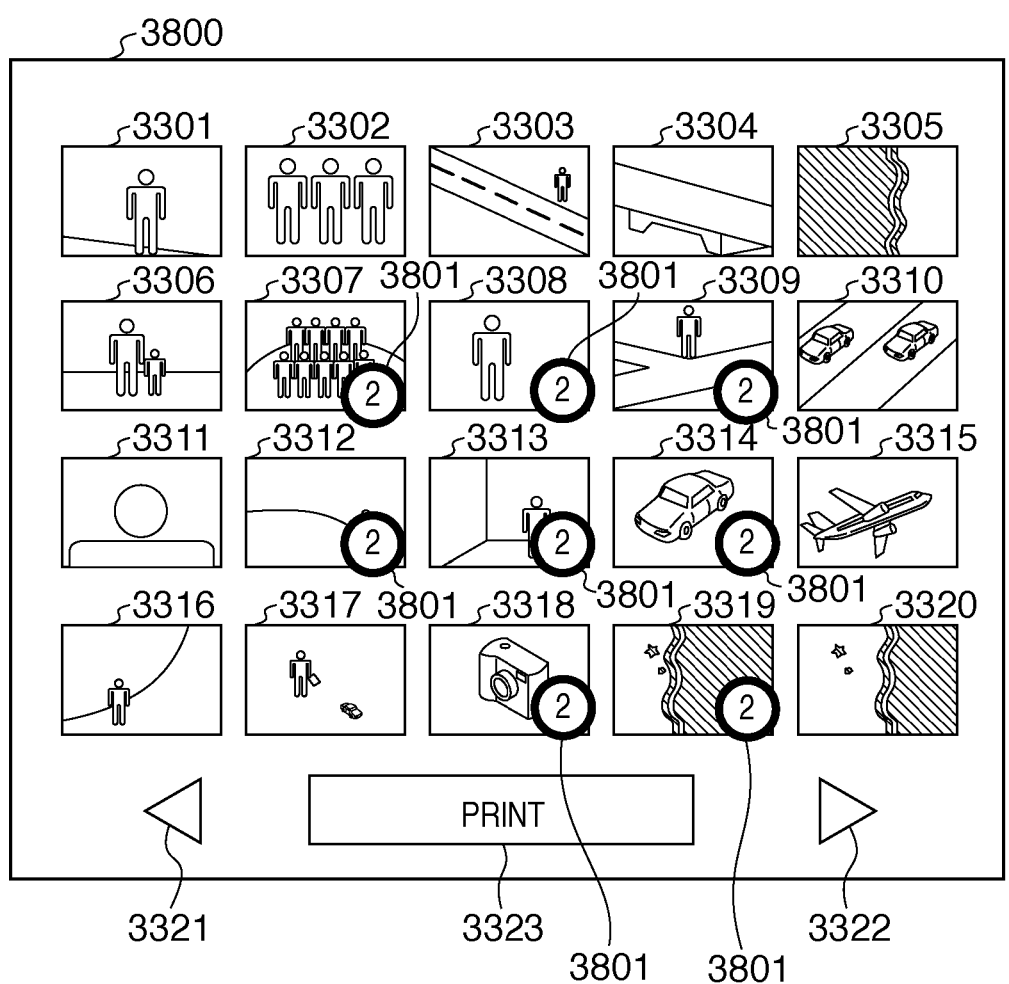

F I G. 32
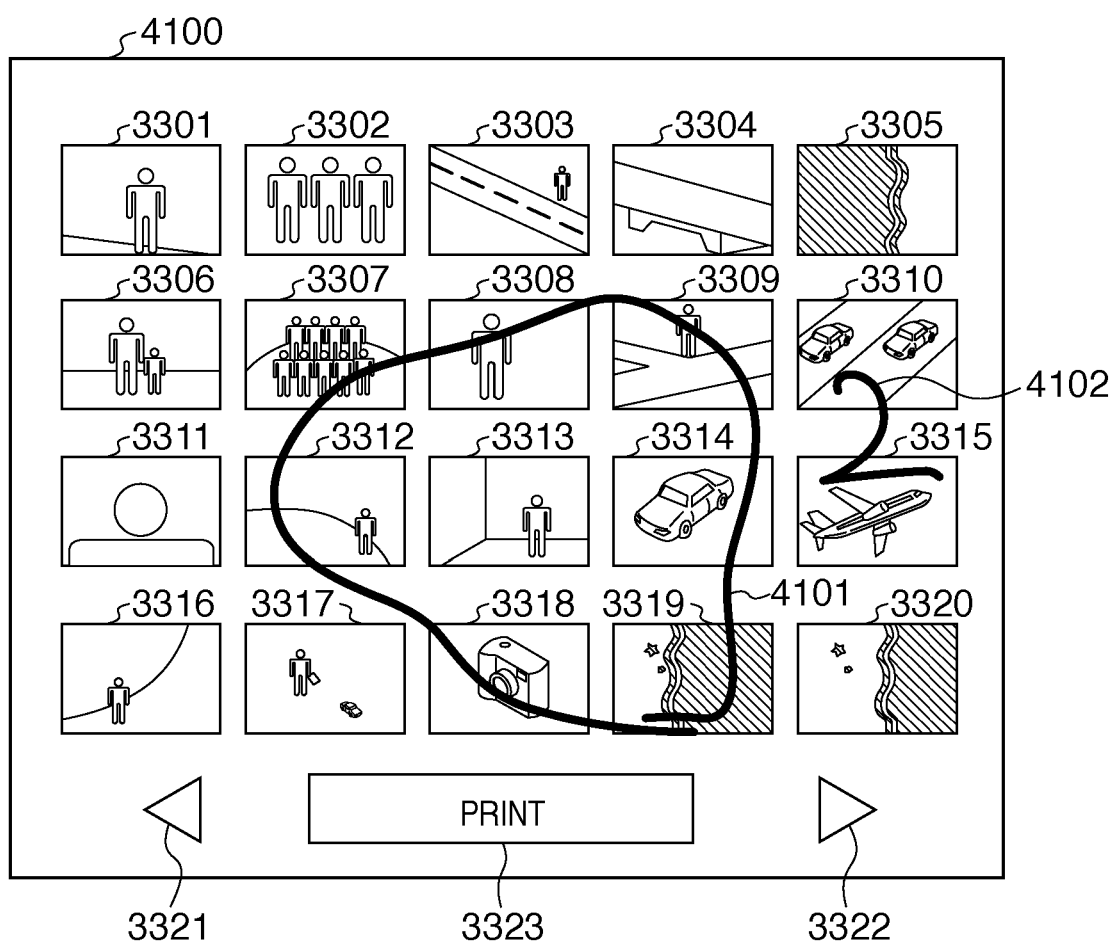

F I G. 42

| DIRECTION | PROCESS CORRESPONDING TO DIRECTION OF ALIGNMENT PROCESS |
|---|---|
| RIGHT DIRECTION | RIGHT ALIGNMENT PROCESS |
| LEFT DIRECTION | LEFT ALIGNMENT PROCESS |
| CENTER DIRECTION | CENTER ALIGNMENT PROCESS |

F I G. 46

| | COORDINATE POINT | X-COORDINATE | Y-COORDINATE |
|---|---|---|---|
| 2504 | P000 | 584 | 1021 |
| 2505 | P001 | 579 | 1019 |
| | ⋮ | ⋮ | ⋮ |
| 2506 | P101 | 836 | 377 |
| 2507 | P102 | 838 | 433 |
| 2508 | P103 | 892 | 500 |
| 2509 | P104 | 946 | 533 |
| 2510 | P105 | 1013 | 537 |
| 2511 | P106 | 1073 | 540 |
| 2512 | P107 | 1134 | 528 |
| 2513 | P108 | 1099 | 518 |
| 2514 | P109 | 1044 | 522 |
| 2515 | P110 | 969 | 545 |
| 2516 | P111 | 932 | 564 |
| 2517 | P112 | 934 | 614 |
| 2518 | P113 | 938 | 676 |
| | ⋮ | ⋮ | ⋮ |
| 2519 | P161 | 577 | 1025 |

(Column headers: 2501, 2500, 2502, 2503)

FIG. 47

$$\begin{cases} v1.x = a.x - b.x & \sim 2601 \\ v1.y = a.y - b.y & \sim 2602 \\ v2.x = c.x - b.x & \sim 2603 \\ v2.y = c.y - b.y & \sim 2604 \\ \Delta e > 1 - \dfrac{v1.x \times v2.x + v1.y \times v2.y}{\sqrt{(v1.x^2 + v1.y^2)} \times \sqrt{(v2.x^2 + v2.y^2)}} & \phantom{xx} 2605 \end{cases}$$

INFORMATION PROCESSING APPARATUS, PROCESSING METHOD THEREOF, AND COMPUTER-READABLE STORAGE MEDIUM

BACKGROUND OF THE INVENTION

1. Field of the Invention

The present invention relates to an information processing apparatus, a processing method thereof, and a computer-readable storage medium.

2. Description of the Related Art

An information processing apparatus, which is equipped with a pointing device such as a pen tablet or touch panel, incorporates, for example, a technique for operating a device based on the locus of coordinates input by the user. In such device, it is desirable to input a plurality of loci in an identical scene so as to increase the amount of information to be given to the device. Techniques that implement this are disclosed in Japanese Patent Laid-Open No. 2006-230483 and Japanese Patent Laid-Open No. 2006-122407.

With the technique disclosed in Japanese Patent Laid-Open No. 2006-230483, when the user draws a symbol by stroking on a touch panel, it is determined if the drawn symbol corresponds to one of sample symbols, which are set in advance. At this time, until it is determined that a sample symbol input by the user is an input end symbol, the user can successively draw a plurality of symbols. When it is determined that the drawn symbol is an input end symbol, a process according to a symbol or symbol string input so far is executed.

With the technique disclosed in Japanese Patent Laid-Open No. 2006-122407, a character located within the forming range of a locus input by the user is selected as a selected character. At this time, loci, which are input a plurality of times within a predetermined period of time, are recognized as a plurality of locus patterns. When the input locus patterns match one of a plurality of patterns associated with instructions, an instruction corresponding to the matched pattern is executed for the selected character.

In such information processing apparatus, techniques for selecting an arbitrary object by inputting a locus of coordinates are prevalent. Such techniques include one which extracts information other than a selected target from an input locus and uses it in a device operation. An image sensing apparatus disclosed in Japanese Patent Laid-Open No. 2003-319244 has a function of comparing a finger-input locus on a touch panel with gesture operations, which are set in advance, so as to determine a gesture operation, and settling a region designated by the determined gesture operation, and an image sensing or playback operation to be executed for the designated region. According to this technique, even when an identical closed region is designated, the process contents for the designated region can be switched by discriminating the moving direction (clockwise or counterclockwise) of the gesture operation and the stroke order. In addition, as disclosed in Japanese Patent Laid-Open No. 60-075980, the following technique is known. That is, when the user encloses a plurality of objects by the locus of a closed figure, and inputs a locus indicating a process in the vicinity of the former locus, the designated process is executed for the plurality of selected objects.

However, in the aforementioned related arts, the following practical problems are posed. In the technique disclosed in Japanese Patent Laid-Open No. 2006-230483, the user has to separately input a dedicated symbol as an input end symbol in addition to a symbol string required to progress in a game. For this reason, every time the user inputs one instruction to the device, he or she is required to draw the input end symbol. Such requirement disturbs prompt device operations.

In the technique disclosed in Japanese Patent Laid-Open No. 2006-122407, after the user inputs a locus, another locus input is accepted for a predetermined period of time, so as to cope with a plurality of locus inputs. For this reason, even when the user wants to end a locus input at that time, a wait time is generated until execution of an instruction. On the other hand, when this wait time is set to have a short duration, the user has to quickly input a plurality of loci. As a result, the input loci may have shapes different from those which the user intended, and locus inputs may not be completed in time. Furthermore, in the technique disclosed in Japanese Patent Laid-Open No. 2003-319244, the processes to be executed are switched based on the stroke order of the finger-input locus. However, the locus shape which is allowed at that time is limited to a closed region locus. Also, in the technique disclosed in Japanese Patent Laid-Open No. 60-075980, objects selected as processing targets are only those which are located within a closed region locus that designates a range.

SUMMARY OF THE INVENTION

The present invention provides an information processing method which improves operability upon making various operations based on input coordinates, a processing method thereof, and a computer-readable storage medium.

According to a first aspect of the present invention, there is provided an information processing apparatus comprising: an input unit configured to input a coordinate value of a position designated on a screen which displays one or a plurality of objects; a determination unit configured to compare an input locus expressed by a coordinate value string input by the input unit, and a second locus which is defined in advance as a locus used to instruct to execute a process for the object, and to determine whether the input locus is a first locus or the second locus; a selection unit configured to select, when the determination unit determines that the input locus is the first locus, object from the one or plurality of objects based on display positions of the input locus and the object on the screen; and an execution unit configured to execute, when the determination unit determines that the input locus is the second locus, a process designated by the input locus with respect to the object selected by the selection unit.

According to a second aspect of the present invention, there is provided a processing method for an information processing apparatus, comprising: inputting a coordinate value of a position designated on a screen which displays one or a plurality of objects; comparing an input locus expressed by a coordinate value string input in the inputting, and a second locus which is defined in advance as a locus used to instruct to execute a process for the object, and determining whether the input locus is a first locus or the second locus; selecting, when it is determined in the determining that the input locus is the first locus, object from the one or plurality of objects based on display positions of the input locus and the object on the screen; and executing, when it is determined in the determining that the input locus is the second locus, a process designated by the input locus with respect to the object selected in the selecting.

According to a third aspect of the present invention, there is provided a computer-readable storage medium storing a computer program for making a computer function as: an input unit configured to input a coordinate value of a position designated on a screen which displays one or a plurality of objects; a determination unit configured to compare an input locus expressed by a coordinate value string input by the input unit, and a second locus which is defined in advance as a locus used to instruct to execute a process for the object, and to determine whether the input locus is a first locus or the second locus; a selection unit configured to select, when the determination unit determines that the input locus is the first locus, object from the one or plurality of objects based on display positions of the input locus and the object on the screen; and an execution unit configured to execute, when the determination unit determines that the input locus is the second locus, a process designated by the input locus with respect to the object selected by the selection unit.

Further features of the present invention will be apparent from the following description of exemplary embodiments with reference to the attached drawings.

BRIEF DESCRIPTION OF THE DRAWINGS

FIG. 24 is a first view showing an example of an image list window;

FIG. 29 is a third view showing an example of the image list window;

FIG. 32 is a sixth view showing an example of the image list window;

FIG. 42 is a view showing an example of a list 2100 of alignment processes;

FIG. 46 is a view showing an example of a coordinate point list 2500;

FIG. 47 is a view showing an example of mathematical formulas according to the ninth embodiment;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
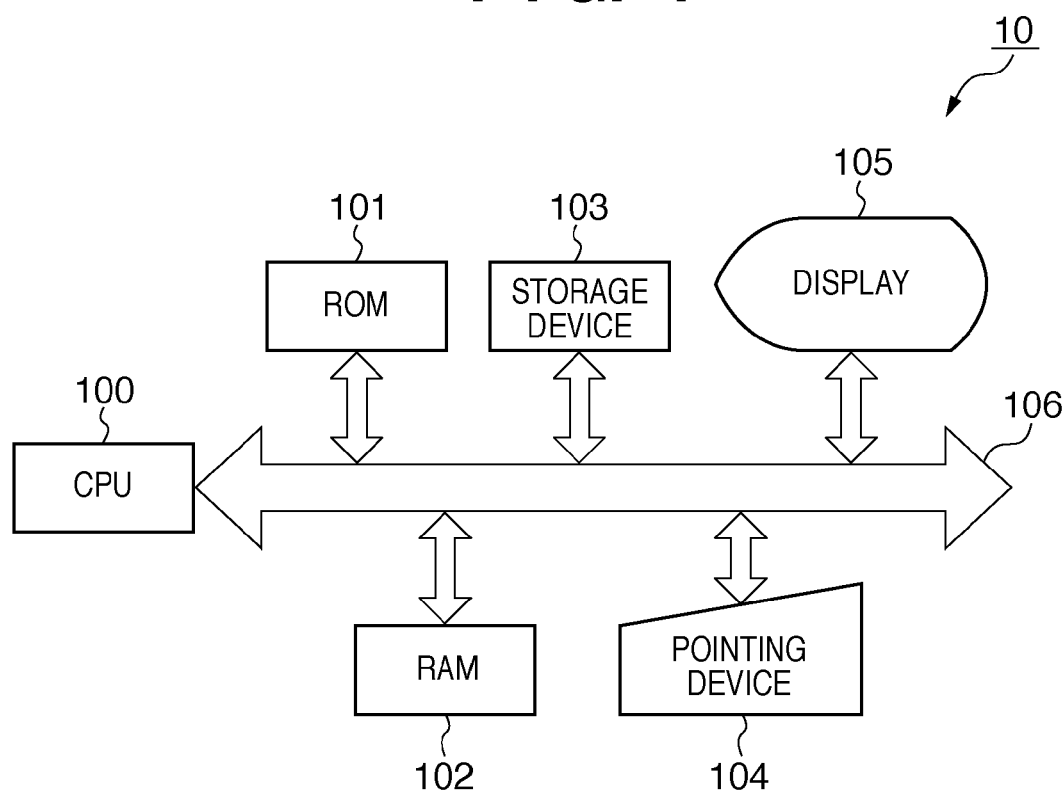
FIG. 1 is a block diagram showing an example of the hardware arrangement of an information processing apparatus according to an embodiment of the present invention.

FIG. 1 is a block diagram showing an example of the hardware arrangement of an information processing apparatus according to an embodiment of the present invention.

An information processing apparatus 10 includes, as its hardware components, a CPU 100, ROM 101, RAM 102, storage device 103, pointing device 104, and display 105.

The CPU 100 executes various kinds of input/output control, data processing, and the like. The CPU 100 controls the operations of respective units connected via a bus 106 according to programs stored in the storage device 103 and the like. The RAM (Random Access Memory) 102 serves as a main memory, a work area and the like of the CPU 100, and temporarily stores, for example, arithmetic results and data. The ROM (Read Only Memory) 101 stores a basic I/O program and various data. The storage device 103 includes a hard disk drive, and stores programs and data (e.g., a locus processing program) in addition to an OS.

The pointing device 104 detects the coordinate value of a position designated by the user, and inputs that detection value. Note that the user's input (designation of coordinates) may be made using a pen or mouse, or directly by a finger. An input locus is formed by a coordinate value string input by this pointing device 104. The input locus is roughly classified into two types, that is, a locus input to select objects (digital data such as document data, image data, audio data, and movie data) as processing targets, and a locus input to designate a process for the selected objects.

The display 105 displays various windows. The display 105 displays a window that displays one or a plurality of objects, and the user selects, for example, objects as processing targets from the window via the pointing device 104. Note that the pointing device 104 and display 105 may be implemented by an integrated hardware component. The example of the hardware arrangement of the information processing apparatus 10 has been described.

Figure 2:
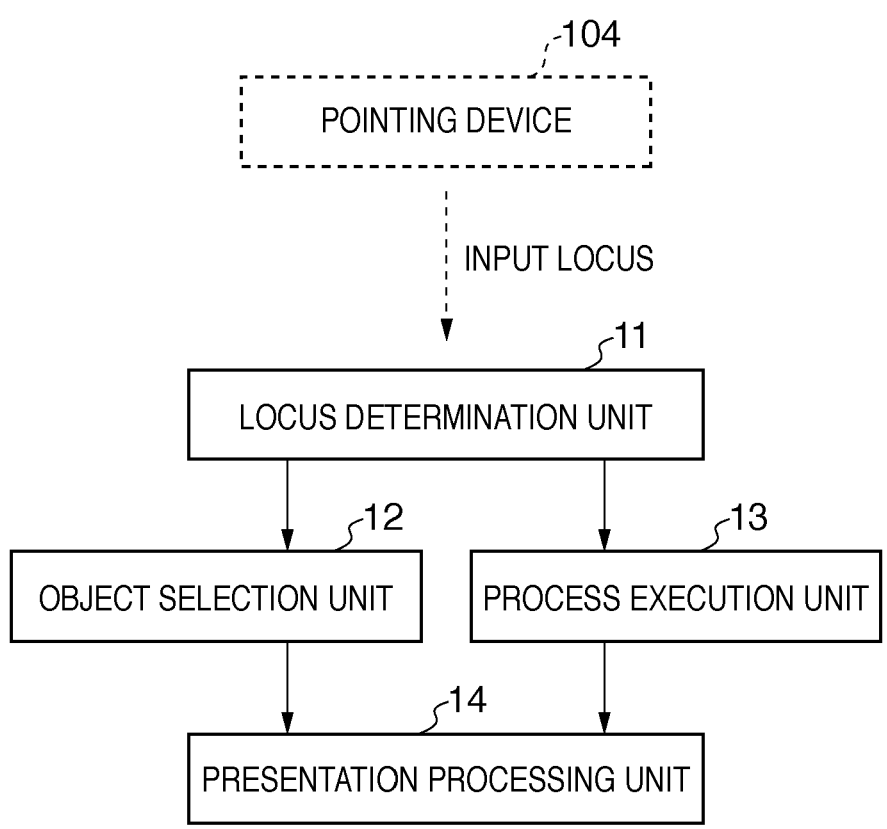
FIG. 2 is a block diagram showing an example of the functional arrangement implemented by a CPU 100 shown in FIG. 1.

An example of the functional arrangement implemented by the CPU 100 shown in FIG. 1 will be described below with reference to FIG. 2. Note that some or all of these processing functions are implemented when the CPU 100 executes programs (for example, a locus processing program) stored in the storage device 103 and the like.

The CPU 100 implements, as its functional units, a locus determination unit 11, object selection unit 12, process execution unit 13, and presentation processing unit 14.

The locus determination unit 11 determines whether an input locus input by the user is a locus input to select objects (first locus) or a locus input to designate a process for the selected objects (second locus). Although details will be described later, the RAM 102 and the like store locus data associated with the second locus in advance, and the determination process in the locus determination unit 11 is made based on whether or not the locus data matches an input locus.

The object selection unit 12 selects an object corresponding to an input locus based on the display positions of the input locus and object when the locus determination unit 11 determines that the input locus is the first locus.

The process execution unit 13 executes a process corresponding to an input locus for an object selected by the object selection unit 12 when the locus determination unit 11 determines that the input locus is the second locus.

The presentation processing unit 14 displays various windows on the display 105, and presents information to the user. The presentation processing unit 14 executes a process for displaying the processing results of the object selection unit 12 and the process execution unit 13 and the like on the display 105. The example of the functional arrangement implemented by the CPU 100 has been described.

An example of the operations in the information processing apparatus 10 shown in FIG. 1 will be described below with reference to FIGS. 3 to 6. In the description of this embodiment, assume that photos displayed on a thumbnail list window are objects, and a numeral representing the number of print sheets (numerals from 1 to 9) set for the photos is a locus input to designate a process (second locus). The operations executed when photos are selected from the thumbnail list window based on the locus of coordinates input by the user via the pointing device 104, and the number of print sheets is set for the selected photos will be exemplified below.

Figure 3:
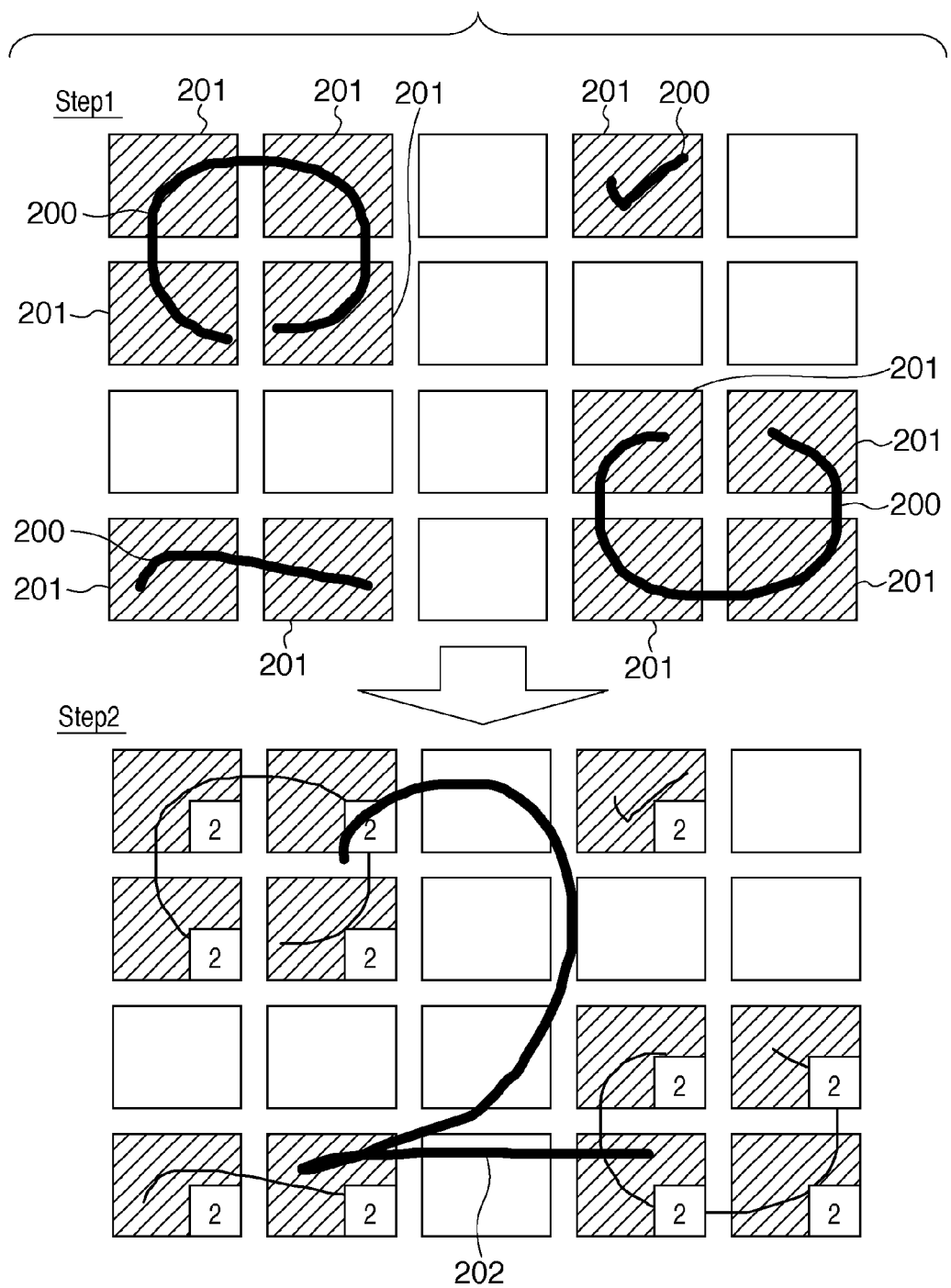
FIG. 3 is a view showing an example of overviews of a selection method of photos as print targets, and a setting method of setting the number of print sheets for the selected photos.

A selection method of photos as print targets and a setting method of setting the number of print sheets for the selected photos will be described first with reference to FIG. 3.

Each individual rectangle indicates a photo thumbnail. The user draws first loci (to be referred to as photo selection loci hereinafter) 200 on respective photos. Then, photos located at positions intersecting with the loci are selected. In case of FIG. 3, reference numeral 201 denotes selected photos.

After selection of all photos for which the user wants to set the number of print sheets, the user draws a second locus (to be referred to as a number of print sheets designation locus hereinafter) 202. This number of print sheets designation locus 202 can be input at an arbitrary place on the identical window. Then, the number of print sheets based on the shape of the input locus is set for all the selected photos. A numeral displayed at the lower right corner in each photo thumbnail presents, to the user, the fact that the number of print sheets (in this case, two) of the photo is set.

Note that the user can re-input the photo selection locus 200 again until he or she inputs the number of print sheets designation locus. After the number of print sheets designation locus is drawn, a predetermined wait time may be set to cope with, for example, a user's input error, or print processing may be promptly started without any wait time at the drawing timing of the number of print sheets designation locus.

Figure 4:
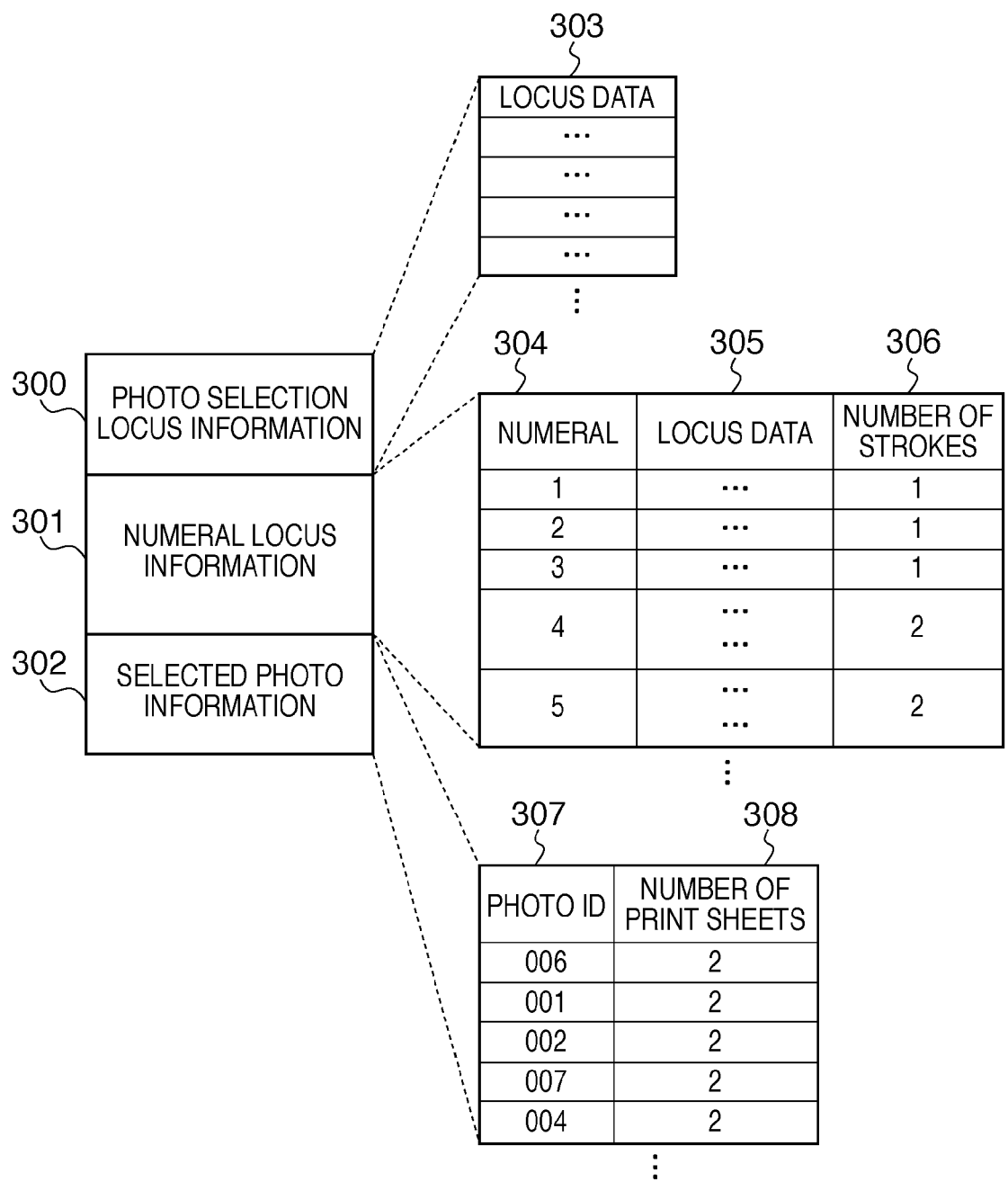
FIG. 4 is a view showing an example of data stored in a RAM 102 shown in FIG. 1.

An example of data stored in the RAM 102 shown in FIG. 1 will be described below with reference to FIG. 4.

The RAM 102 stores photo selection locus information 300, numeral locus information 301, and selected photo information 302. These pieces of information are rendered on the RAM 102 upon execution of, for example, a locus processing program.

The photo selection locus information 300 stores information of a photo selection locus input by the user. In general, the photo selection locus information normally stores a plurality of locus data together. In this embodiment, all these locus data are independently stored in this area. Respective locus data are stored for each stroke in the input order of loci, as denoted by reference numeral 303. This is to cope with a case in which data of photo selection loci are to be referred to in the input order in a locus determination process to be described later. Note that each locus data is configured by data including coordinates indicating the position and shape of an input locus.

The numeral locus information 301 stores information of the locus shapes of numerals. In the description of this embodiment, the locus shapes of the numerals are stored. However, data to be stored need not always be numerals, and locus shapes associated with certain processes need only be stored. This storage area stores locus data 305 of numeral loci and their numbers of strokes 306 using a table in correspondence with respective numerals 304. As for numeral loci having a number of strokes=2 like "4" and "5", locus data of the first and second strokes are successively stored. Information of the number of strokes of each numeral locus is used in the locus determination process to be described later. Note that the numeral locus information 301 may be stored in, for example, the ROM 101 or storage device 103 in place of the RAM 102.

The selected photo information 302 stores information of photos selected by the photo selection loci. In this area, the number of print sheets 308 of each photo is stored together with an ID 307 that uniquely identifies that photo.

Figure 5:
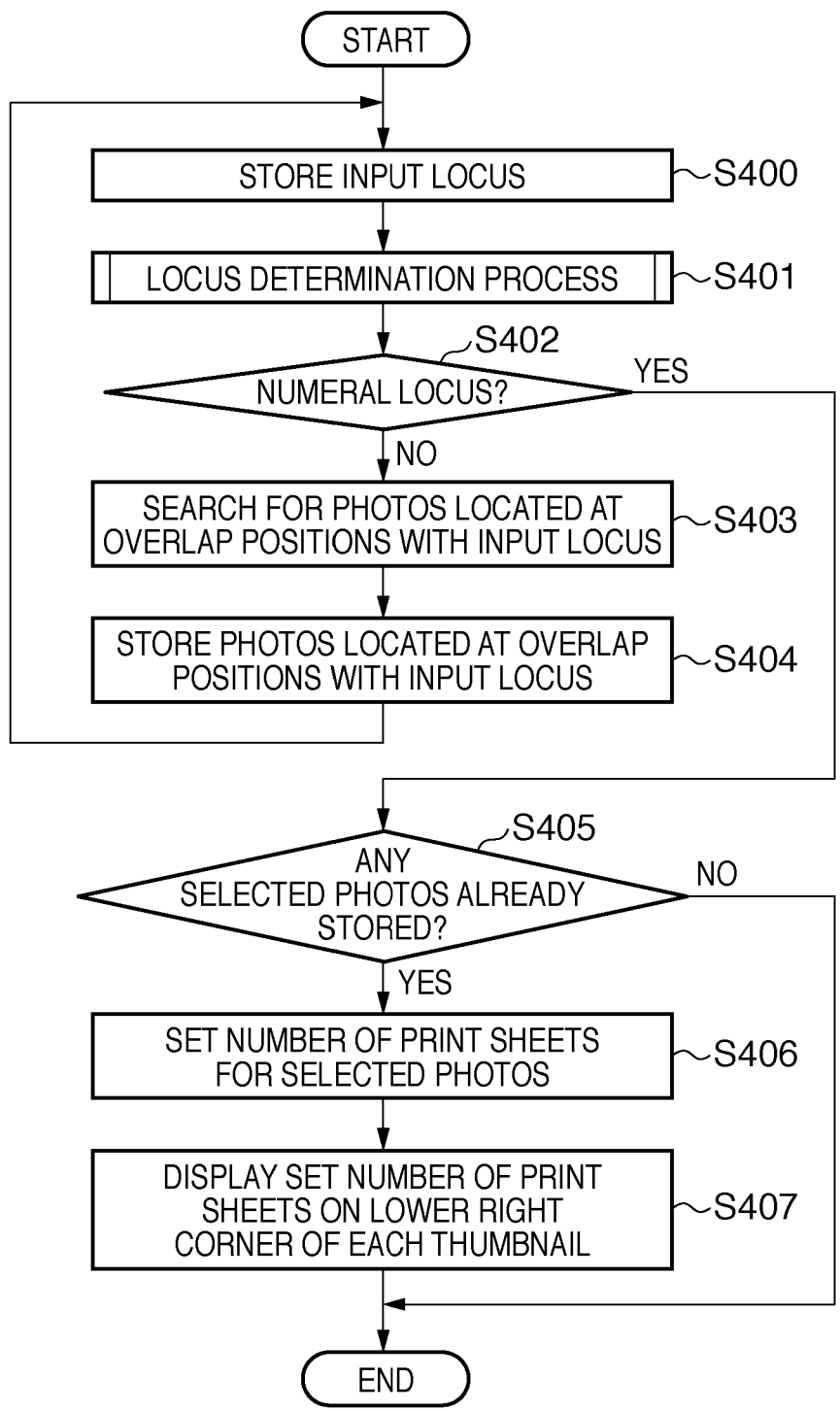
FIG. 5 is a flowchart showing an example of the sequence of the overall processing in an information processing apparatus 10 shown in FIG. 1.

An example of the sequence of the overall processing in the information processing apparatus 10 shown in FIG. 1 will be described below with reference to FIG. 5. In this case, processes after the user inputs the locus of coordinates will be described.

After this process starts, the information processing apparatus 10 stores locus data input by the user using the point device in the RAM 102 (S400). The locus determination unit 11 compares the input locus with the predetermined second locus (in this case, a numeral locus) to determine if the two loci match (S401). Details of the locus determination process in step S401 will be described later.

As a result of determination, if the input locus does not match the second locus (NO in S402), the information processing apparatus 10 recognizes that the first locus is input. Then, the object selection unit 12 searches for photos that overlap the input locus (S403), and stores the IDs of the photos that overlap the input locus in the RAM 102 (S404). After that, the information processing apparatus 10 returns to the process in step S400, and accepts a user's locus input.

As a result of determination in step S402, if the input locus matches the second locus (YES in S402), the information processing apparatus 10 determines if any selected photos are already stored. If no selected photo is stored (NO in S405), this processing sequence ends. If any selected photos are already stored (YES in S405), the information processing apparatus 10 controls the process execution unit 13 to set a numeral based on the input locus stored in step S400 as the number of print sheets for all the selected photos (S406). The information processing apparatus 10 then controls the presentation processing unit 14 to display the number of print sheets on the lower right corner of each thumbnail (S407), thus ending this processing sequence. The number of print sheets set for each photo at this time is stored as the selected photo information 302 in the RAM 102.

Details of the locus determination process in step S401 of FIG. 5 will be described below with reference to FIG. 6. Note that since this embodiment is premised on that the number of print sheets (a numeral ranging from 1 to 9) is input as the second locus, the upper limit of the number of input strokes is "2".

After this process starts, the information processing apparatus 10 controls the locus determination unit 11 to compare the input locus with a numeral locus having a number of strokes=1 (locus data) and to determine if the two loci match (S500). Note that the numeral loci having a number of strokes=1 are stored in advance in the RAM 102.

If the input locus matches one of the numeral loci (YES in S501), the information processing apparatus 10 returns a numerical value corresponding to the matched numeral locus to a call source (S506), thus ending this processing sequence. On the other hand, if the input locus does not match any of the numeral loci having a number of strokes=1 (NO in S501), the information processing apparatus 10 compares the input locus with locus data having a number of strokes=2. More specifically, locus data input as the first stroke is combined with that input as the second stroke (S502), and the information processing apparatus 10 determines if the combined locus data matches any of numeral loci having a number of strokes=2 (S503). Note that the numeral loci having a number of strokes=2 are stored in advance in the RAM 102.

If the combined locus data matches any of the numeral loci (YES in S504), the information processing apparatus 10 returns a numerical value corresponding to that numeral locus to a call source (S506), thus ending this processing sequence. On the other hand, if the combined locus data does not match any of numeral loci (NO in S504), the information processing apparatus 10 returns a value indicating a determination failure to a call source (S505), thus ending this processing sequence.

Figure 6:
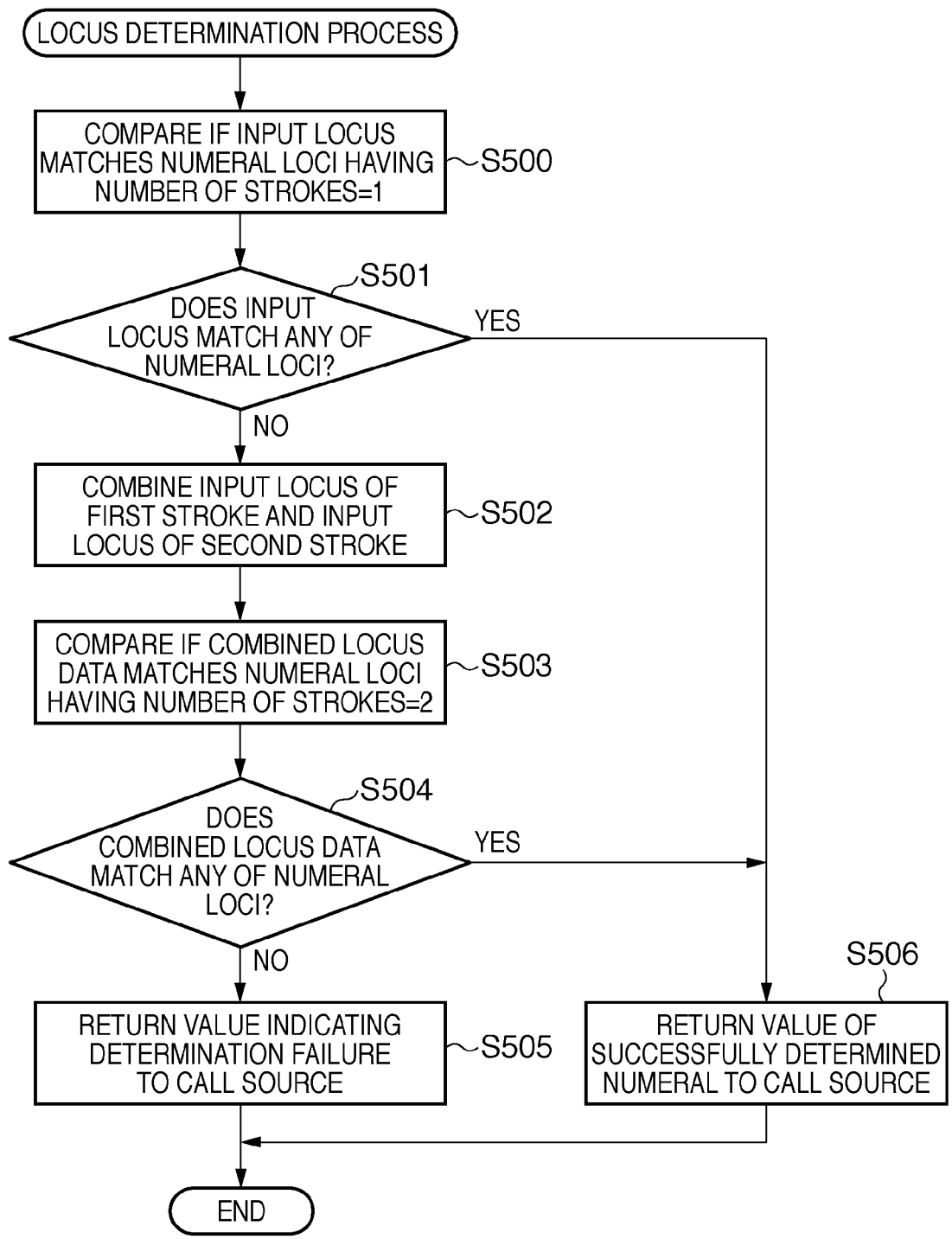
FIG. 6 is a flowchart showing an example of the sequence of a locus determination process shown in step S401 of FIG. 5.

Since the description of FIG. 6 is given under the assumption that a numeral ranging from "1" to "9" is input as the second locus, the maximum number of strokes is 2. However, the second locus having three or more strokes may be input, as a matter of course. As described above, input loci may be time-serially combined in the input order of strokes, and comparison between the combined locus data and locus data stored in the RAM 102 may be repeated.

As described above, according to the first embodiment, the process can be executed for selected objects when the second locus is input. For this reason, when the user wants to end selection of objects, he or she can input the second locus to promptly decide on and execute the instruction contents. Then, since the operability upon making various operations based on coordinate inputs can be improved, the number of operation steps and an operation time required for the user at the time of coordinate input operations can be reduced.

Second Embodiment

The second embodiment will be described below. The second embodiment will explain a case in which the print order of photos is decided on simultaneously with selection of photos. Note that the arrangement of the information processing apparatus 10 according to the second embodiment is the same as the first embodiment, and a description thereof will not be repeated.

Figure 7:
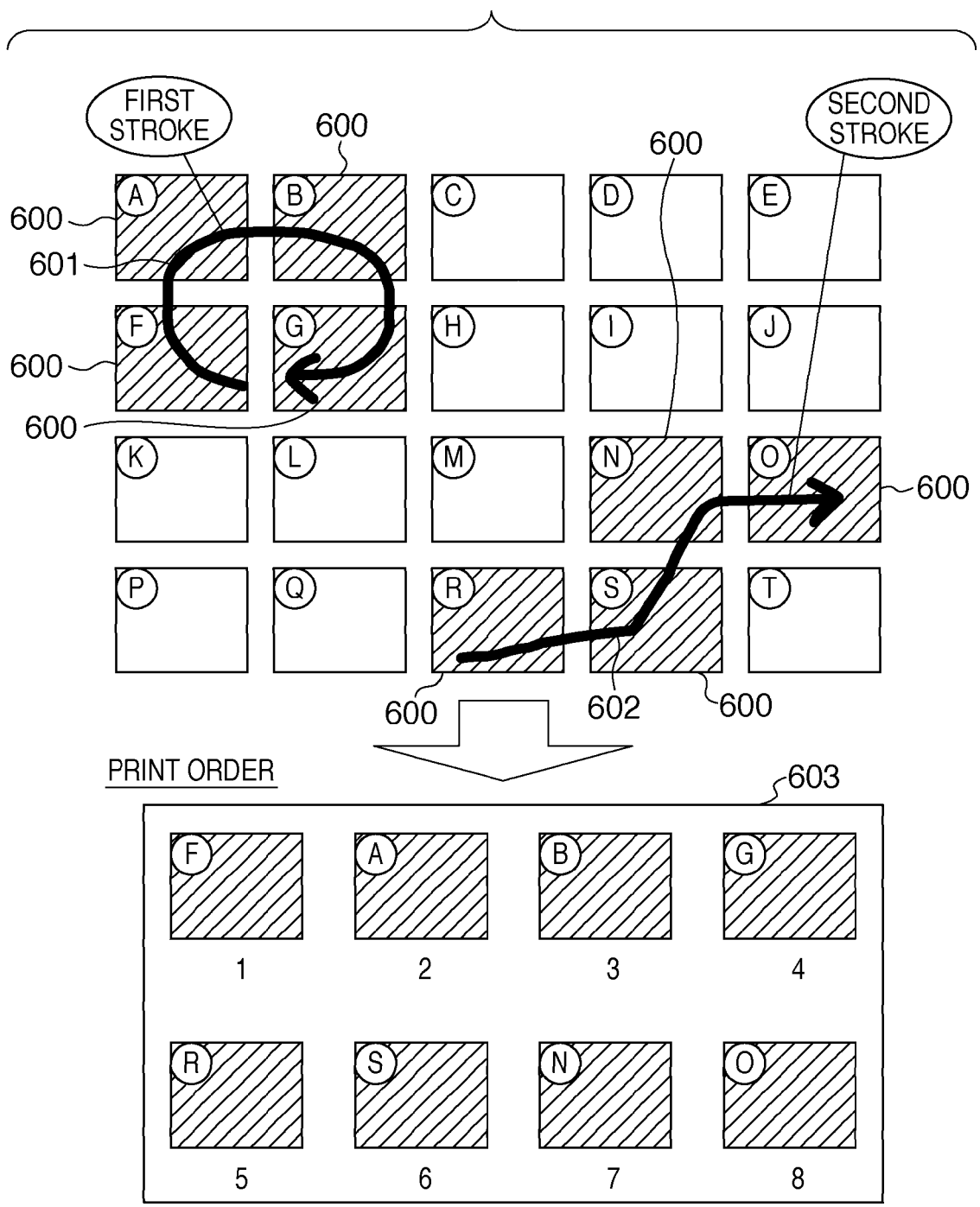
FIG. 7 is a view showing an example of an overview of a selection method of photos as print targets.

The operations of the information processing apparatus 10 according to the second embodiment will be described below with reference to FIGS. 7 to 9. A selection method of photos as print targets will be described first with reference to FIG. 7.

Each individual rectangle indicates a photo thumbnail. Rectangles 600 indicate already selected photo thumbnails. An identifier of each individual photo is represented by a symbol located at the upper left corner of each thumbnail. In this case, after the user draws a photo selection locus 601 in a direction shown in FIG. 7, he or she draws a photo selection locus 602 in a direction shown in FIG. 7. Note that FIG. 7 illustrates each photo selection locus having an arrow shape.

However, this is to explicitly indicate the drawing direction of a locus, and the shape of an input locus need not always be an arrow.

In the second embodiment, photos are printed according to the drawing order of the photo selection loci. That is, when the photo selection loci are drawn by the loci 601 and 602 in FIG. 7, the print order is F→A→B→G→R→S→N→O, as denoted by reference numeral 603.

Figure 8:
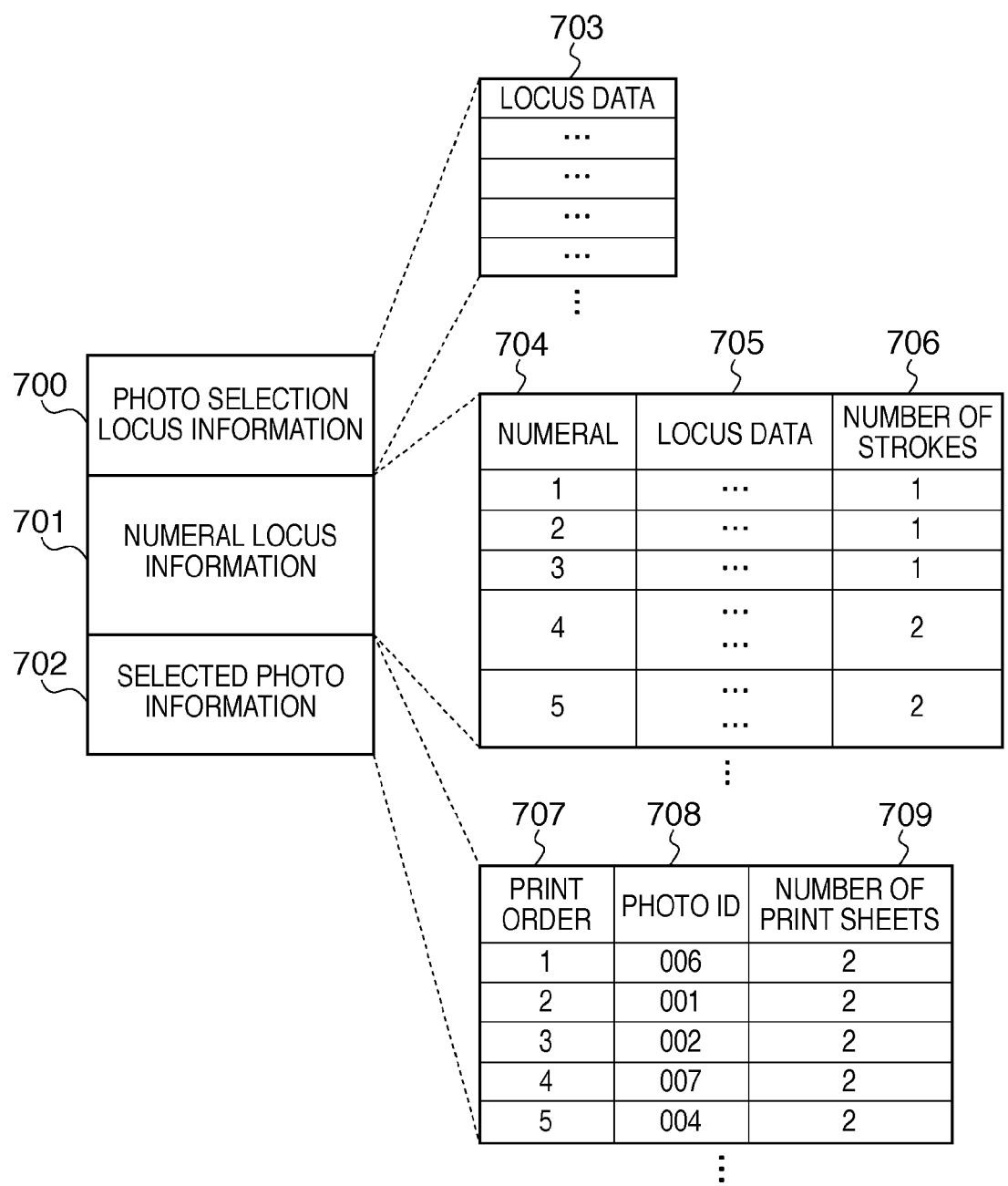
FIG. 8 is a view showing an example of data stored in the RAM 102 according to the second embodiment.
Figure 9:
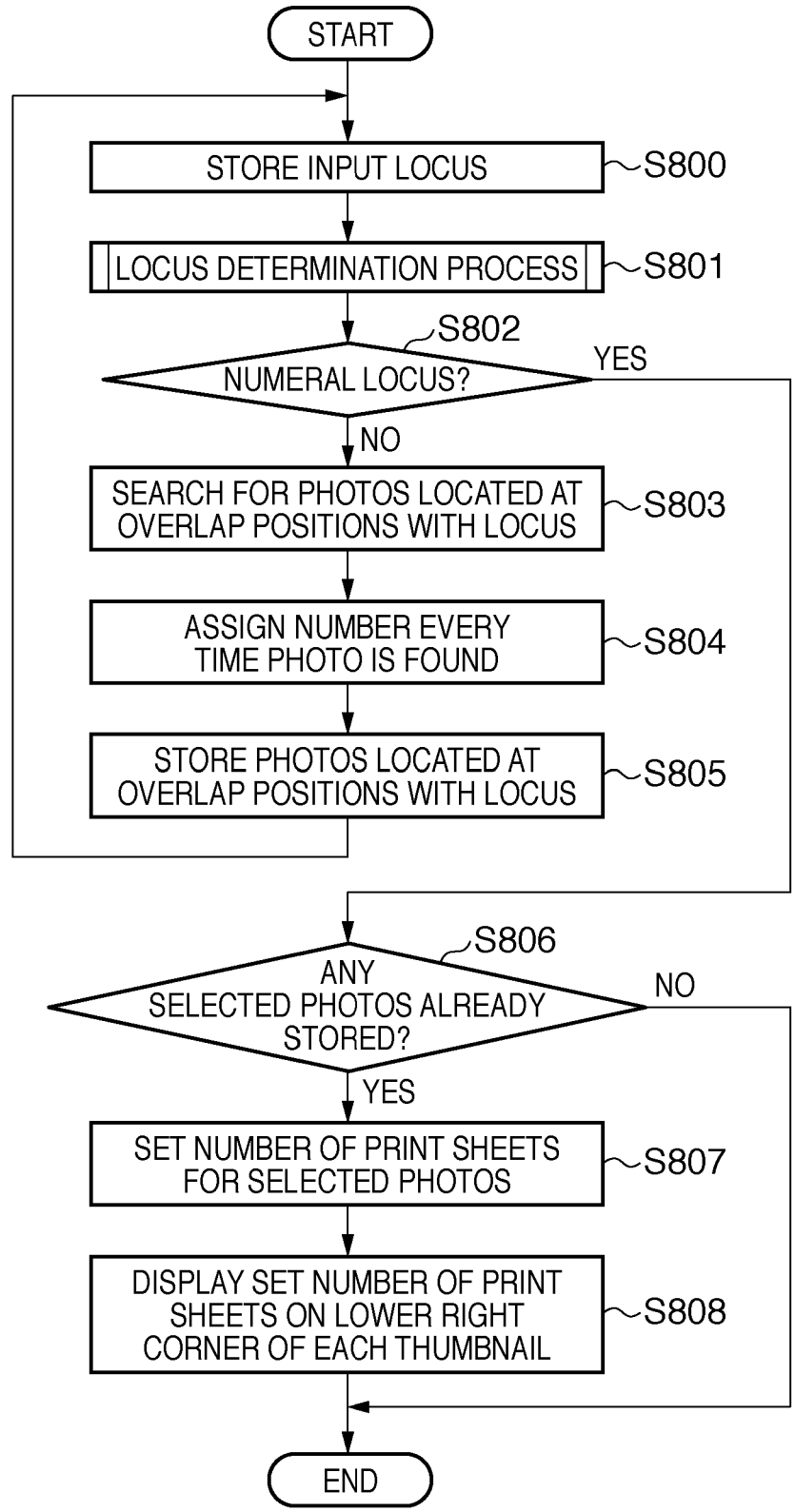
FIG. 9 is a flowchart showing an example of the sequence of the overall processing in the information processing apparatus 10 according to the second embodiment.

FIG. 8 is a view showing an example of data stored in the RAM 102 according to the second embodiment.

Most of data stored in the RAM 102 are the same as those in the first embodiment, but selected photo information 702 is different from the first embodiment. More specifically, the selected photo information 702 includes a field that stores a print order 707 indicating the print order of a photo in correspondence with a photo ID 708 and its number of print sheets 709.

An example of the sequence of the overall processing in the information processing apparatus 10 according to the second embodiment will be described below with reference to FIG. 9. The processes executed when the user inputs a locus of coordinates will be described.

After this process starts, the information processing apparatus 10 stores locus data input by the user using the pointing device in the RAM 102 (S800). The locus determination unit 11 compares the input locus with the predetermined second locus (in this case, a numeral locus) to determine if the two loci match (S801). This locus determination process is the same as that in FIG. 6 used to explain the first embodiment, and a description thereof will not be repeated.

As a result of determination, if the input locus does not match the second locus (NO in S802), the information processing apparatus 10 recognizes that the first locus is input. Then, the object selection unit 12 searches for photos that overlap the input locus (S803). At this time, every time a photo is detected by this search, the information processing apparatus 10 assigns a number indicating the print order of that photo (S804). The information processing apparatus 10 stores information of that photo in the area of the selected photo information 702 in the RAM 102 together with the assigned number (S805). A counter used to assign a number is also used in subsequent numbering, and its value is held without being cleared.

As a result of determination in step S802, if the input locus matches the second locus (YES in S802), the same processes as in the first embodiment are executed. That is, the number of print sheets is set (S807), and is presented to the user (S808). After that, this processing sequence ends. Note that this embodiment is different from the first embodiment in that photos are printed in turn from those which intersect with a photo selection locus earlier at the time of input of the photo selection locus.

As described above, according to the second embodiment, the print order of objects can be set based on the first locus. That is, the selection order of objects can be used as information used in an operation. In this case as well, the locus shape is not limited, and order information using a plurality of loci can be used in an operation.

Third Embodiment

The third embodiment will be described below. The third embodiment will explain a case in which photos are grouped depending on the shapes of a plurality of input photo selection loci (first loci), and the number of print sheets is designated for each group.

Figure 10:
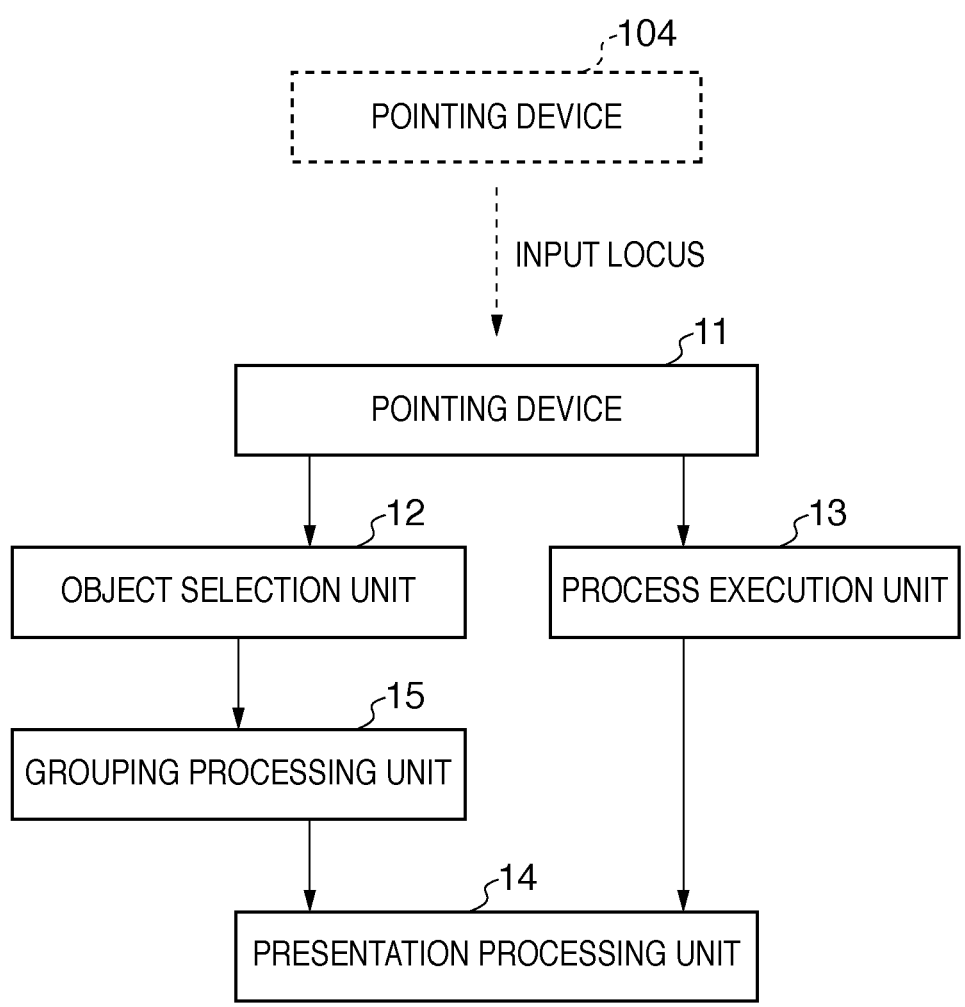
FIG. 10 is a block diagram showing an example of the functional arrangement implemented by the CPU 100 of the information processing apparatus 10 according to the third embodiment.

An example of the functional arrangement implemented by the CPU 100 of the information processing apparatus 10 according to the third embodiment will be described first with reference to FIG. 10. Note that some or all of these processing functions are implemented when the CPU executes programs (for example, a locus processing program) stored in the storage device 103 and the like.

The CPU 100 implements, as its functional units, a locus determination unit 11, object selection unit 12, process execution unit 13, presentation processing unit 14, and grouping processing unit 15. Note that the same reference numerals denote the processing units having the same functions as in FIG. 2 used to explain the first embodiment, and a description thereof will not be repeated.

In the third embodiment, the grouping processing unit 15 is newly added. When the locus determination unit 11 determines that the input locus is the first locus, the grouping processing unit 15 groups selected objects based on the shape of the input locus. The example of the functional arrangement implemented by the CPU 100 has been described.

The operations of the information processing apparatus 10 according to the third embodiment will be described below with reference to FIGS. 11 to 14. A selection method of photos as print targets and a setting method of setting the number of print sheets for the selected photos will be described first with reference to FIG. 11.

Figure 11:
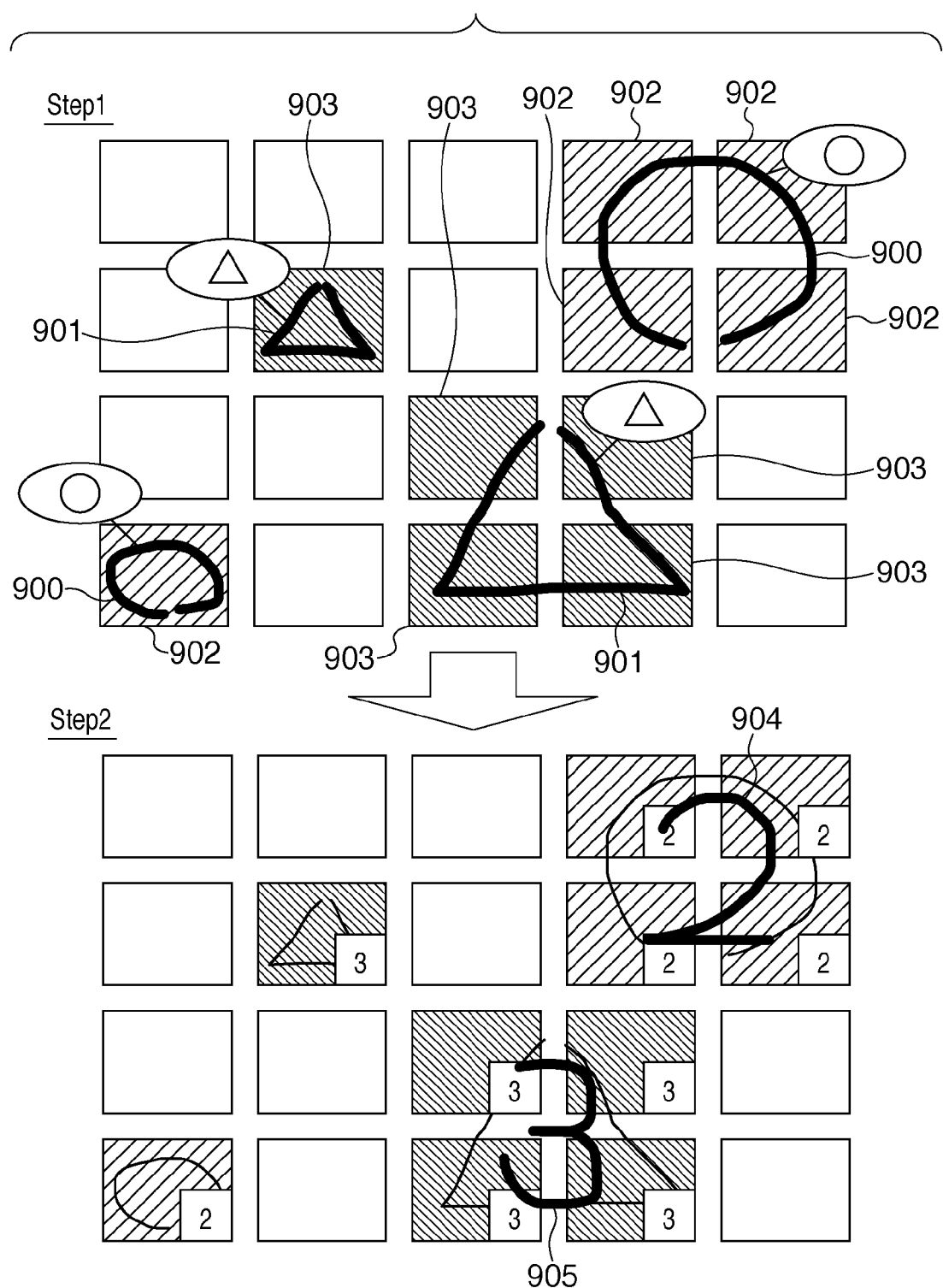
FIG. 11 is a view showing an example of overviews of a selection method of photos as print targets, and a setting method of setting the number of print sheets for the selected photos.

Each individual rectangle indicates a photo thumbnail. In this embodiment, when the user wants to set the number of print sheets different from that of other photos, he or she selects target photos by drawing a locus having a different shape. In FIG. 11, the user draws loci 900 having a "○ (circular)" shape, and loci 901 having a "Δ (triangular)" shape. Photos are selected while being classified into a "○" group and "Δ" group in correspondence with these photo selection loci. In this case, rectangles 902 indicate photos which belong to the "○" group, and rectangles 903 indicate photos which belong to the "Δ" group. The user draws a numeral "2" in the vicinity of each locus having the "○" shape, as denoted by reference numeral 904, and a numeral "3" in the vicinity of each locus having the "Δ" shape, as denoted by reference numeral 905. In this way, the number of print sheets is set for respective input loci having the similar shape (i.e., for each group). That is, "2" is set as the number of print sheets of photos of the "○" group, and "3" is set as the number of print sheets of photos of the "Δ" group.

Note that the user draws number of print sheets designation loci 904 and 905 near the centers of the photo selection loci to associate groups with the number of print sheets designation loci in FIG. 11. However, the two loci need only be located within a predetermined distance range, and the number of print sheets designation loci need not always be drawn at the positions shown in FIG. 11.

Figure 12:
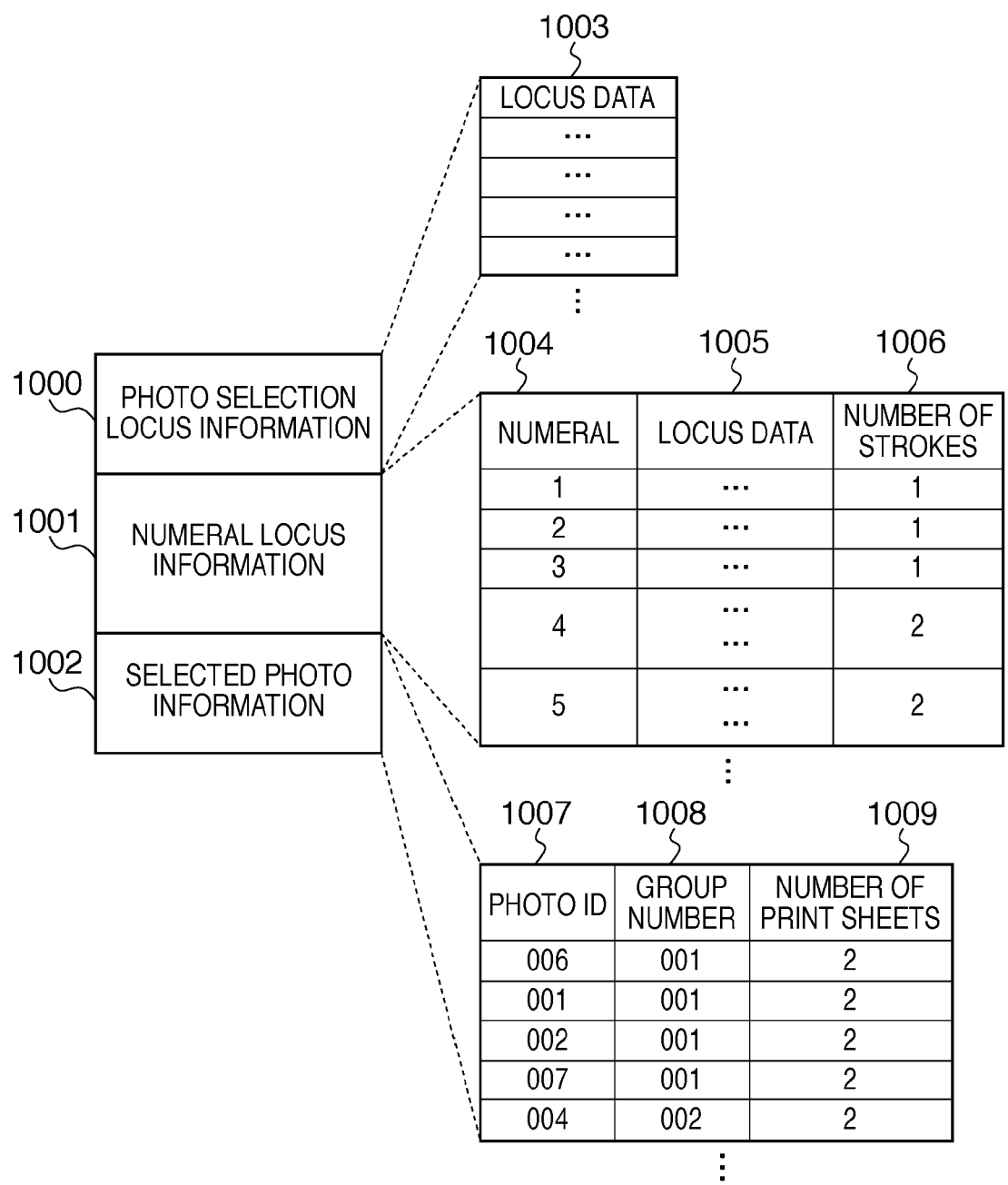
FIG. 12 is a view showing an example of data stored in the RAM 102 according to the third embodiment.

FIG. 12 is a view showing an example of data stored in the RAM 102 according to the third embodiment.

Most of data stored in the RAM 102 are the same as those in the first embodiment, but selected photo information 1002 is different from the first embodiment. More specifically, the selected photo information 1002 includes a field that stores a group number 1008 indicating the group number of a photo in correspondence with a photo ID 1007 and its number of print sheets 1009.

Figure 13:
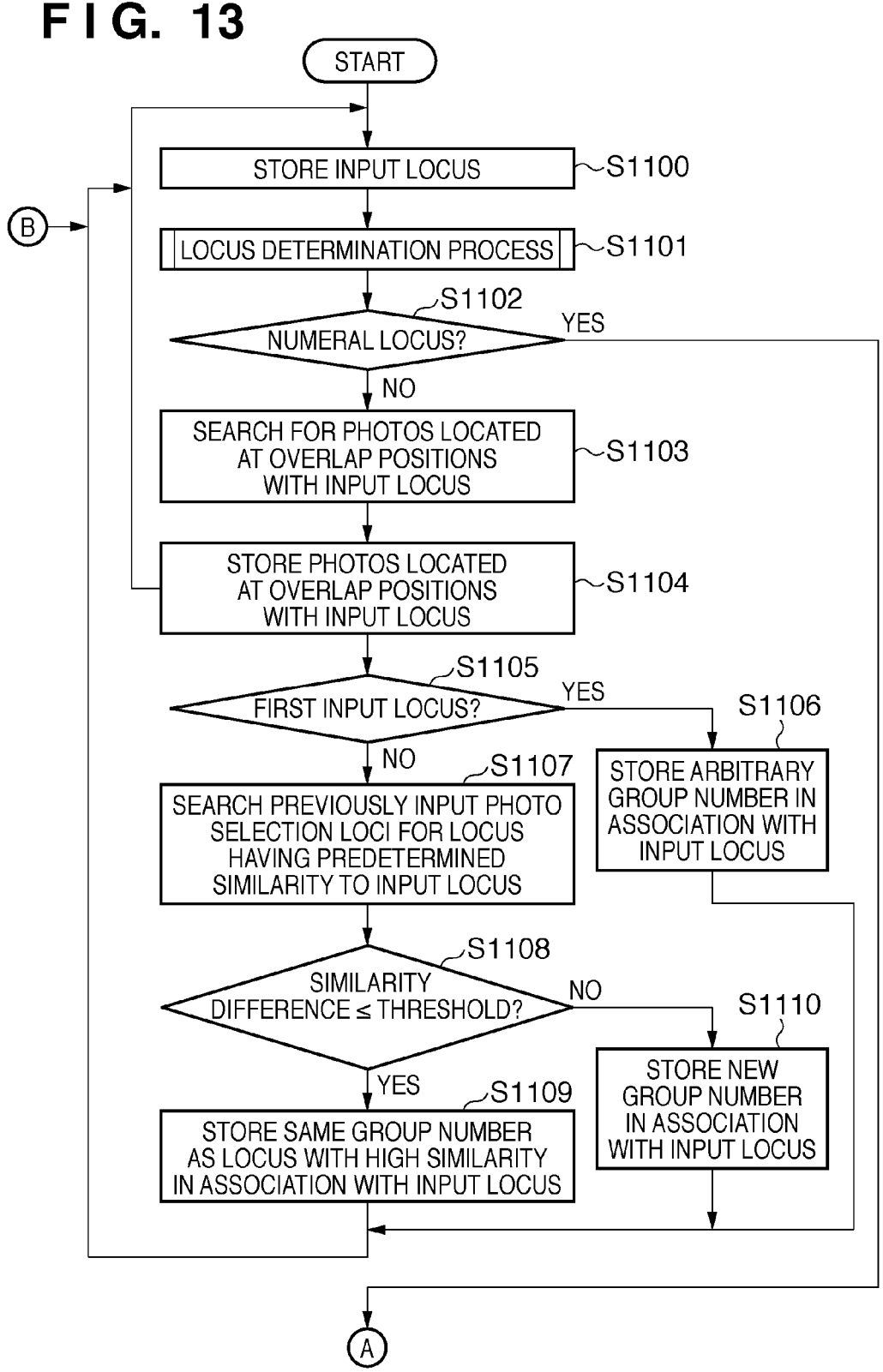
FIG. 13 is a first flowchart showing an example of the sequence of the overall processing in the information processing apparatus 10 according to the third embodiment.

An example of the sequence of the overall processing in the information processing apparatus 10 according to the third embodiment will be described below with reference to FIGS. 13 and 14. Processes executed when the user inputs a locus of coordinates will be described.

After this process starts, the information processing apparatus 10 stores locus data input by the user using the pointing device in the RAM 102 (S1100). The locus determination unit 11 compares the input locus with the predetermined second locus (in this case, a numeral locus) to determine if the two loci match (S1101). This locus determination process is the same as that in FIG. 6 used to explain the first embodiment, and a description thereof will not be repeated.

As a result of determination, if the input locus does not match the second locus (NO in S1102), the information processing apparatus 10 recognizes that the first locus is input. Then, the object selection unit 12 searches for photos that overlap the input locus (S1103), and stores the IDs of photos that overlap the input locus in the RAM 102 (S1104).

After that, the information processing apparatus 10 controls the grouping processing unit 15 to determine if the input locus is the first input locus. This determination is done based on information stored in the selected photo information 1002 in the RAM 102. If the input locus is the first input locus (YES in S1105), the information processing apparatus 10 controls the grouping processing unit 15 to assign an arbitrary group number to the photos selected by the current input locus (S1106). This information is stored in the selected photo information 1002 in the RAM 102 as the group number. If the input locus is not the first input locus (NO in S1105), the information processing apparatus 10 controls the grouping processing unit 15 to search the previously input photo locus shapes for a locus having a predetermined similarity to the input locus stored in step S1100 (S1107). This search is made based on information stored in the photo selection locus information 1000 in the RAM 102. Note that a locus having a predetermined similarity may be either the locus of a shape having a highest similarity or that of a shape having a given similarity or higher.

If a locus having a high similarity is detected, the information processing apparatus 10 controls the grouping processing unit 15 to determine if the difference between the similarities of the detected locus and the input locus stored in step S1100 is equal to or smaller than a predetermined threshold. If the difference is equal to or smaller than the threshold (YES in S1108), the information processing apparatus 10 controls the grouping processing unit 15 to assign the same group number as that for photos of the locus detected in step S1107 to the photos selected by the current input locus (S1109). On the other hand, if the similarity difference exceeds the threshold (NO in S1108), the information processing apparatus 10 controls the grouping processing unit 15 to assign a number different from all group numbers assigned so far to the photos selected by the current input locus (S1110). This information is stored in the selected photo information 1002 in the RAM 102 as a group number.

Figure 14:
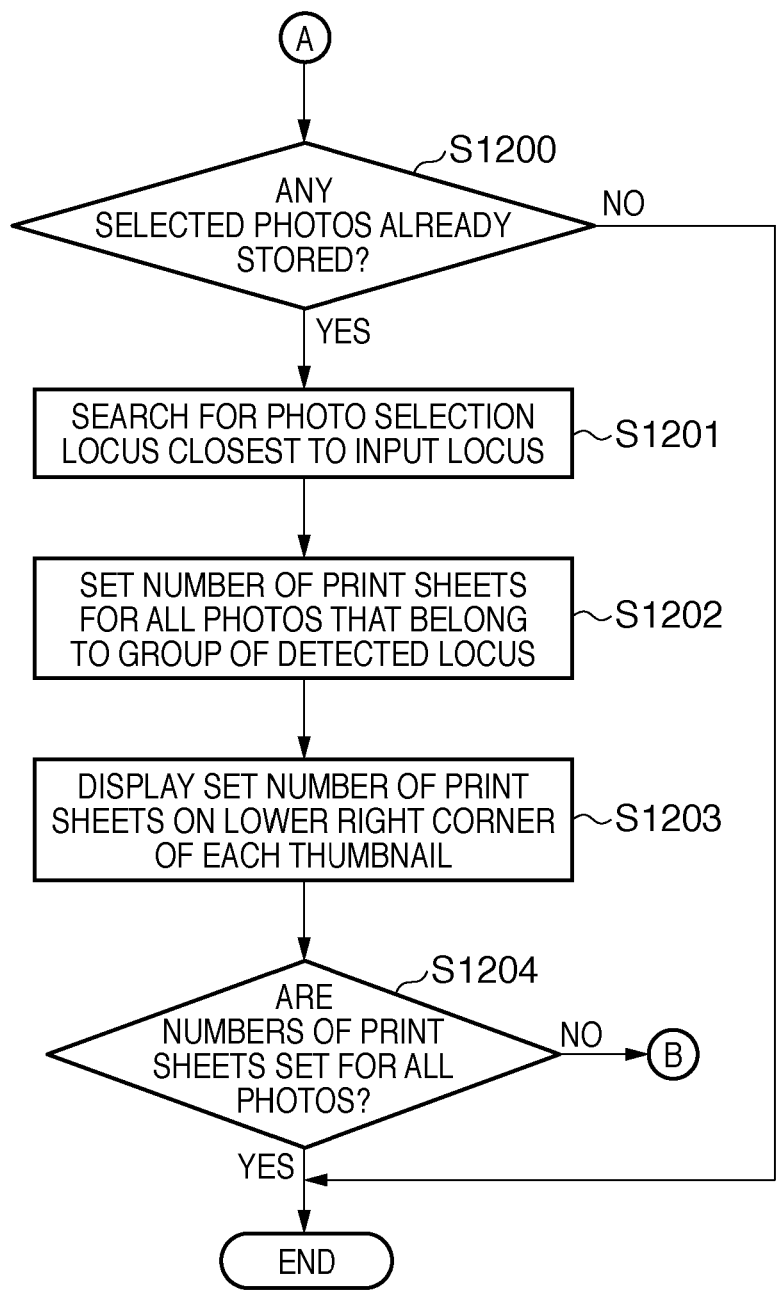
FIG. 14 is a second flowchart showing an example of the sequence of the overall processing in the information processing apparatus 10 according to the third embodiment.

As a result of determination in step S1102, if the input locus matches the second locus (YES in S1102), the process jumps to FIG. 14, and the information processing apparatus 10 determines if any selected photos are already stored (S1200). If no selected photo is stored (NO in S1200), this processing sequence ends. If already selected photos are stored (YES in S1200), the information processing apparatus 10 controls the process execution unit 13 to search for a photo selection locus closest to the input locus (S1201). As this search method, the barycentric positions may be respectively calculated from locus data of number of print sheets designation loci and photo selection loci stored in the RAM 102, and the distances between the barycenters of the loci may be calculated. However, the search method is not particularly limited as long as the distance between loci can be specified.

After that, the information processing apparatus 10 controls the process execution unit 13 to set a numeral based on the input locus stored in step S1100 as the number of print sheets for the photos which belong to a group selected by the detected locus (S1202). The information processing apparatus 10 controls the presentation processing unit 14 to present the number of print sheets to the user (S1203).

After that, in the embodiments described so far, the processing sequence ends. However, in the third embodiment, since a locus input from the user is accepted until the numbers of print sheets are designated for all the groups (NO in S1204), the process returns to step S1100 again.

Note that in step S1201 described above, the process for searching for a photo selection locus closest to the input locus (number of print sheets designation locus) and associating them with each other is executed. However, this process may use methods other than the aforementioned method. For example, a method of searching for all photo selection loci located with a predetermined distance range from the input locus, and setting the number of print sheets for them may be used. Alternatively, a method of searching for all photo selection loci which overlap the input locus, and setting the number of print sheets for them may be used. In both the methods, the search process is executed using locus data (coordinates) of loci stored in the RAM 102. As can be apparent from the above description, the number of selection loci to be associated with a process locus is not limited to one, and the process locus may be associated with a plurality of selection loci depending on embodiments and required specifications.

As described above, according to the third embodiment, objects are grouped in correspondence with the shapes of first loci, and a process corresponding to a second locus is selectively executed for objects which belong to each group. In this way, since the operability can be further improved, the number of operation steps and an operation time required for the user at the time of coordinate input operations can be reduced.

Fourth Embodiment

The fourth embodiment will be described below. The fourth embodiment will exemplify a case in which selection of only a specific photo is canceled from an already selected photo group. Note that the arrangement of the information processing apparatus 10 according to the fourth embodiment is the same as the first embodiment, and a description thereof will not be repeated.

Figure 16:
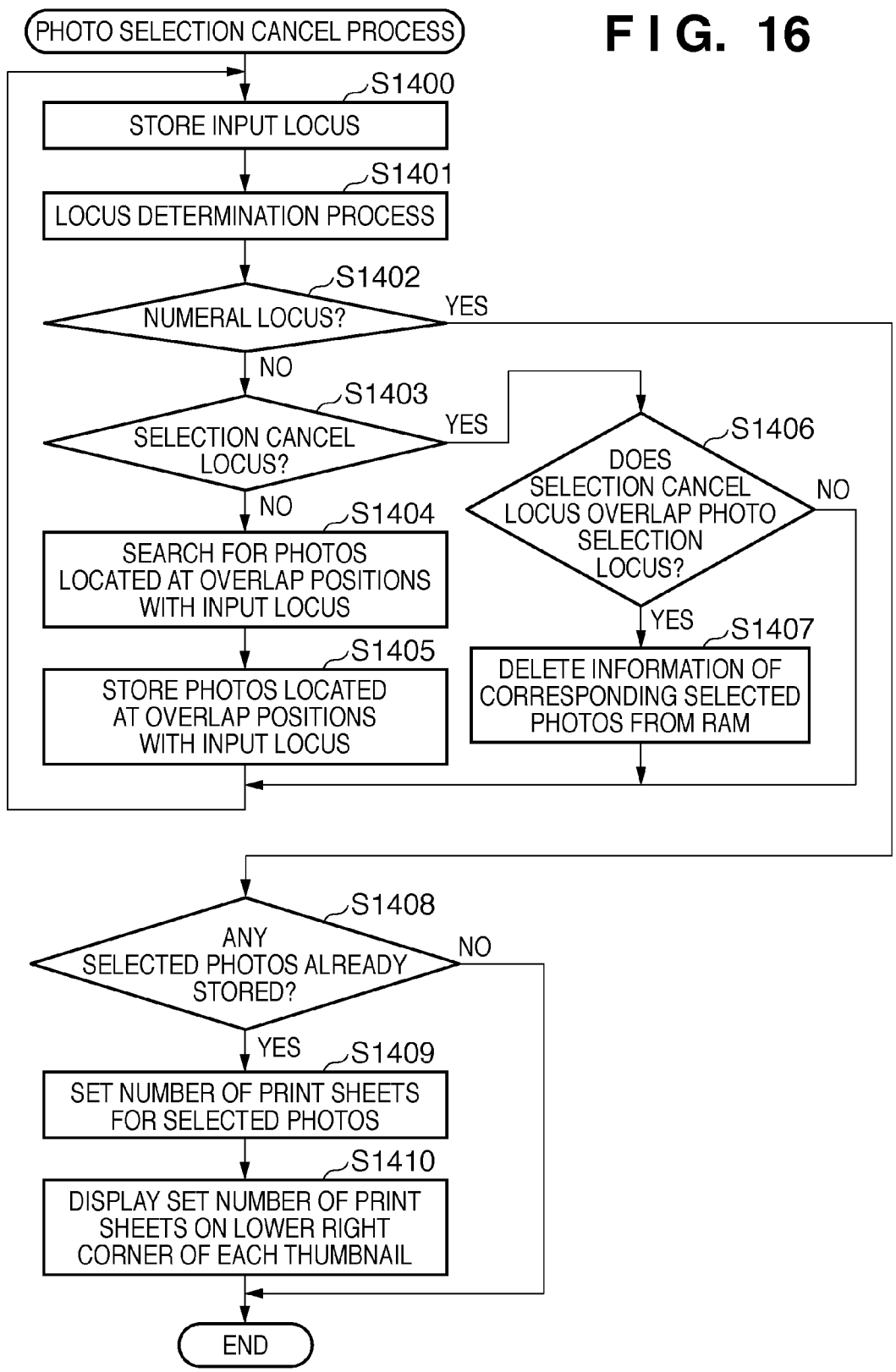
FIG. 16 is a flowchart showing an example of the sequence of the overall processing in the information processing apparatus 10 according to the fourth embodiment.
Figure 17:
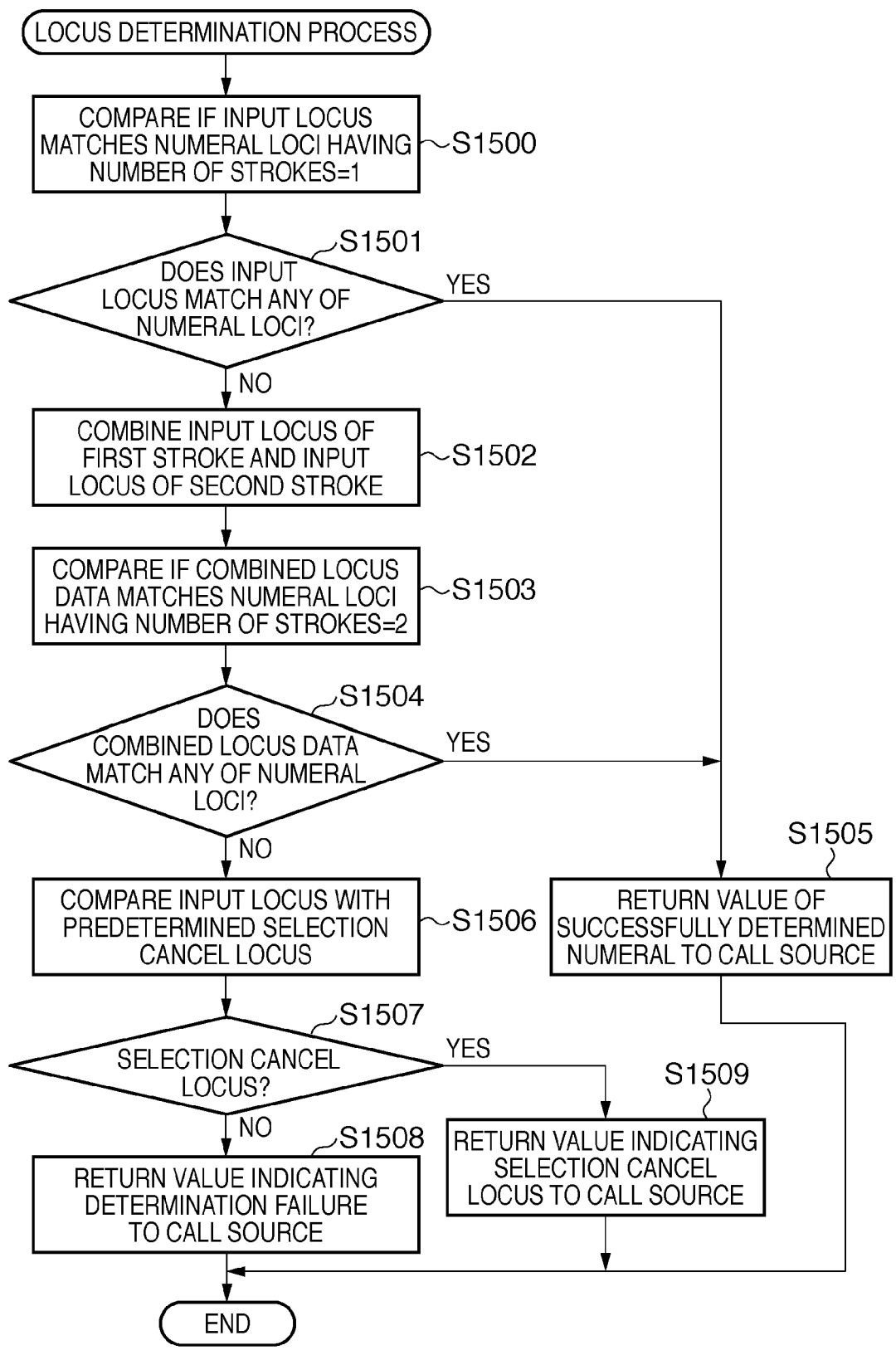
FIG. 17 is a flowchart showing an example of the sequence of a locus determination process shown in step S1401 in FIG. 16.

The operations of the information processing apparatus 10 according to the fourth embodiment will be described below with reference to FIGS. 15 to 17. A selection method of photos as print targets will be described first with reference to FIG. 15.

Each individual rectangle indicates a photo thumbnail. Rectangles 1300 are already selected photo thumbnails. Photo selection loci are loci 1301 to 1303. A case will be examined below wherein the user wants to cancel selection of photos corresponding to the photo selection locus 1302. In the fourth embodiment, when the user draws a third locus (to be referred to as a selection cancel locus hereinafter) 1304 on the photo selection locus 1302, selected photos corresponding to the photo selection locus 1302 can be canceled, as denoted by reference numeral 1305.

Figure 15:
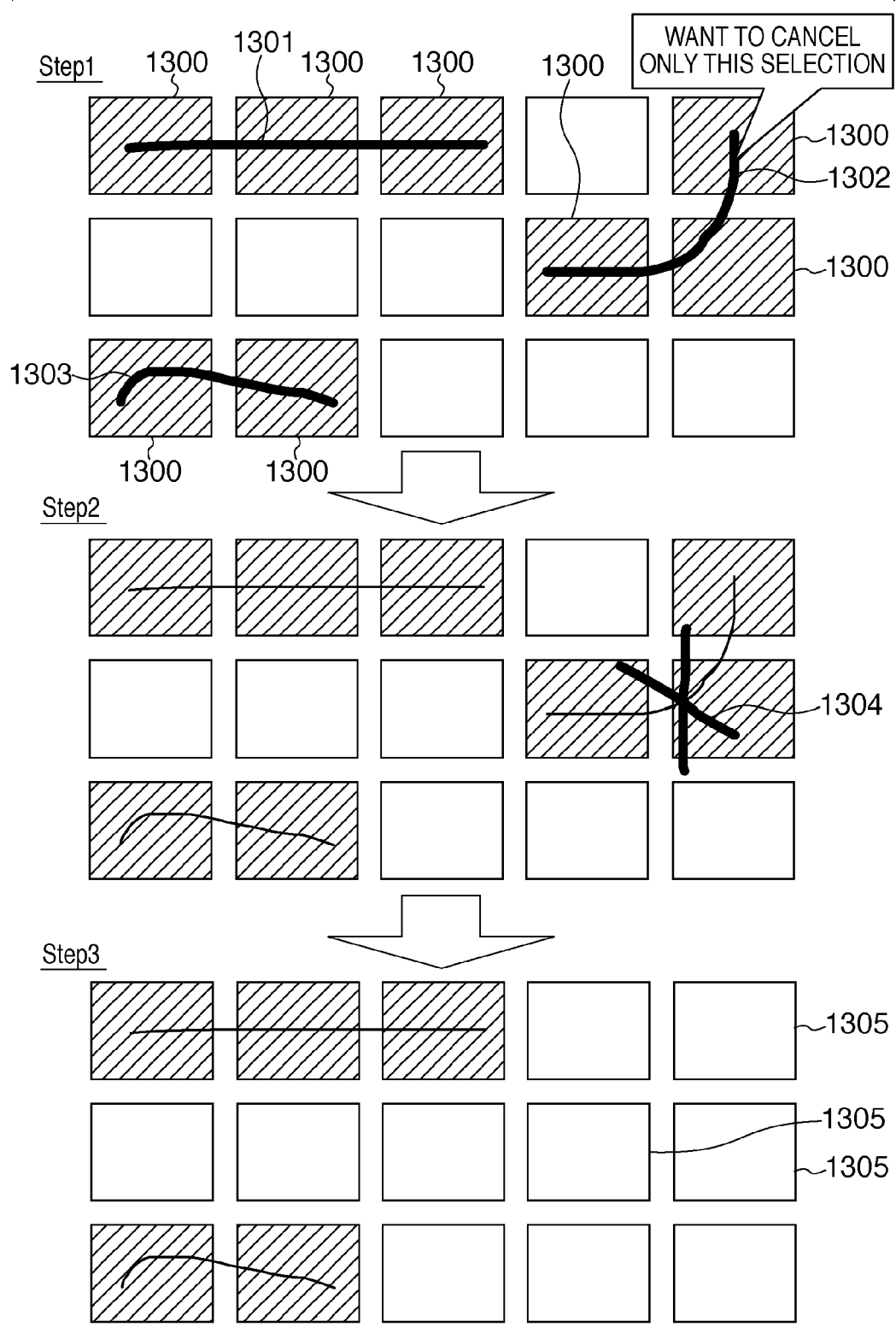
FIG. 15 is a view showing an example of an overview of a selection method of photos as print targets.

Note that the shape of the selection cancel locus shown in FIG. 15 is "X (cross)". However, the present invention is not particularly limited to such specific shape. Information of the selection cancel locus is stored in the RAM 102 in the same manner as respective numeral loci. The selection cancel locus and photo selection locus are required to be associated with each other. This association process may use the method used in association between the respective groups and the number of print sheets designation loci as in the third embodiment. The fourth embodiment will explain a case in which a photo selection locus that overlaps the selection cancel locus is canceled.

An example of the sequence of the overall processing in the information processing apparatus 10 according to the fourth embodiment will be described below with reference to FIG. 16. In this case, the processes executed when the user inputs a locus of coordinates will be explained.

After this process starts, the information processing apparatus 10 stores locus data input by the user using the pointing device in the RAM 102 (S1400). The locus determination unit 11 compares the input locus with the predetermined second locus (in this case, a numeral locus) to determine if the two loci match (S1401). This locus determination process will be described later.

As a result of determination, if the input locus matches the second locus (YES in S1402), the subsequent processes are the same as those in the first embodiment, and a description thereof will not be repeated. If the input locus does not match the second locus (NO in S1402), the information processing apparatus 10 controls the locus determination unit 11 to compare the input locus with the predetermined third locus (i.e., a selection cancel locus) and to determine if these two loci match.

If the input locus is not a selection cancel locus (NO in S1403), the information processing apparatus 10 recognizes that the first locus is input, and the same processes as in the first embodiment are then executed (S1404 and S1405). On the other hand, if the input locus is the selection cancel locus (YES in S1403), the information processing apparatus 10 determines if that locus overlaps any of photo selection loci input so far. This determination may be done using locus data (coordinates) of loci stored in the RAM 102.

As a result of determination, if the locus does not overlap any locus (NO in S1406), the process returns to step S1400 again, and the information processing apparatus 10 accepts a locus input from the user. If the locus overlaps any of the photo selection loci (YES in S1406), the information processing apparatus 10 deletes information of selected photos corresponding to that locus from the RAM 102 (S1407). The process then returns to step S1400 again, and the information processing apparatus 10 accepts a locus input from the user.

Details of the locus determination process in step S1401 in FIG. 16 will be described below with reference to FIG. 17. Note that only differences from the locus determination process shown in FIG. 6 described in the first embodiment will be explained. In the locus determination process according to the fourth embodiment, processes after comparison with all numeral loci fails are different from the first embodiment. That is, processes after step S1506 are different.

In the process of step S1504, if the input locus does not match any of numeral loci (NO in S1504), the information processing apparatus 10 compares the input locus with the predetermined selection cancel locus (S1506). As a result, if the input locus is not the selection cancel locus (NO in S1507), the information processing apparatus 10 returns a value indicating a determination failure to a call source (S1508), thus ending this processing sequence. If the input locus is the selection cancel locus (YES in S1507), the information processing apparatus 10 returns a value indicating the selection cancel locus to a call source (S1509), thus ending this processing sequence.

As described above, according to the fourth embodiment, selection of selected objects can be canceled. In this way, since the operability can be further improved, the number of operation steps and an operation time required for the user at the time of coordinate input operations can be reduced.

Figure 18A:
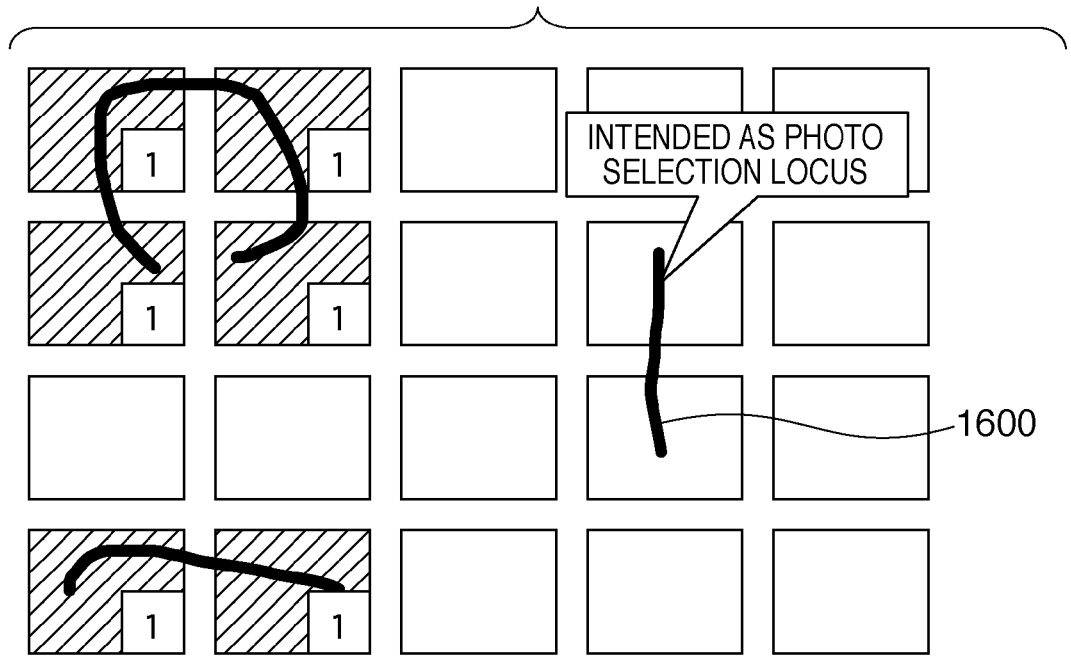
FIGS. 18A and 18B are first views showing an example of an overview of the fifth embodiment.

Fifth Embodiment (a) When a locus drawn by the user as a first locus is accidentally similar to a second locus, a recognition error may occur. For example, when the user inputs a locus 1600 having a vertical line shape as a photo selection locus, as shown in FIG. 18A, that locus may be recognized as a numeral "1", and the number of print sheets setting process may be executed.

Figure 18B:
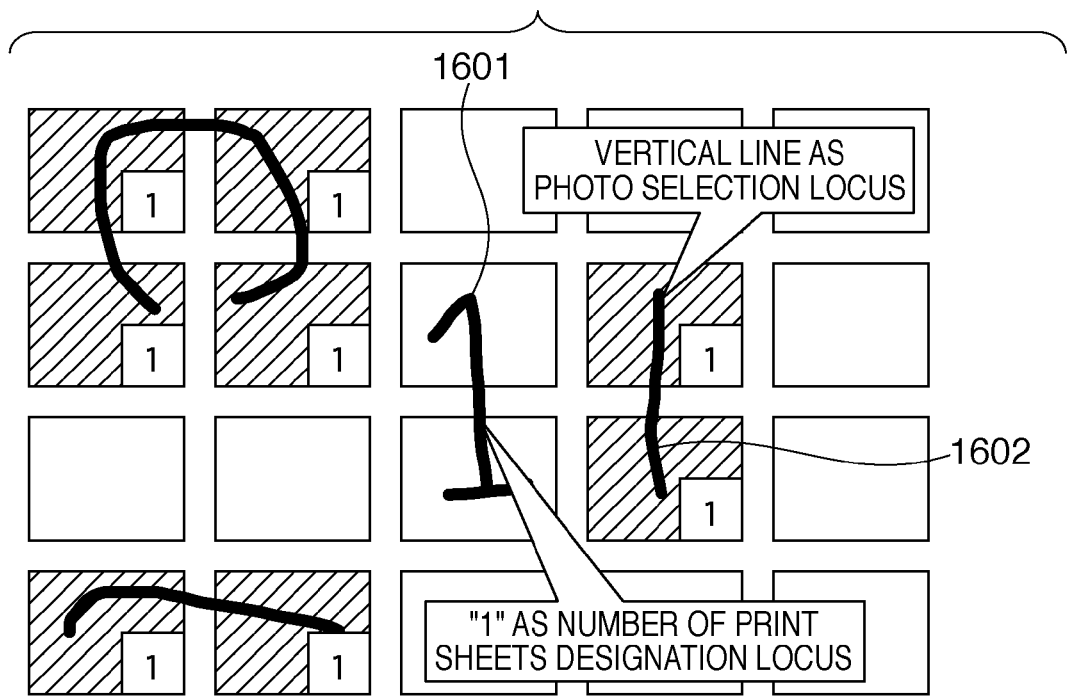

In such case, a device that inhibits the locus of a simple shape that readily causes a recognition error from being set upon setting a number of print sheets designation locus in advance may be taken. For example, in the current example, upon setting "1" as a number of print sheets designation locus, a character having ornaments at upper and lower portions is set in place of a simple vertical line, as denoted by reference numeral 1601 in FIG. 18B. With this setting, the possibility of a recognition error as a photo selection locus can be greatly reduced.

Figure 19:
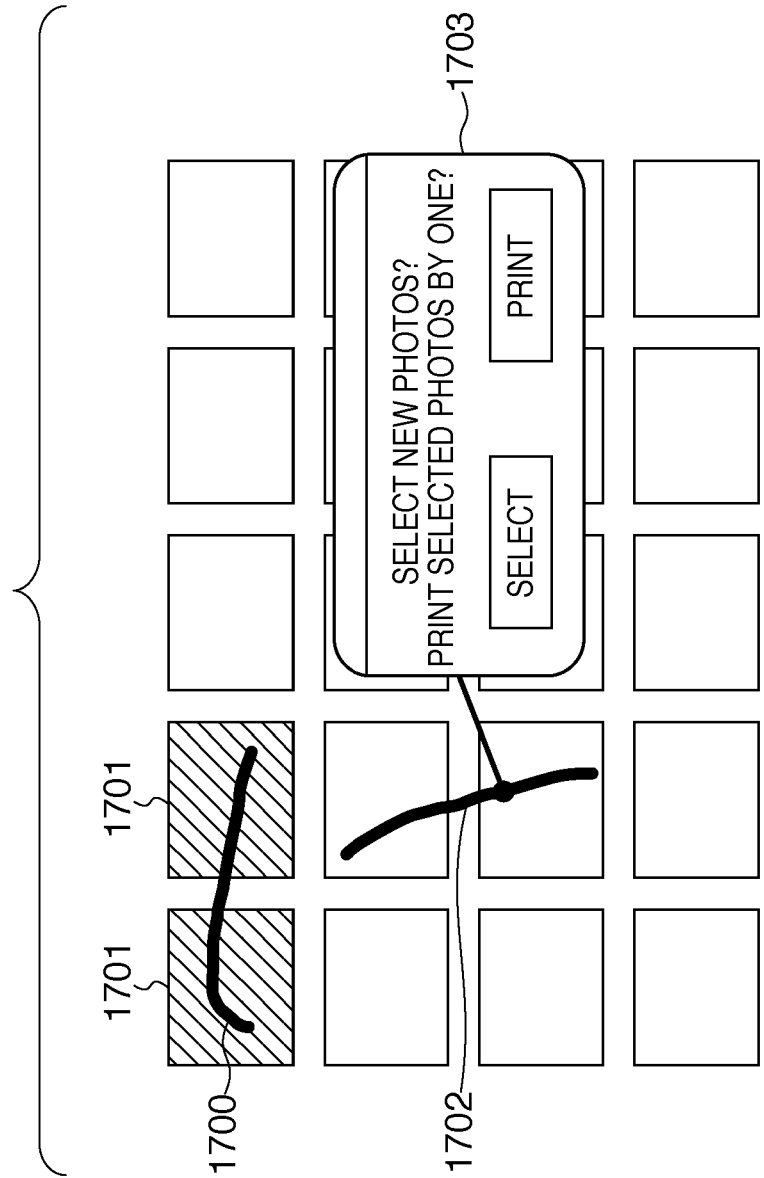
FIG. 19 is a second view showing an example of the overview of the fifth embodiment.

Alternatively, before execution of a wrong process, the user may be inquired about whether the input locus is the first or second locus. For example, assume that photos 1701 are selected by a photo selection locus 1700, as shown in FIG. 19. At this time, when the user inputs a locus 1702, it is difficult to determine whether the user wants to set "1" as the number of print sheets of the already selected photos 1701 or to select new photos. In such case, in the locus determination process, a threshold is set for a similarly upon identifying the input locus as the second locus. Then, for example, even when the input locus is identified as a numeral "1" (second locus), if the similarity between the input locus and the second locus stored in the RAM is smaller than the threshold, a dialog 1703 is displayed. This dialog prompts the user to make an input to indicate whether he or she wants to select photos or set the number of print sheets of photos. Then, the user makes selection as he or she intended.

Figure 20A:
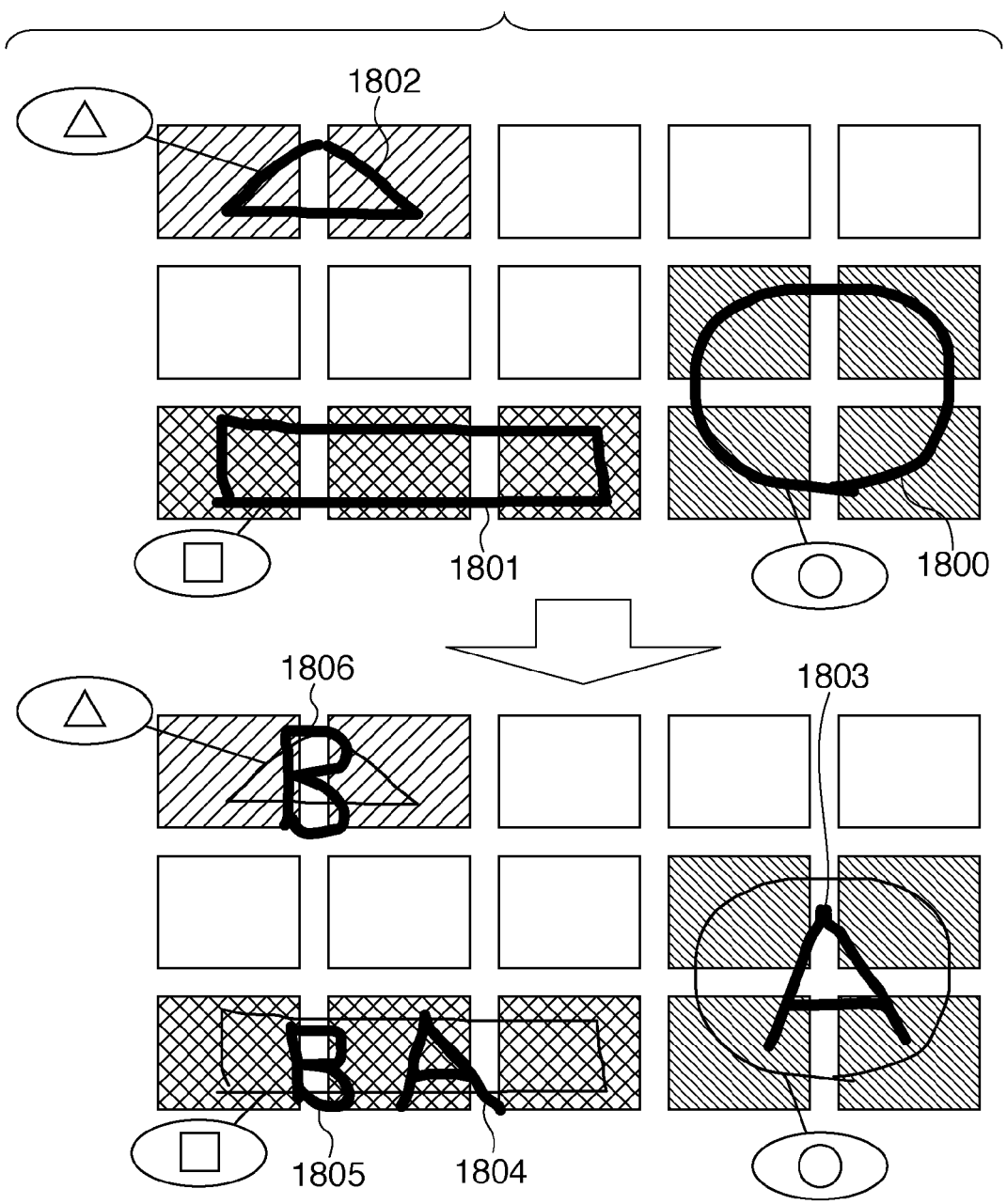
FIGS. 20A and 20B are third views showing an example of the overview of the fifth embodiment.
Figures 20B, 21:
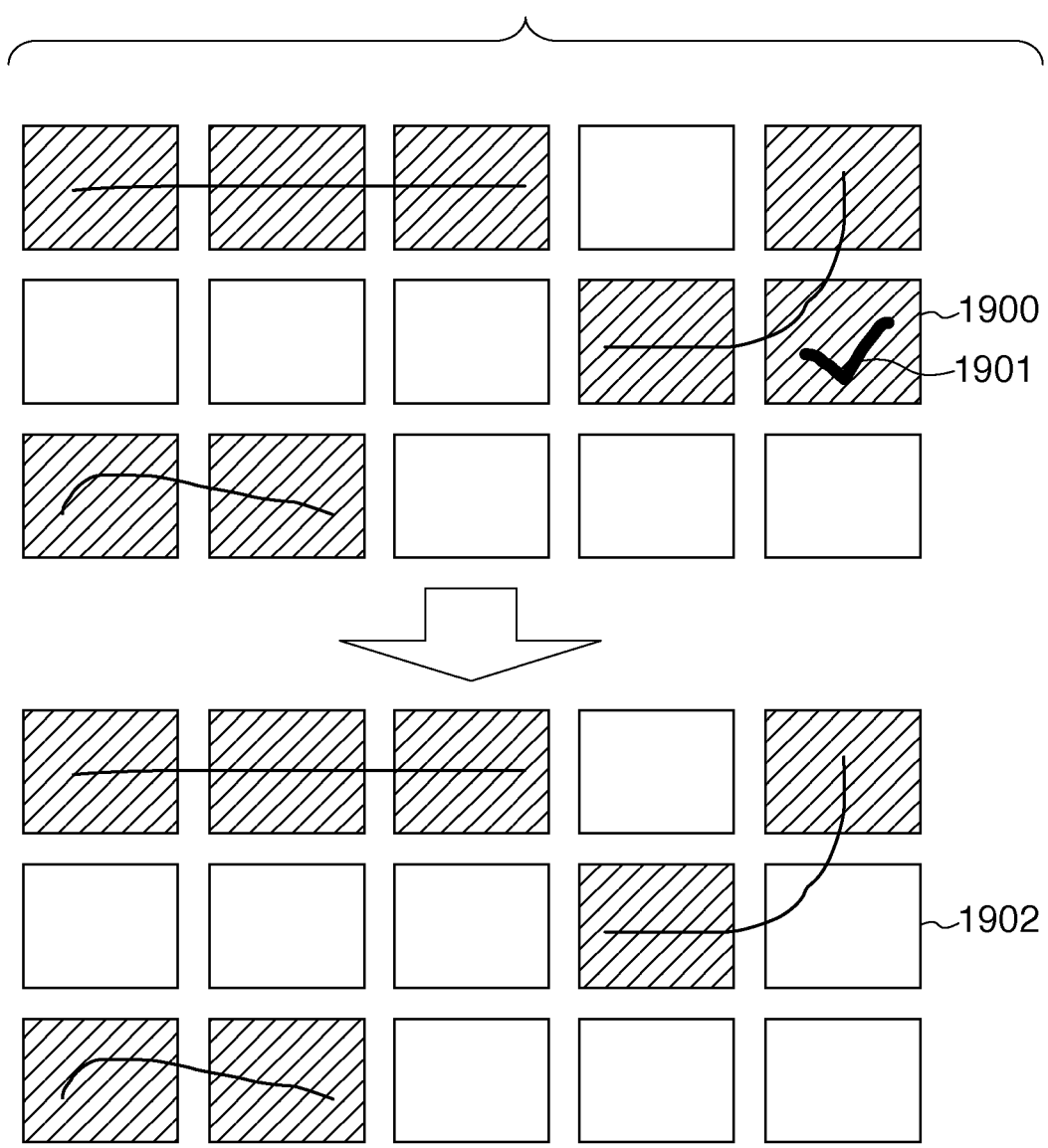
FIG. 21 is a fourth view showing an example of the overview of the fifth embodiment.

(b) The aforementioned third embodiment has explained the method of grouping photos depending on the shapes of photo selection loci, and designating the numbers of print sheets for respective groups. As an application example of this embodiment, an example of executing a process for assigning metadata to respective groups of selected photos is available. For example, the user inputs photo selection loci 1800 to 1802 to classify selected photos into three different groups, as shown in FIG. 20A. Then, the user draws second loci 1803 to 1806 that assign metadata, thus assigning the metadata to the photos which belong to the respective groups. In this example, metadata corresponding to the second locus "A" is assigned to photos of a "○ (circular)" group, metadata corresponding to the second locus "B" is assigned to photos of a "Δ (triangular)" group, and metadata corresponding to both the second loci "A" and "B" are assigned to photos of a "□ (rectangle)" group. Practical metadata include, for example, information of partners to whom the user wants to deliver photos by hand. In this case, the second loci "A" and "B" are required to be associated with the respective metadata. This association process may use a method of storing information of locus shapes and the contents of metadata in the RAM 102 in a table format, as shown in FIG. 20B. Note that this association process may be done either before photo selection or after the second loci are drawn with respect to photos.

(c) The aforementioned fourth embodiment has explained the method of canceling selection of photos corresponding to a specific photo selection locus from an already selected photo group. Now, an example of canceling selection of each photo will be explained in association with the above method. For example, a case will be examined below wherein when photos are selected, as shown in FIG. 21, the user wants to cancel selection of only one photo 1900. In this case, a selection cancel locus for a single photo is decided on in advance to have a shape 1901. Only when the user draws this locus on a specific selected photo, the process for canceling selection of that photo is executed. As a result, a photo selection cancel operation can be done in finer units.

Sixth Embodiment

Figure 22:
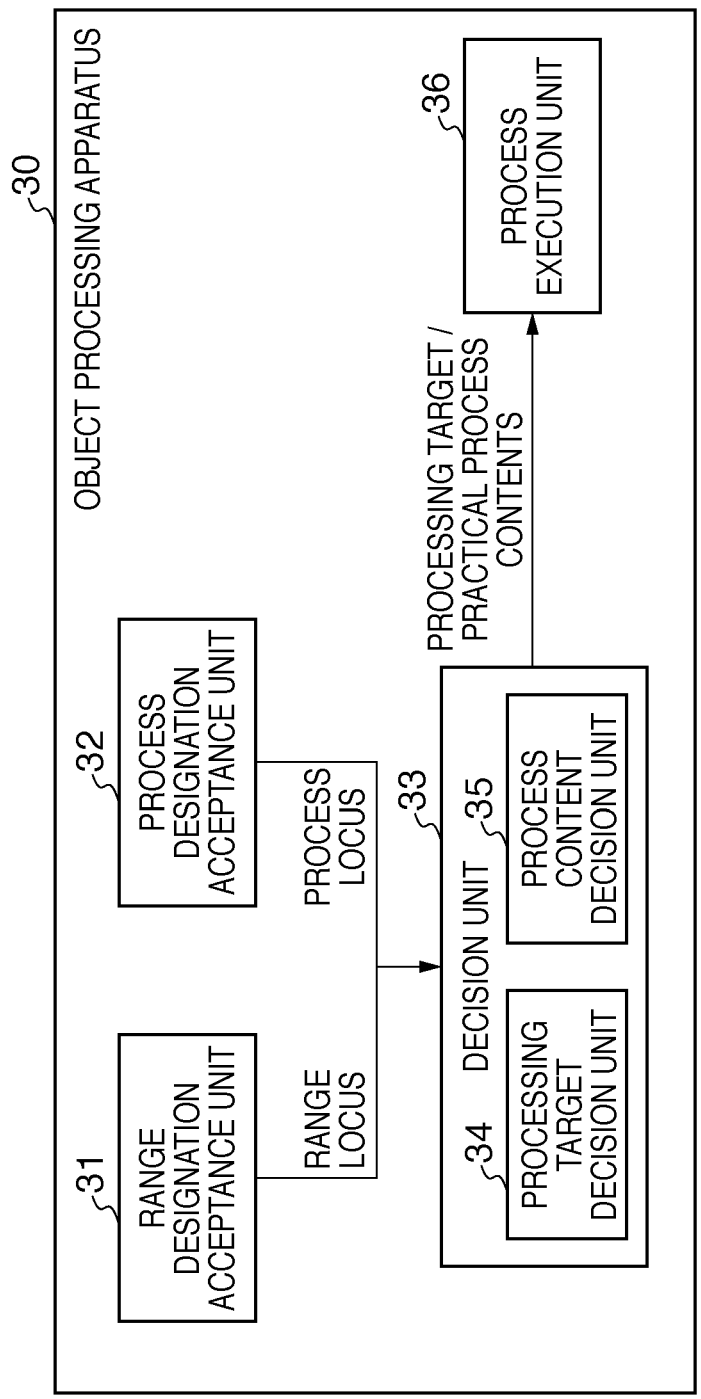
FIG. 22 is a block diagram showing an example of the arrangement of an object processing apparatus according to an embodiment of the present invention.

The Sixth embodiment will be described below. FIG. 22 is a block diagram showing an example of the arrangement of an object processing apparatus 30 to which the information processing apparatus according to the embodiment of the present invention is applied.

The object processing apparatus 30 has a coordinate input device outside or inside itself, accepts a user's handwritten input operation via the coordinate input device, and executes various kinds of processes based on the loci of the input coordinates.

The object processing apparatus 30 includes, as its functional units, a range designation acceptance unit 31, process designation acceptance unit 32, decision unit 33, and process execution unit 36.

The range designation acceptance unit 31 serves as a first acceptance unit which accepts input first coordinates. More specifically, the range designation acceptance unit 31 accepts input coordinates that designate objects as processing targets from a plurality of objects (digital data such as document data, image data, audio data, and movie data) displayed on a window.

The process designation acceptance unit 32 serves as a second acceptance unit which accepts input second coordinates. More specifically, the process designation acceptance unit 32 accepts input process contents to be executed for the objects as processing targets. The range designation acceptance unit 31 and process designation acceptance unit 32 accept inputs based on the loci of coordinates handwritten by the user via, for example, an input unit (an input unit 21 to be described later).

The decision unit 33 includes a processing target decision unit 34 which decides on objects as processing targets, and a process content decision unit 35 which decides on the process contents to be executed for the objects decided on as the processing targets. The processing target decision unit 34 and process content decision unit 35 make decisions based on at least one of the locus of coordinates accepted by the range designation acceptance unit 31, that of coordinates accepted by the process designation acceptance unit 32, and the positional relationship between the loci of those coordinates.

The process execution unit 36 executes a process decided on by the process content decision unit 35 to objects decided on as processing targets by the processing target decision unit 34. The example of the functional arrangement of the object processing apparatus 30 has been described.

Figure 23:
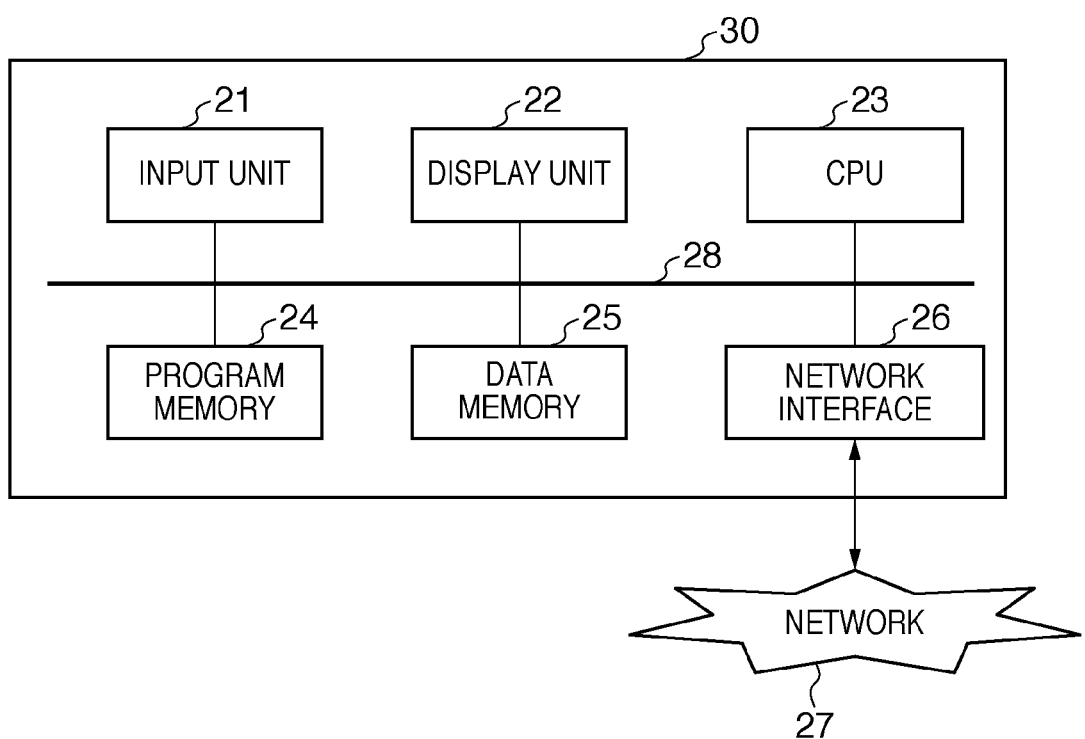
FIG. 23 is a block diagram showing an example of the hardware arrangement in an object processing apparatus 30 shown in FIG. 22.

FIG. 23 is a block diagram showing an example of the hardware arrangement of the object processing apparatus 30 shown in FIG. 22.

The object processing apparatus 30 includes, as its hardware components, an input unit 21, display unit 22, CPU 23, program memory 24, data memory 25, and network I/F (interface) 26.

The input unit 21 includes a coordinate input device (for example, a pressure sensitive device) that allows the user to input by means of a hand or stylus pen or a mouse, and inputs user's inputs into the apparatus. Note that this embodiment will mainly explain a case in which an input to the object processing apparatus 30 is made by a handwritten input using a stylus pen. However, the present invention is not limited to such specific input method. For example, a handwritten input using a finger or an input using a mouse may be used. That is, the input method is not particularly limited as long as it can input coordinate data.

The display unit 22 includes, for example, a liquid crystal display, and displays various kinds of information to the user using a GUI (Graphical User Interface). Note that the input unit 21 and display unit 22 may be either independent devices or a single device like a touch panel display.

The CPU 23 controls respective components connected to a bus 28 by executing arithmetic operations, logic decisions, and the like. The program memory 24 is a storage area for storing programs, and the data memory 25 is a storage area for storing data and the like required for processes. Note that these memories may be allocated on a ROM (Read Only Memory) or a RAM (Random Access Memory) to which programs are loaded from, for example, an external storage device.

The network I/F 26 exchanges data with other devices connected via a network 27. Data to be handled by the object processing apparatus 30 may be those stored in other devices connected via the network 27.

FIG. 24 is a view showing an example of an image list window displayed on the display unit 22 of the object processing apparatus 30 shown in FIG. 22.

An image list window 3300 includes a plurality of (in this case, 20) image data 3301, 3302, . . . , 3320, page switch buttons 3321 and 3322 used to give the instruction to switch a page, and a print button 3323 used to give the instruction to print image data.

Simultaneously with display of the image list window, the object processing apparatus 30 accepts a handwritten input by a stylus pen. After this window is displayed, for example, the user sets the number of print sheets of image data by a handwritten input. Also, for example, the user switches a window page by pressing the page switching button 3321 or 3322 by a handwritten input. Furthermore, for example, the user prints image data by pressing the print button 3323 by a handwritten input.

An example of the sequence of processing in the object processing apparatus 30 shown in FIG. 22 will be described below with reference to FIG. 25. Note that this process is implemented when the CPU 23 executes, for example, a processing program stored in the program memory 24 shown in FIG. 23.

After this process starts, the object processing apparatus 30 controls the range designation acceptance unit 31 and process designation acceptance unit 32 to accept information indicating loci of coordinates handwritten by the user via the input unit (S41). The range designation acceptance unit 31 accepts input coordinates used to designate objects as processing targets, and outputs a first locus (to be referred to as a range locus hereinafter) to the decision unit 33 based on the accepted coordinates. The process designation acceptance unit 32 accepts input coordinates of process contents to be executed for the objects as the processing targets, and outputs a second locus (to be referred to as a process locus hereinafter) to the decision unit 33 based on the accepted coordinates.

The object processing apparatus 30 controls the processing target decision unit 34 and process content decision unit 35 to decide on image data as processing targets and the process contents to be executed for these image data based on the loci of coordinates accepted in step S41 (S42).

Finally, the object processing apparatus 30 controls the process execution unit 36 to execute the process decided on in step S42 with respect to the image data decided on in step S42 (S43).

Details of the locus acceptance process in step S41 in FIG. 25 will be described below with reference to FIG. 26.

After this process starts, the object processing apparatus 30 controls the range designation acceptance unit 31 to accept an input range used to designate objects as processing targets from those displayed on the window (S51). Note that this input range is accepted based on the locus of coordinates handwritten by the user, as described above.

The object processing apparatus 30 then controls the process designation acceptance unit 32 to accept input process contents for the objects as the processing targets (S52). Note that the input process contents are accepted based on the locus of coordinates handwritten by the user, as described above.

Figure 27:
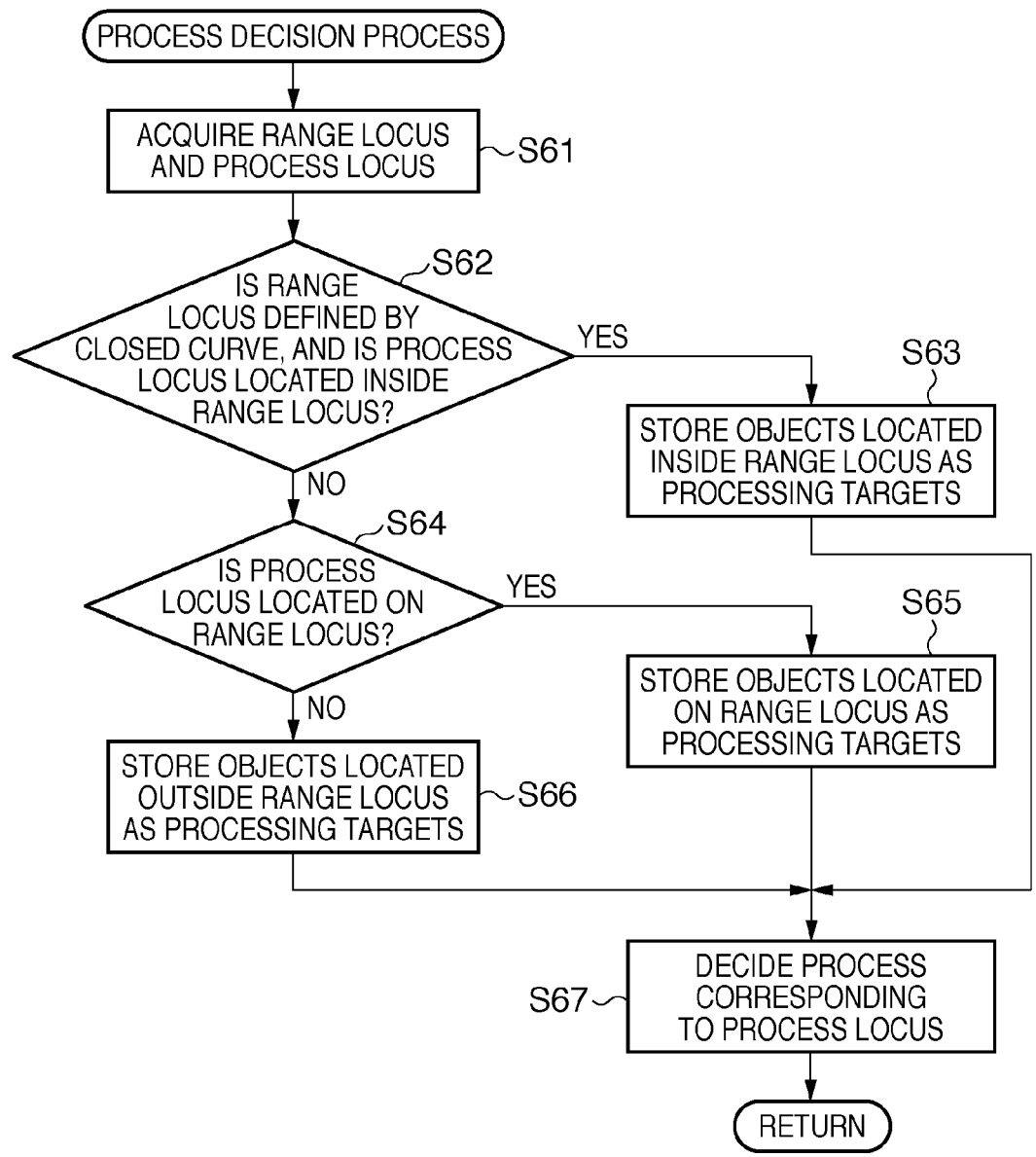
FIG. 27 is a flowchart showing an example of the sequence of a process decision process in step S42 in FIG. 25.

Details of the process decision process in step S42 in FIG. 25 will be described below with reference to FIG. 27.

Figure 25:
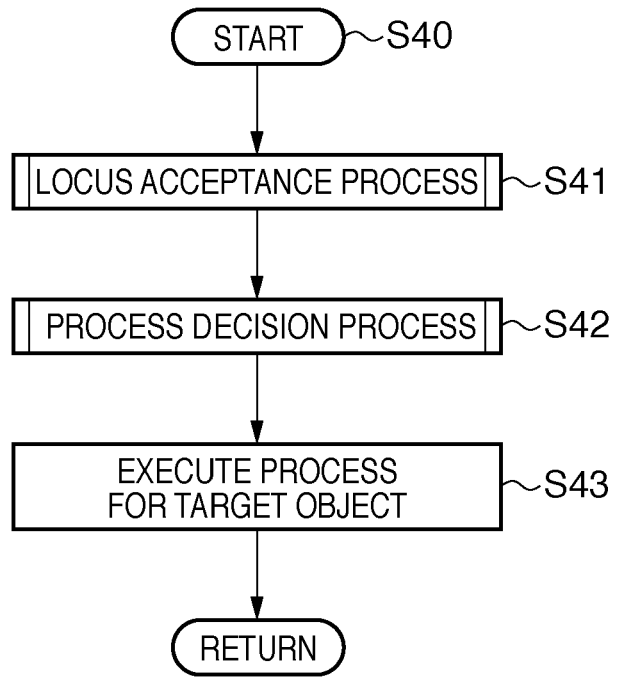
FIG. 25 is a flowchart showing an example of the sequence of processing in the object processing apparatus 30 shown in FIG. 22.
Figure 26:
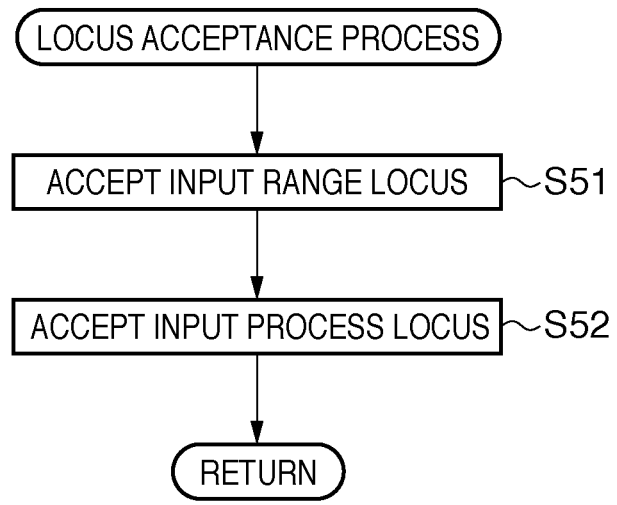
FIG. 26 is a flowchart showing an example of the sequence of a locus acceptance process in step S41 in FIG. 25.

After this process starts, the object processing apparatus 30 controls the decision unit 33 to acquire the range locus and process locus accepted in the locus acceptance process in step S41 in FIG. 25 (S61).

Figure 28:
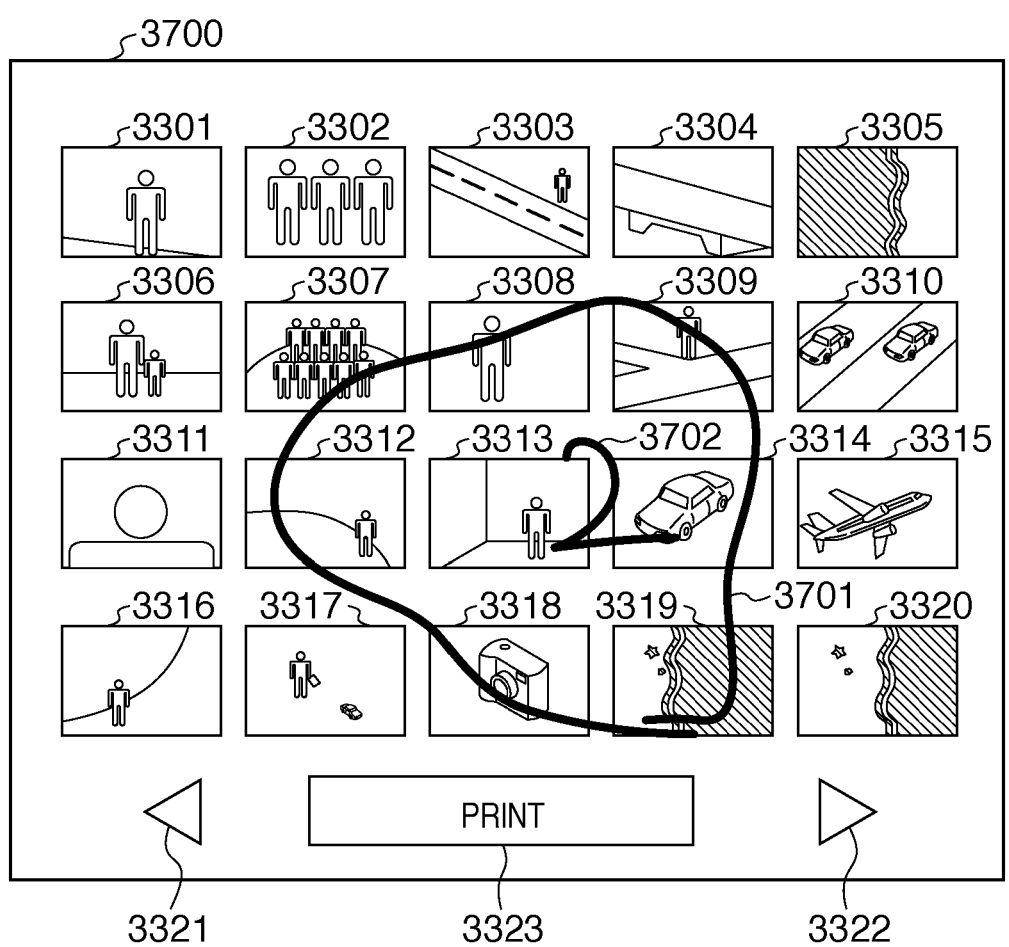
FIG. 28 is a second view showing an example of the image list window.

The object processing apparatus 30 then controls the processing target decision unit 34 to determine whether or not the acquired range locus is defined by a closed curve, and the process locus is located inside the range locus. This process will be described in detail below with reference to FIG. 28. FIG. 28 shows a state in which the user inputs a range locus 3701 and process locus 3702 on the image list window shown in FIG. 24. In this case, since the user draws the process locus 3702 inside the range locus 3701 drawn using a closed curve, YES is determined in step S62, and the process advances to step S63. Even when the range locus is not defined by a closed curve, if the distance between the end points (start and terminal ends) of the locus is equal to or smaller than a value designated in advance, a locus that connects these end points may be determined as a closed curve.

As a result of determination, if the range locus is defined by the closed curve, and the process locus is located inside the range locus (YES in S62), the object processing apparatus 30 controls the processing target decision unit 34 to decide on objects as processing targets. More specifically, the processing target decision unit 34 defines an area inside the range locus drawn using the closed curve as a processing target area, and stores objects located within that area in the data memory 25 as processing targets (S63). For example, in case of FIG. 28, image data 3307, 3308, 3309, 3312, 3313, 3314, 3318, and 3319, which contact the range locus 3701 and are located inside the locus are stored in the data memory as processing targets. Note that the objects as the processing targets may be either only objects whose outer shapes are fully located within the range locus (i.e., objects which are entirely located within the range locus) or other objects. For example, only objects whose specific parts (for example, central points or barycenters) are included within the range locus may be selected as processing targets. Also, for example, only objects whose designated parts are included in the range may be selected as processing targets.

After that, the object processing apparatus 30 controls the process content decision unit 35 to decide on a process corresponding to the process locus (S67). For example, in case of FIG. 28, assume that the process corresponding to the process locus 3702 is a process for setting the number of print sheets of image data as processing targets to be "2". Then, as shown in FIG. 29, the process for setting the number of print sheets to be "2" is executed for the image data 3307, 3308, 3309, 3312, 3313, 3314, 3318, and 3319 as the processing target, and the number of print sheets 3801 is set.

Figure 30:
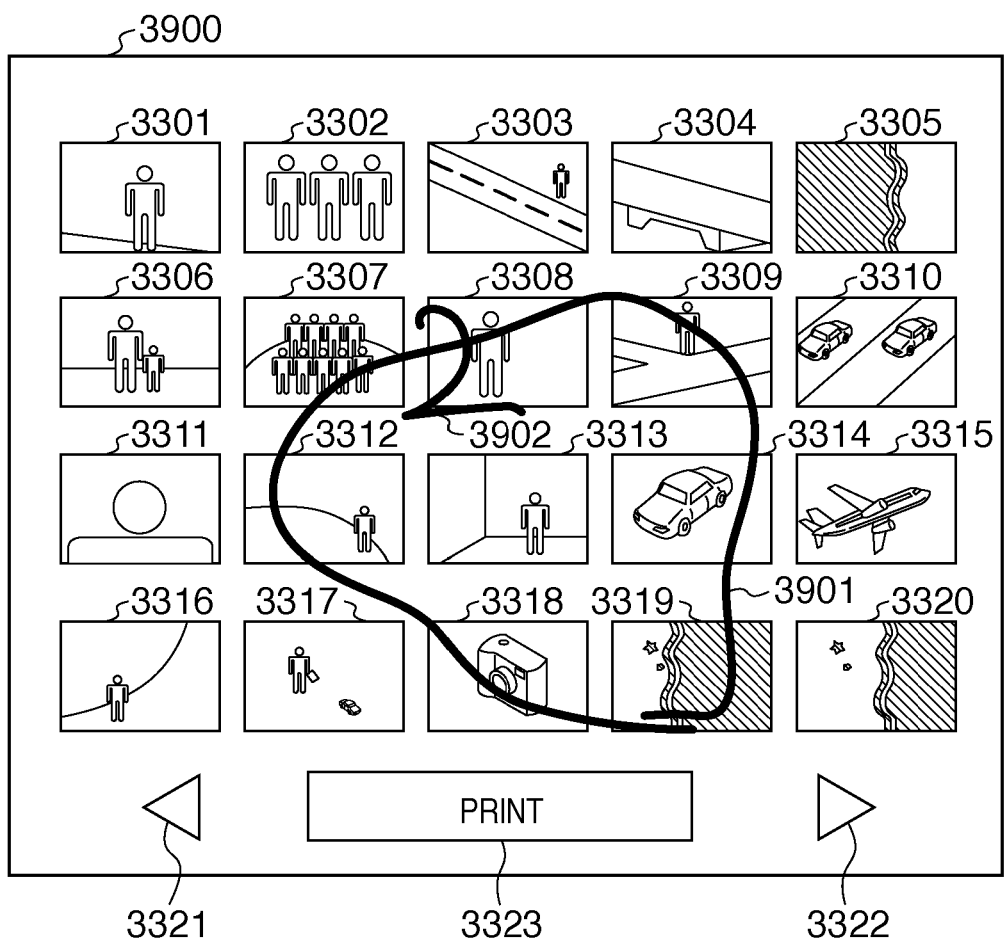
FIG. 30 is a fourth view showing an example of the image list window.
Figure 31:
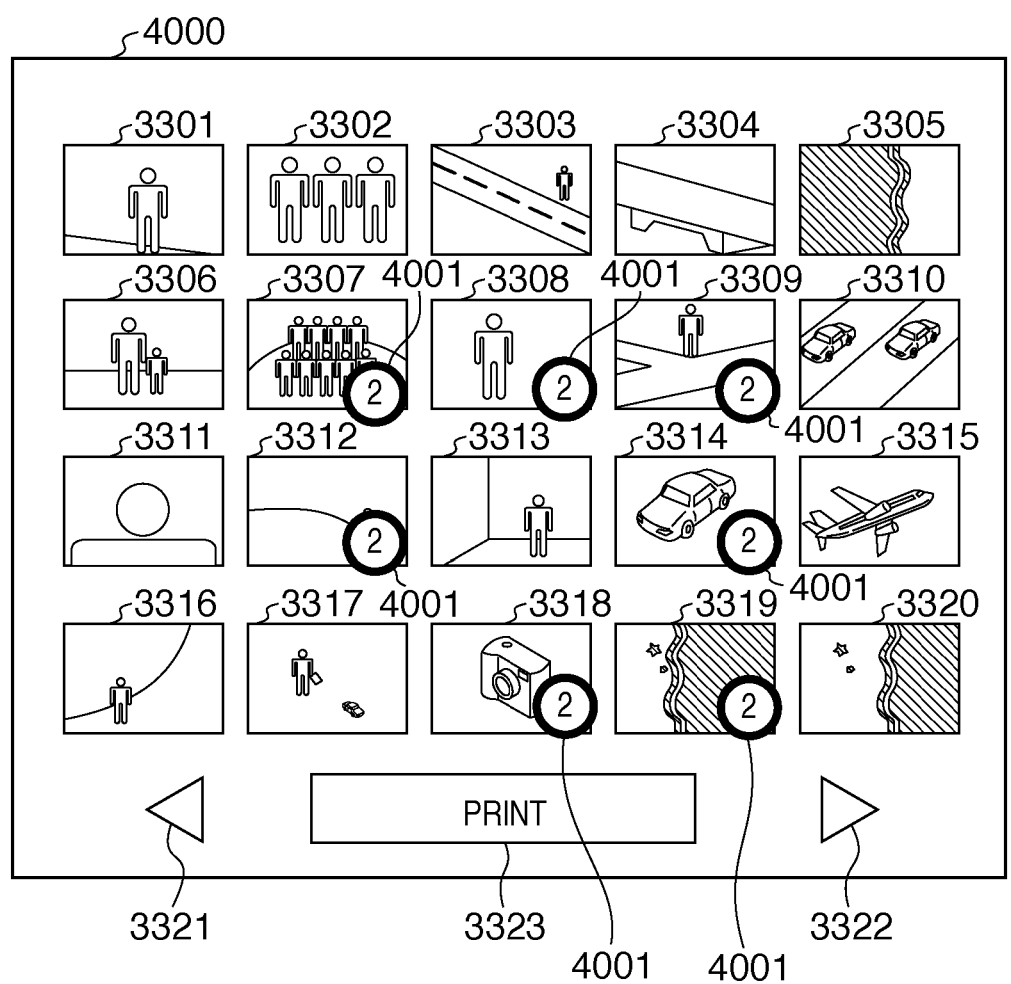
FIG. 31 is a fifth view showing an example of the image list window.

If it is determined in step S62 that the range locus is not defined by a closed curve or the process locus is not located inside the range locus (NO in S62), the object processing apparatus 30 advances to the process in step S64. The object processing apparatus 30 controls the processing target decision unit 34 in step S64 to determine if the process locus is input to intersect with the range locus. If the process locus intersects with the range locus (YES in S64), the object processing apparatus 30 controls the processing target decision unit 34 to store objects located on the range locus (first locus) in the data memory 25 as processing targets (S65). After that, the process advances to step S67, and this processing sequence ends. The process in step S65 will be described in detail below with reference to FIG. 30. FIG. 30 shows a state in which the user inputs a range locus 3901 and process locus 3902 to intersect with each other. In this case, image data 3307, 3308, 3309, 3312, 3314, 3318, and 3319, which contact the range locus 3901, are stored as target data, and the process for setting the number of print sheets to be "2" is executed for the target image data, thus setting the number of print sheets 4001, as shown in FIG. 31.

Figure 33:
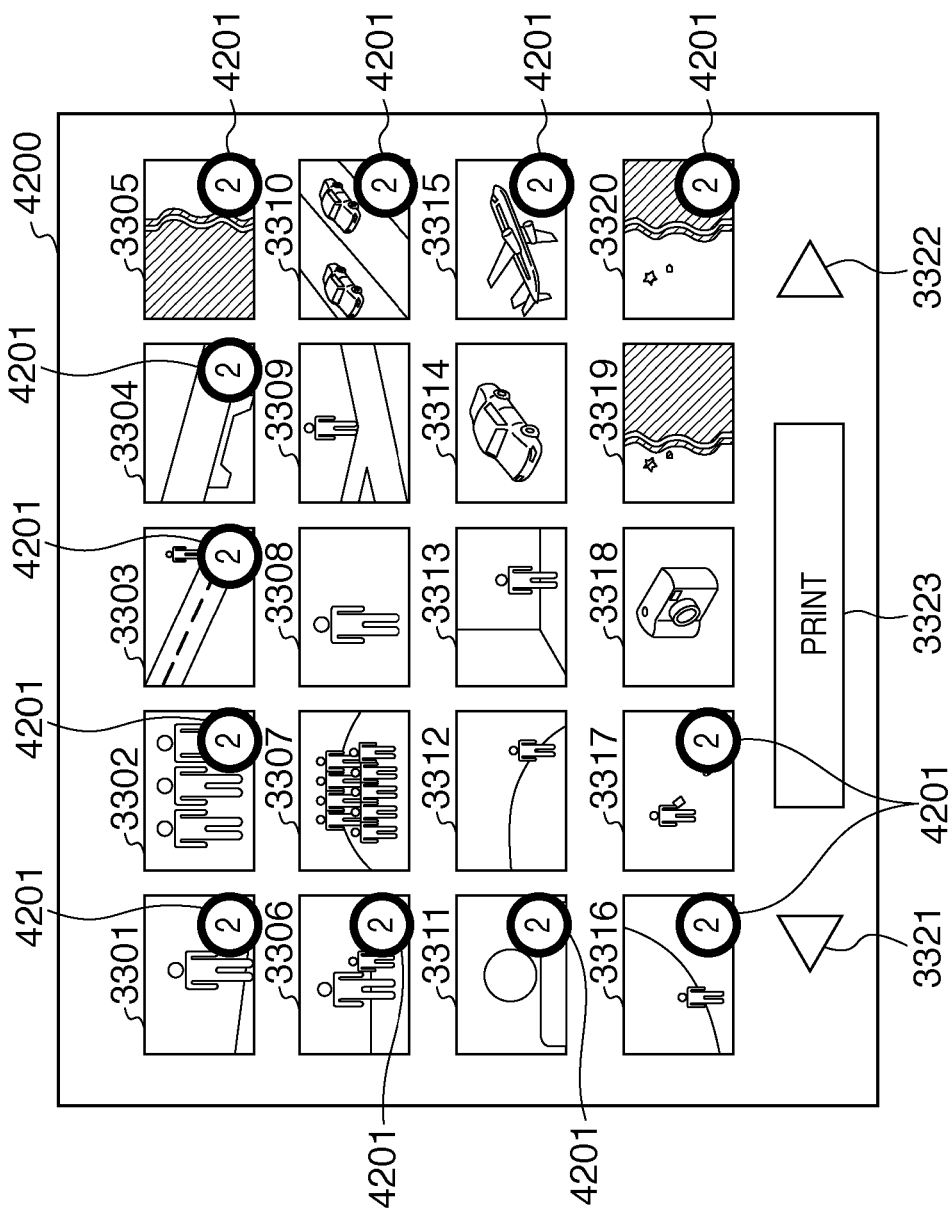
FIG. 33 is a seventh view showing an example of the image list window.

If it is determined in step S64 that the process locus is not located on the range locus (NO in S64), the object processing apparatus 30 advances to the process in step S66. More specifically, the object processing apparatus 30 controls the processing target decision unit 34 to define an area outside the range locus as a processing target area, and to store objects located in this area in the data memory 25 as processing targets (S66). After that, the process advances to step S67, and this processing sequence ends. The process in step S66 will be described in detail below with reference to FIG. 32. FIG. 32 shows a state in which the user inputs a process locus 4102 outside a range locus 4101. When the process locus is input outside the range locus, and when the range locus is defined by a closed curve, image data other than those enclosed by the range locus are selected as processing targets. When the range locus is not defined by a closed curve, image data which do not contact the range locus are selected as processing targets. In this case, image data 3301, 3302, 3303, 3304, 3305, 3306, 3310, 3311, 3315, 3316, 3317, and 3320, which are located outside the range locus 4101 drawn using a closed curve, are stored in the data memory 25 as processing targets. Then, the process for setting the number of print sheets to be "2" is executed for the target image data, thus setting the number of print sheets 4201, as shown in FIG. 33.

As described above, according to the sixth embodiment, when the user inputs a range instruction locus and a process instruction locus, objects as processing targets can be switched according to the positional relationship between the range instruction locus and process instruction locus.

Seventh Embodiment

The seventh embodiment will be described below. The aforementioned sixth embodiment has exemplified the case in which the first locus, that is, the range locus used to designate objects as processing targets has a closed curve shape. The seventh embodiment will explain a case in which the range locus has a check shape. Note that the arrangement of the apparatus and the sequence of the overall processing in the seventh embodiment are nearly the same as the sixth embodiment, and a description thereof will not be repeated. In this embodiment, only a difference will be mainly described. The difference lies in the locus acceptance process described using FIG. 26.

Figure 34:
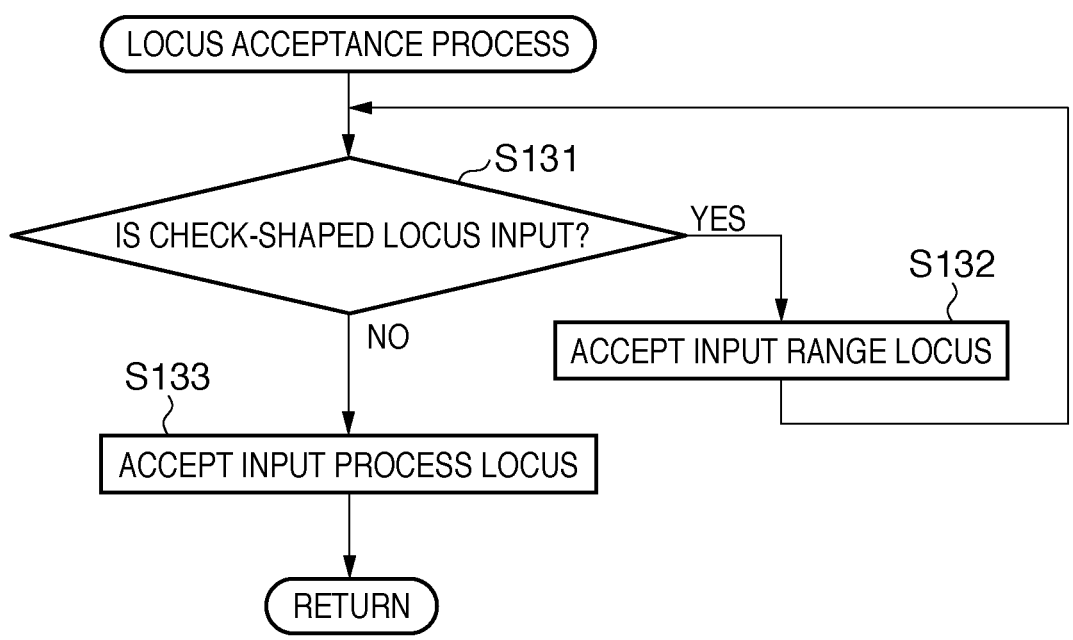
FIG. 34 is a flowchart showing an example of the sequence of a locus acceptance process according to the seventh embodiment.

An example of the sequence of the locus acceptance process according to the seventh embodiment will be described below with reference to FIG. 34. Note that this process is implemented when the CPU 23 executes, for example, a processing program stored in the program memory 24, as in the sixth embodiment.

The object processing apparatus 30 determines if the user inputs a check-shaped locus. If it is determined that the user inputs a check-shaped locus (YES in S131), the object processing apparatus 30 controls the range designation acceptance unit 31 to accept the input locus as a range locus (S132). Note that the shape of the locus accepted as the range locus may be another shape as long as a locus allows recognition of objects as processing targets.

Figure 35:
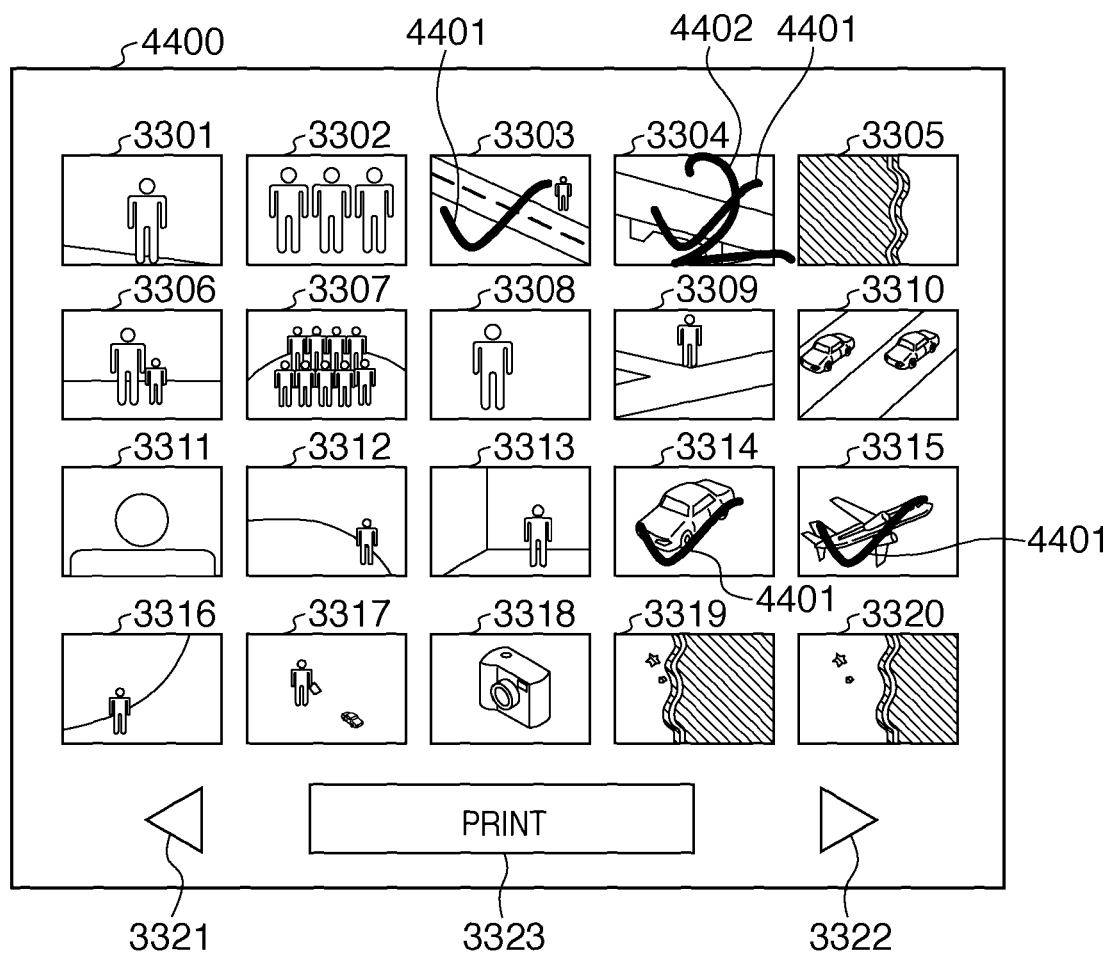
FIG. 35 is an eighth view showing an example of the image list window.
Figure 36:
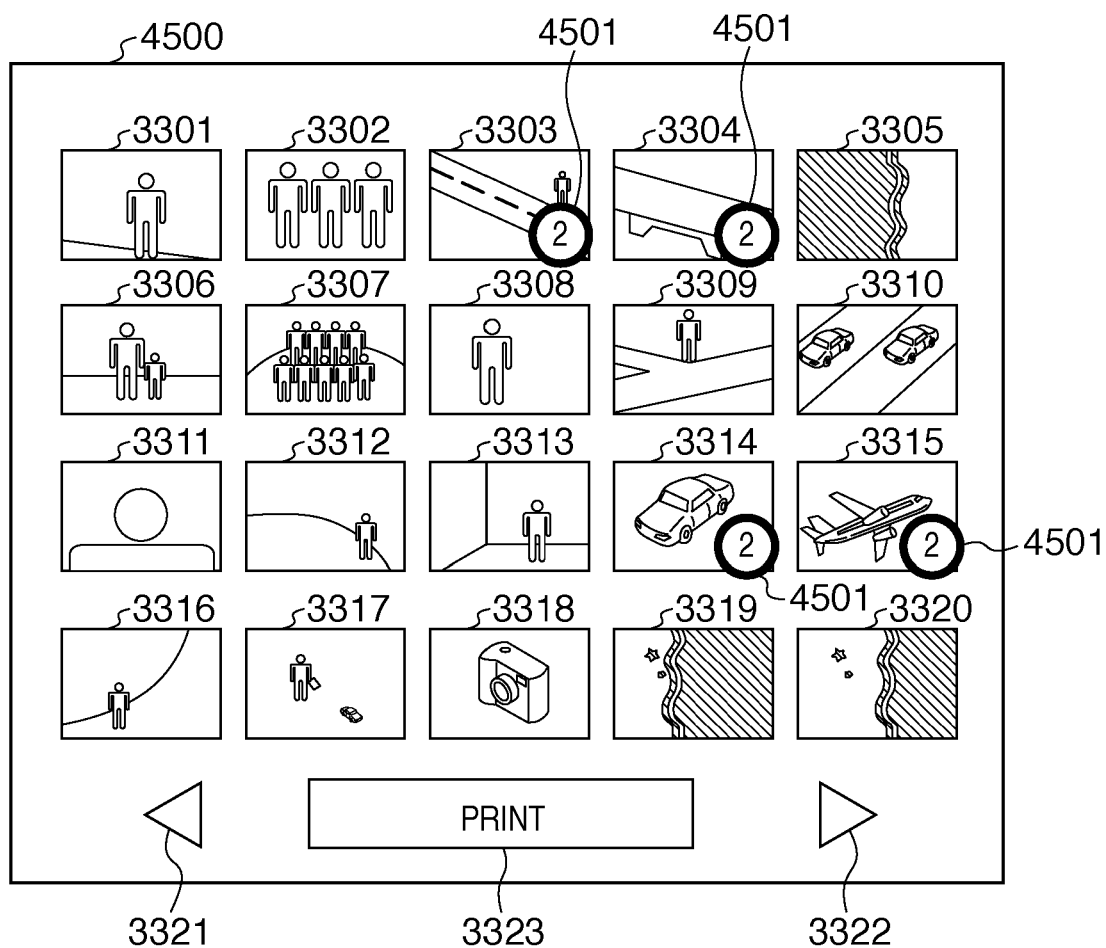
FIG. 36 is a ninth view showing an example of the image list window.

As a result of determination, if the input locus does not have a check shape (NO in S131), the object processing apparatus 30 controls the process designation acceptance unit 32 to accept the locus input on the window as a process locus (S133). A case will be exemplified below with reference to FIG. 35 wherein the user inputs range loci 4401 and a process locus 4402 with respect to image data displayed on an image list window. In FIG. 35, the user inputs the check-shaped loci 4401 as range loci on four image data 3303, 3304, 3314, and 3315, and the process loci 4402 to intersect with the check shape. In this case, these four image data are selected as processing targets. Also, since the process locus 4402 is that for designating to set the number of print sheets of image data to be "2", when that process is executed, the number of print sheets 4501 is set for the image data 3303, 3304, 3314, and 3315, as shown in FIG. 36.

Figure 37:
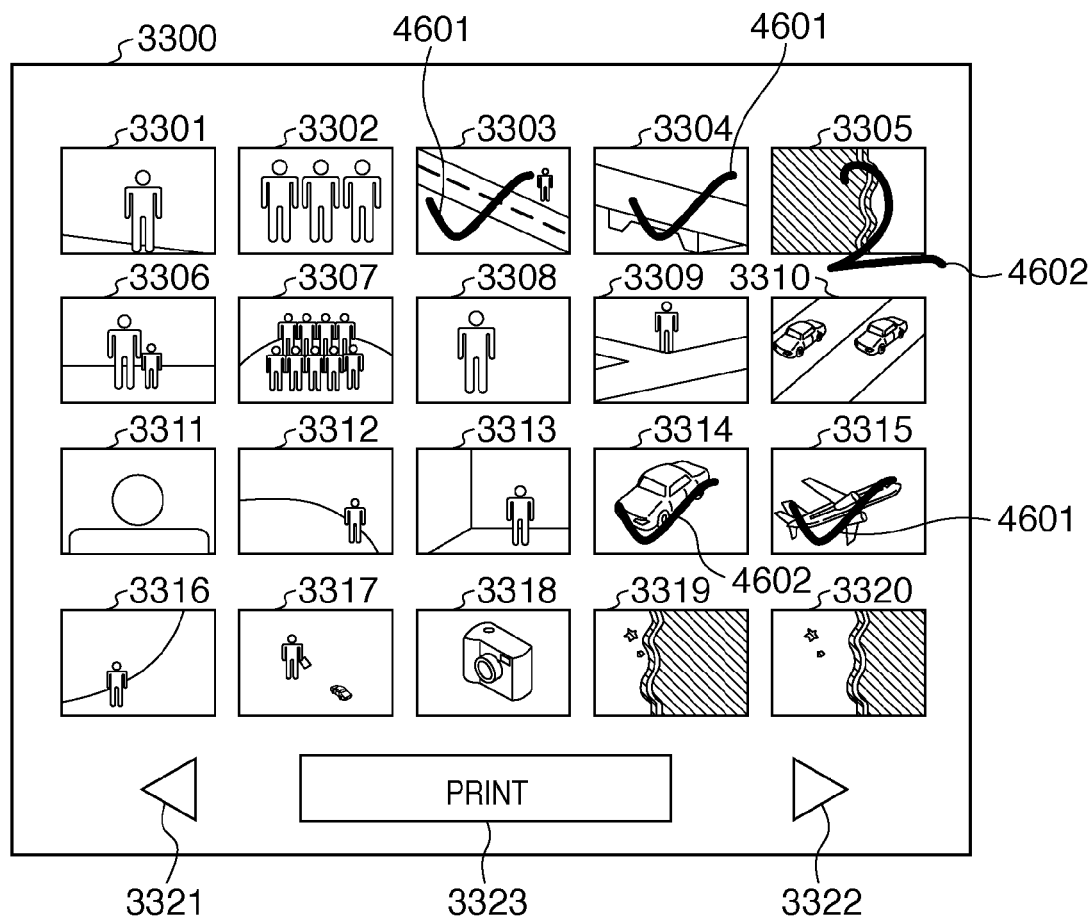
FIG. 37 is a tenth view showing an example of the image list window.
Figure 38:
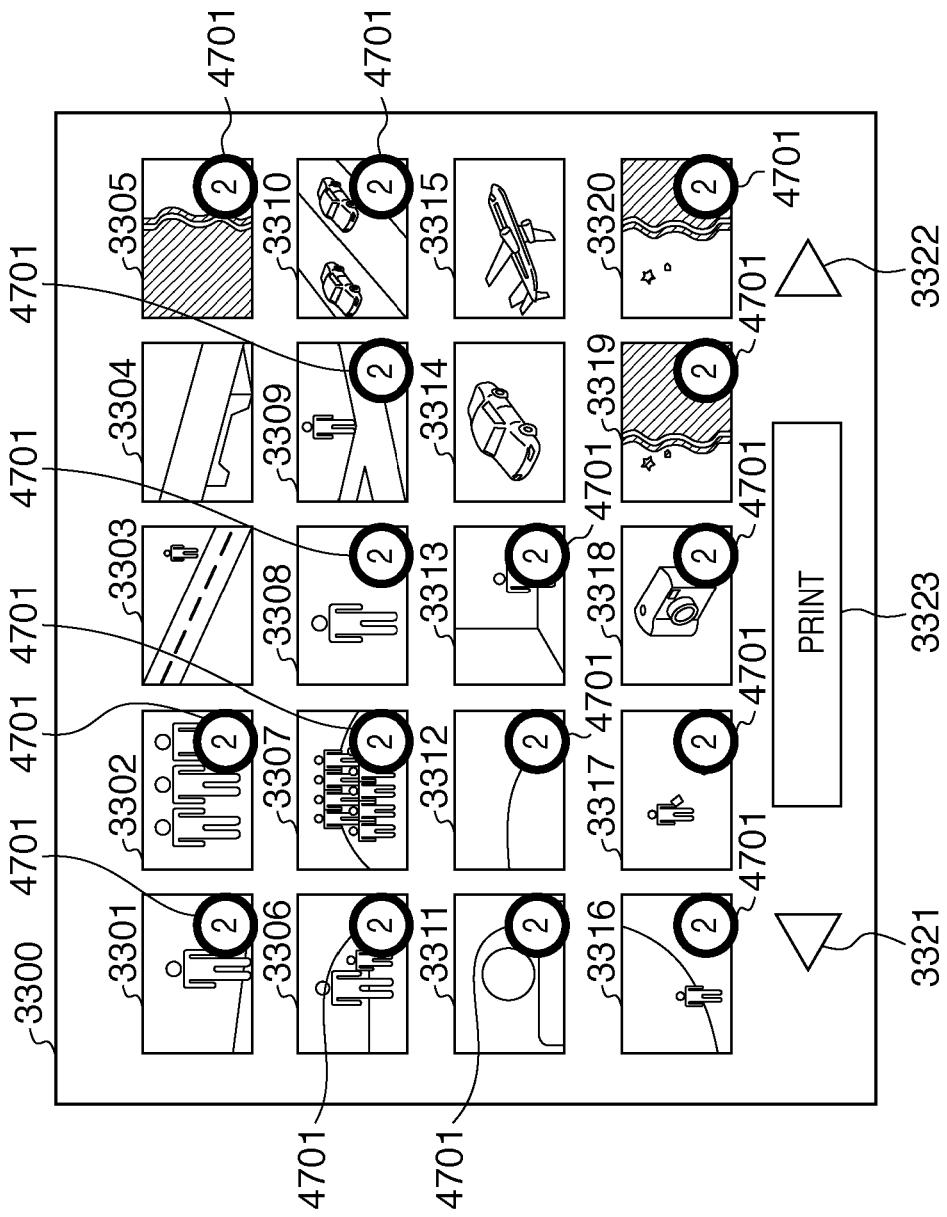
FIG. 38 is an eleventh view showing an example of the image list window.

FIG. 37 shows an example when the user inputs a process locus 4602 so as not to intersect with any of check-shaped loci 4601. In FIG. 37, the user inputs the check-shaped loci 4601 as the range loci on image data 3303, 3304, 3314, and 3315, and the process locus 4602 not to intersect with any check shape. In this case, image data other than those on these check-shaped loci (other than those on the first loci), that is, those which are located at positions that do not intersect with the check shapes, are selected as processing targets. More specifically, 16 image data 3301, 3302, 3305, 3306, 3307, 3308, 3309, 3310, 3311, 3312, 3313, 3316, 3317, 3318, 3319, and 3320 are selected as processing targets, and the number of print sheets of these image data is set to be "2", as shown in FIG. 38.

In the above description, check-shaped range loci are input to image data within a single page. However, not only image data within a single page but also image data on different pages may be designated as processing targets. When the user presses a place other than image data and buttons, or when the user inputs a locus that cannot be recognized as a range locus or process locus, the input locus may be canceled.

As described above, according to the seventh embodiment, when the user inputs a range instruction locus and process instruction locus, objects as processing targets can be switched according to the positional relationship between the range instruction locus and process instruction locus. Also, objects as processing targets can be designated over different pages.

Eighth Embodiment

The eighth embodiment will be described below. The eighth embodiment will explain a case in which process contents to be executed for objects as processing targets are switched based on a second locus (process locus) and the positional relationship between a first locus (range locus) and the second locus. Note that the arrangement of the apparatus and the sequence of the overall processing in the eighth embodiment are nearly the same as the sixth embodiment, and a description thereof will not be repeated. In this embodiment, only a difference will be mainly described. The difference lies in the process decision process described using FIG. 27.

Figure 39:
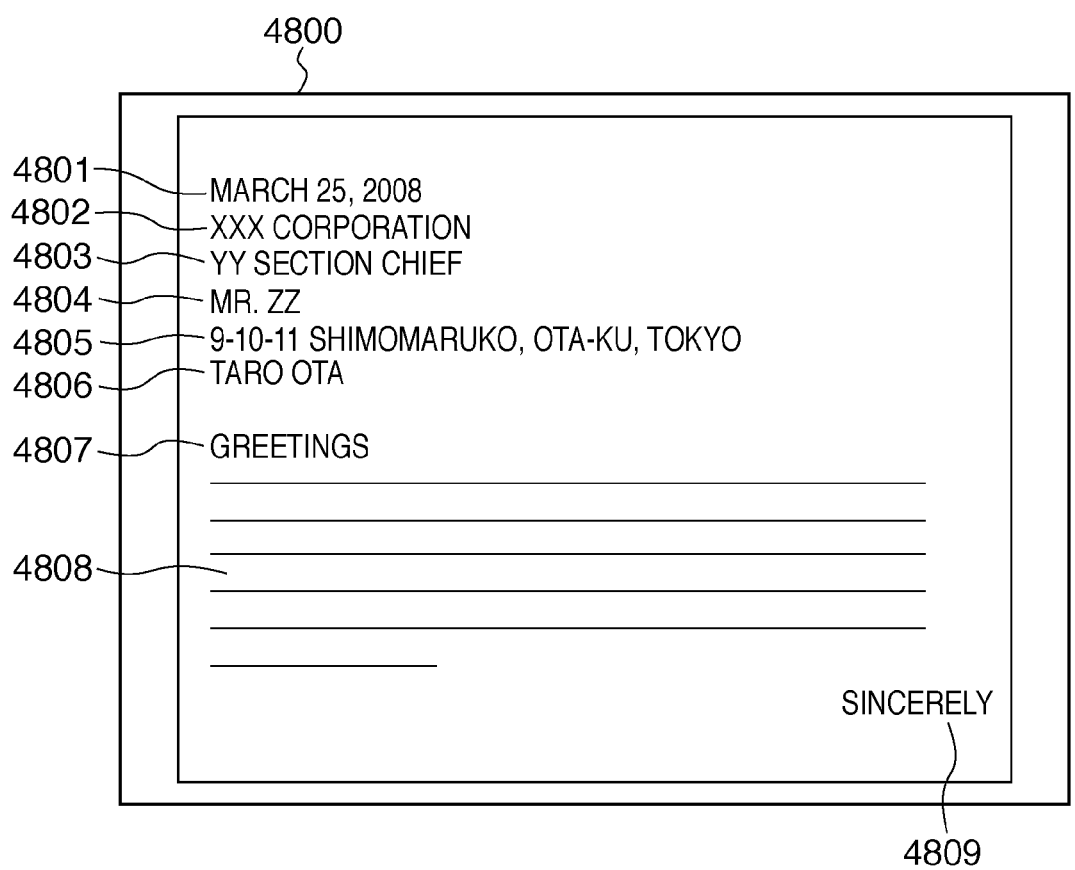
FIG. 39 is a first view showing an example of a document edit window.

FIG. 39 is a view showing an example of a window displayed on the display unit 22 of the object processing apparatus 30 according to the eighth embodiment. As an example of the window displayed on the display unit 22, a document edit window will be exemplified below.

Figure 40:
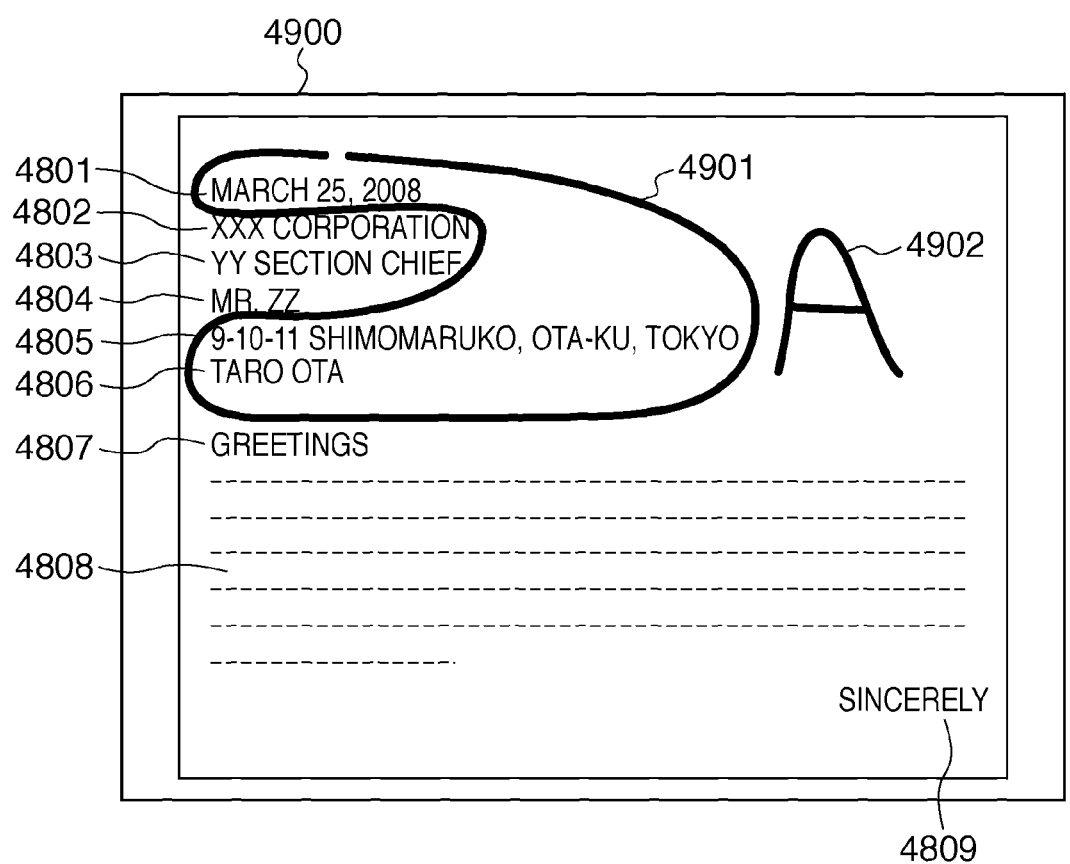
FIG. 40 is a second view showing an example of the document edit window.

A document edit window 4800 includes one or a plurality of editable text data 4801, 4802, . . . , 4809. This document edit window accepts a user's handwritten input to execute document edit and shaping operations. FIG. 40 shows a state in which the user inputs a range locus 4901 and process locus 4902 on the document edit window. The user inputs the range locus 4901 to enclose the text data 4801, 4805, and 4806, and the process locus 4902 in the right direction of the range locus.

Figure 41:
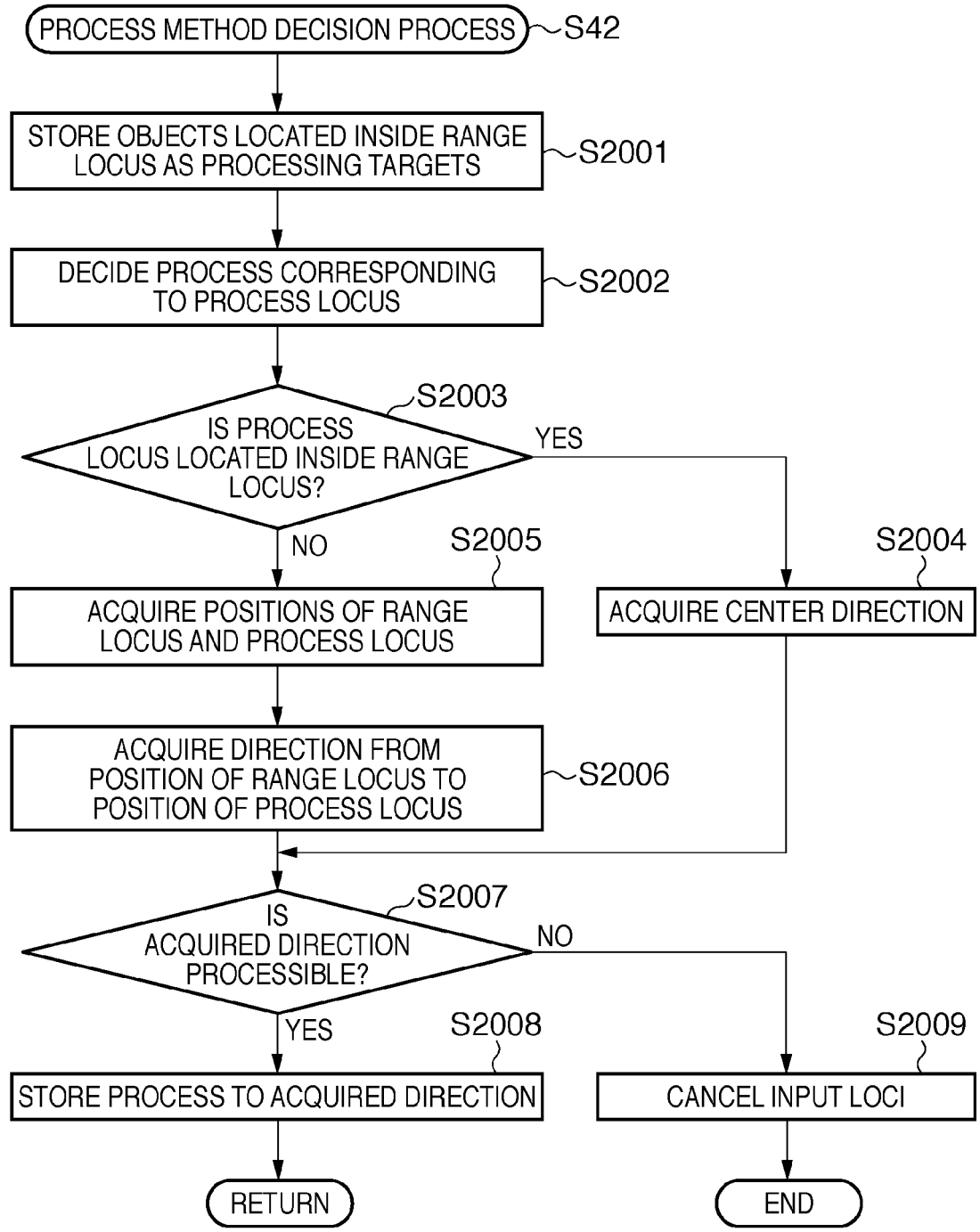
FIG. 41 is a flowchart showing an example of the sequence of a process decision process according to the eighth embodiment.

An example of the sequence of the process decision process according to the eighth embodiment will be described below with reference to FIG. 41. Note that this process is implemented when the CPU 23 executes, for example, a processing program stored in the program memory 24, as in the sixth embodiment.

After this process starts, the object processing apparatus 30 controls the processing target decision unit 34 to define an area inside the range locus as a processing target area and to store objects located within the area in the data memory 25 as processing targets (S2001). For example, when the user inputs the range locus 4901, as shown in FIG. 40, the text data 4801, 4805, and 4806 are stored as processing targets.

The object processing apparatus 30 controls the process content decision unit 35 to decide on a process corresponding to the process locus, and to store the decided process in the data memory 25 (S2002). For example, if the process corresponding to the process locus 4902 shown in FIG. 40 is alignment, an alignment process is stored in the data memory 25.

The object processing apparatus 30 controls the process content decision unit 35 to determine if the process locus is located inside the range locus. As a result of determination, if the process locus is located inside the range locus (YES in S2003), the object processing apparatus 30 controls the process content decision unit 35 to acquire a center direction as the alignment direction (S2004). Note that the alignment direction may be a direction from the center to outside or a direction including no direction component in addition to the center direction.

On the other hand, if the process locus is not located inside the range locus (NO in S2003), the object processing apparatus 30 controls the process content decision unit 35 to acquire the positional relationship between the range locus and process locus based on their positions (S2005). This positional relationship can be calculated using the central point of a minimum rectangle (to be referred to as a bounding box hereinafter) which bounds the loci. Note that one of vertices of the bounding box or an arbitrary coordinate point which defines the loci may be used in addition to the central point of the bounding box. Furthermore, the barycenters of the loci may be used. After that, the object processing apparatus 30 controls the process content decision unit 35 to acquire a direction from the position of the range locus to that of the process locus based on the acquired positions of the loci.

After acquisition of the direction, the object processing apparatus 30 controls the process content decision unit 35 to determine whether or not the acquired direction is a processable direction. That is, the process content decision unit 35 determines whether or not the acquired direction is a direction in which the alignment process can be executed. This determination is made based on the angle between the acquired direction and the processable direction. For example, when this angle is smaller than a threshold designated in advance, it is determined that the acquired direction is processable. Note that this threshold may be different values depending on processes and directions, or may be designated by the user. Furthermore, this threshold may be determined as a default.

As a result of determination, if the acquired direction is a processable direction (YES in S2007), the object processing apparatus 30 controls the process content decision unit 35 to store information indicating that the alignment process in the acquired direction is to be executed in the data memory 25 (S2008), thus ending this processing sequence. If the acquired direction is not a processable direction (NO in S2007), the object processing apparatus 30 controls the process content decision unit 35 to cancel the input loci (S2009), thus ending this processing sequence. For example, in case of FIG. 40, since a direction from the range locus 4901 to the process locus 4902 is the right direction, the alignment process is executed in the right direction.

FIG. 42 shows a list 2100 of alignment processes. This list 2100 is stored in, for example, the program memory 24 shown in FIG. 23.

Figure 43:
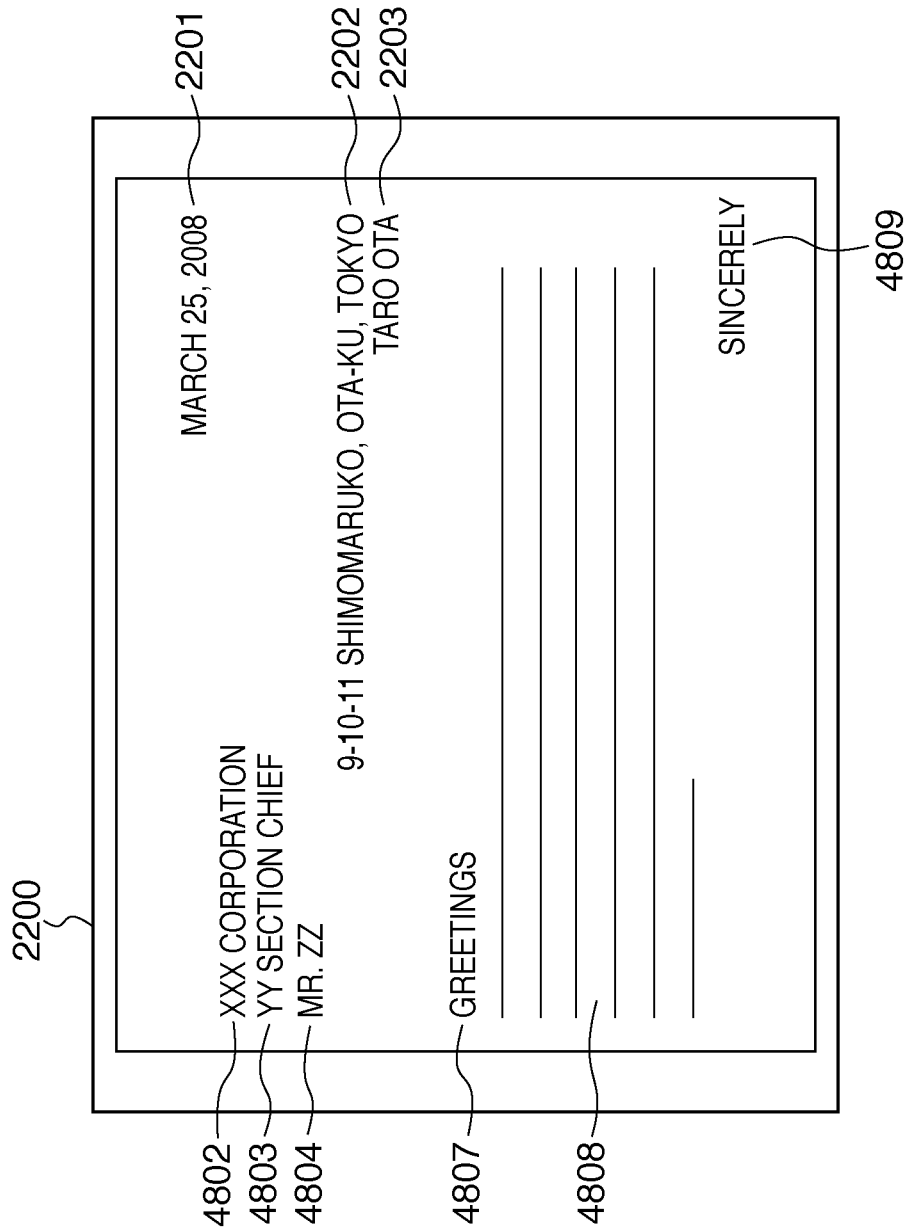
FIG. 43 is a third view showing an example of the document edit window.

A left column 2101 of the list indicates a direction in which the alignment process is applicable, and a right column 2105 indicates a process corresponding to each direction. In case of FIG. 40, since the process locus is input in the right direction with respect to the range locus, a right alignment process is executed for target data, and target data are right-aligned, as shown in FIG. 43. In this case, the text data 4801, 4805, and 4806 shown in FIG. 40 are designated as processing targets, and the right alignment process is executed for these processing targets. As a result, the text data are displayed at positions 2201, 2202, and 2203.

In the eighth embodiment, the right and left directions and center direction are directions of processes. In addition, upper and lower directions and oblique directions may be used. Also, the process may have one or more processable directions. The eighth embodiment has exemplified the case in which objects as processing targets are text data (i.e., character data). Of course, image data and the like may be used.

As descried above, according to the eighth embodiment, when the user inputs a range instruction locus and process instruction locus, the process contents can be switched according to the positional relationship between the range instruction locus and process instruction locus.

Ninth Embodiment

The ninth embodiment will be described below. Note that the arrangement of the apparatus and the sequence of the overall processing in the ninth embodiment are nearly the same as the sixth embodiment, and a description thereof will not be repeated. In this embodiment, only a difference will be mainly described. The difference lies in the locus acceptance process described using FIG. 26.

Figure 44:
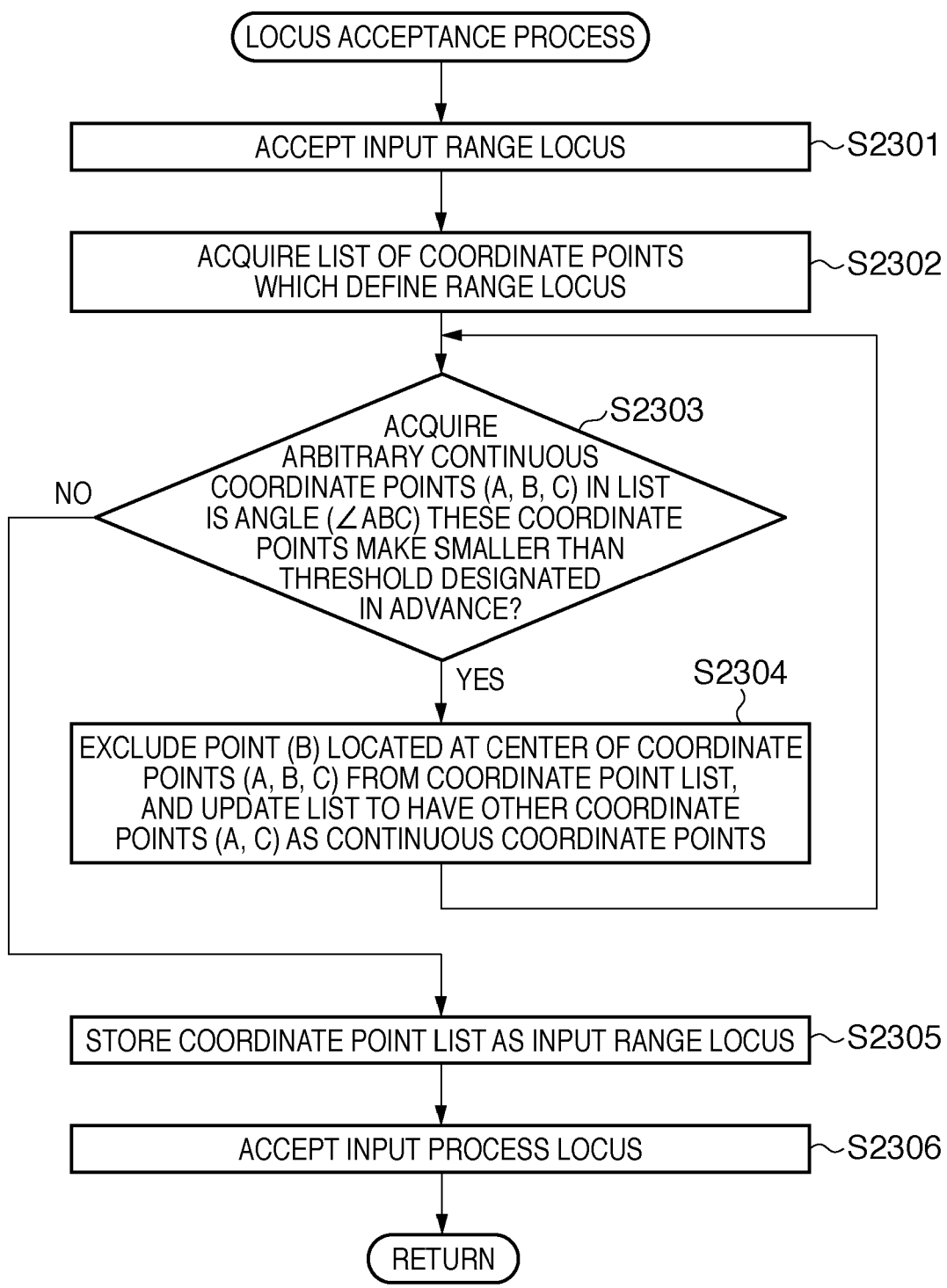
FIG. 44 is a flowchart showing an example of the sequence of a locus acceptance process according to the ninth embodiment.

An example of the sequence of the locus acceptance process according to the ninth embodiment will be described below with reference to FIG. 44. Note that this process is implemented when the CPU 23 executes, for example, a processing program stored in the program memory 24, as in the sixth embodiment.

Figure 45:
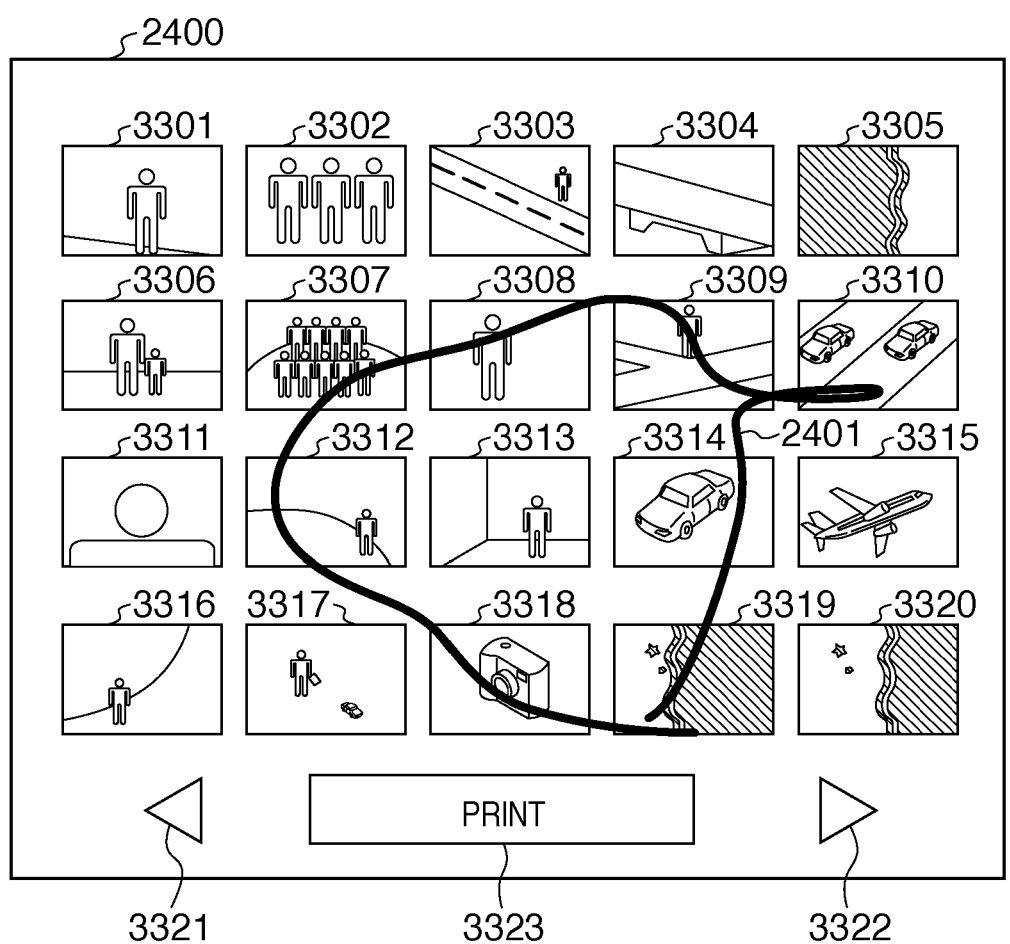
FIG. 45 is a twelfth view showing an example of the image list window.

After this process starts, the object processing apparatus 30 controls the range designation acceptance unit 31 to accept an input range locus (S2301). FIG. 45 shows a state in which the user inputs a range locus 2401 on an image list window. Since the user folds back the range locus 2401 to correct the locus, it is desirable to exclude this fold-back part from the range locus. Therefore, the process for canceling acceptance of the locus of this part will be described below.

The object processing apparatus 30 controls the range designation acceptance unit 31 to set coordinate points which define the locus on the range locus, and to acquire a list of the coordinate points (S2302). FIG. 46 shows a coordinate point list 2500 of the range locus 2401. This list is stored in, for example, the data memory 25 shown in FIG. 23. A left column 2501 of the list indicates a coordinate point which defines the range locus, and a central column 2502 and right column 2503 respectively indicate the X- and Y-coordinates of the coordinate point. Coordinate points P000 2504 to P161 2519 in the list are sorted in the input order.

The object processing apparatus 30 controls the range designation acceptance unit 31 to acquire arbitrary continuous coordinate points (for example, A, B, C) in the list, and to determine if an angle ($\angle ABC$) these coordinate points make is smaller than a threshold designated in advance. This process is executed for all coordinate points.

If arbitrary continuous coordinate points which make an angle smaller than the threshold designated in advance are detected (YES in S2303), the object processing apparatus 30 controls the range designation acceptance unit 31 to exclude a point located at the center of these arbitrary continuous coordinate points from the coordinate point list. Then, the object processing apparatus 30 controls the range designation acceptance unit 31 to update the list to have coordinate points located at the two ends of the excluded coordinate point as continuous points (S2304). That is, if the angle ($\angle ABC$) is smaller than the predetermined threshold, a coordinate point B located at the center of coordinate points A, B, and C is excluded from the list, and the coordinate points A and C are defined as continuous points. The process for excluding a coordinate point may use mathematical formulas shown in, for example, FIG. 47. Letting w.x and w.y be the x- and y-coordinates of a coordinate point w, formulas 2601 and 2602 are used to calculate the x and y components of a vector V1 from the coordinate point B to the coordinate point A. Formulas 2603 and 2604 are used to calculate a vector v2 from the coordinate point B to the coordinate point C. Formula 2605 is used to evaluate the angle of the coordinate points A, B, and C based on the values of the two vectors. A value $\Delta e$ is a threshold designated in advance. Since a value obtained by calculating the right-hand side of formula 2605 is proportional to the angle $\angle ABC$, it is determined that the angle $\angle ABC$ is equal to or smaller than a specific angle.

For example, when $\Delta e=0.2$ is set, and the aforementioned formulas are applied to all combinations of three continuous coordinate points in the coordinate point list 2500, formula 2605 holds when the continuous coordinate points are coordinate points P106, P107, and P108. For this reason, the coordinate point P107 2512 is excluded from the list. By executing the process until no coordinate point meets this formula, five coordinate points P105 2510, P106 2511, P107 2512, P108 2513, and P109 2514 are excluded from the list 2500.

The object processing apparatus 30 controls the range designation acceptance unit 31 to store the coordinate point list 2500 in the data memory 25 as the range locus (S2305). After that, the object processing apparatus 30 controls the process designation acceptance unit 32 to accept a process locus (S2306), thus ending this processing sequence.

A locus before and after coordinate points are excluded will be described below with reference to FIGS. 48 and 49. This locus is obtained by partially enlarging the range locus 2401 input on the image list window shown in FIG. 45. Round points in the locus enlarged view (FIGS. 48 and 49) indicate coordinate points which define a locus.

Figure 48:
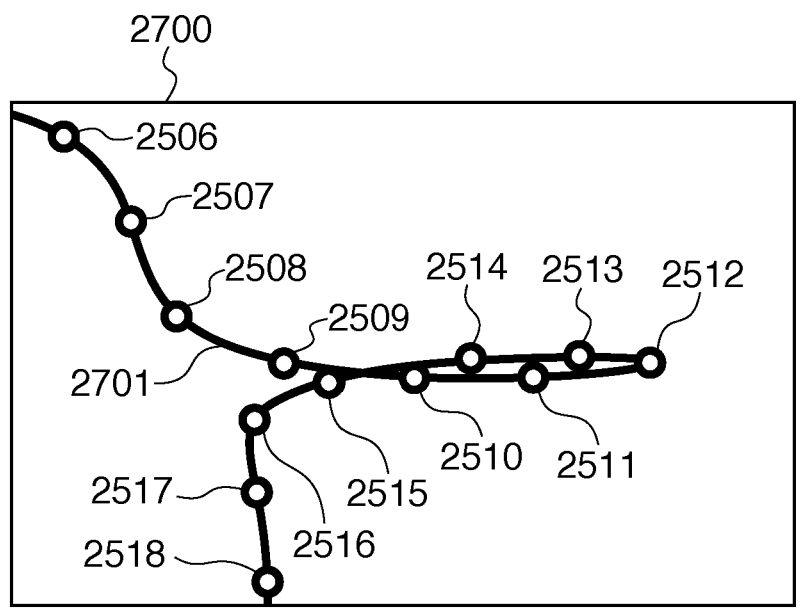
FIG. 48 is a first view showing an example of an overview of processing according to the ninth embodiment.
Figure 49:
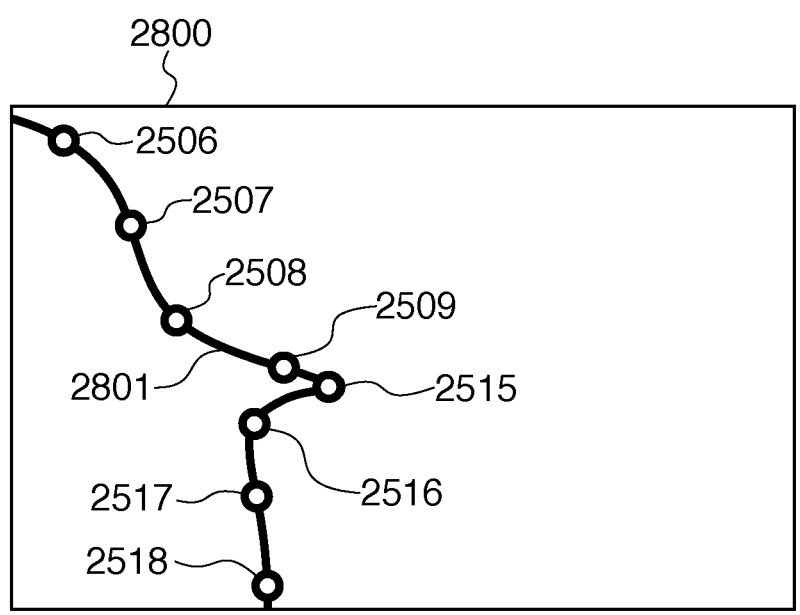
FIG. 49 is a second view showing an example of the overview of processing according to the ninth embodiment.

In a locus 2801 shown in FIG. 49, a fold-back locus corrected by the user is removed from a locus 2701 shown in FIG. 48. As three coordinate points, points which are obtained by selecting every third points from the coordinate point list or those which are separated by three or more points may be selected.

A comparison criterion other than the angle may be used. For example, the curvature of a locus may be used. Furthermore, other methods may be used as long as they can determine whether or not a locus is folded back. Correction of a locus may be done not only at the drawing end timing of a range locus but also during drawing of a range locus.

As described above, according to the ninth embodiment, when the user inputs a range instruction locus and process instruction locus, objects as processing targets can be switched according to the positional relationship between the range instruction locus and process instruction locus. Also, the range instruction locus can be corrected.

The typical embodiments of the present invention have been exemplified. However, the present invention is not limited to the aforementioned and illustrated embodiments, and various modifications may be made without departing from the scope of the invention. For example, some or all of the aforementioned first to ninth embodiments may be combined when they are practiced.

Note that the present invention may adopt, for example, embodiments as a system, apparatus, method, program, or computer-readable storage medium. More specifically, the present invention may be applied to either a system including a plurality of devices or an apparatus including a single device.

According to the present invention, the operability upon making various operations based on input coordinates can be improved. Then, the number of operation steps and an operation time required for the user at the time of coordinate input operations can be reduced.

Also, according to the present invention, respective processes can be executed in consideration of the positional relationship between the range instruction locus and process instruction locus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-297094, filed on Nov. 20, 2008 and 2008-297096, filed on Nov. 20, 2008, which are hereby incorporated by reference herein in their entirety.

What is claimed is:

1. An information processing apparatus comprising:
    an input unit configured to input a coordinate value of a position designated on a screen which displays one or a plurality of objects;
    a determination unit configured to compare an input locus expressed by a coordinate value string input by the input unit, and a second locus which is defined in advance as a locus used to instruct to execute a process for the object, and to determine whether the input locus is a first locus or the second locus;
    a selection unit configured to select, when the determination unit determines that the input locus is the first locus, object from the one or plurality of objects based on display positions of the input locus and the object on the screen; and
    an execution unit configured to execute, when the determination unit determines that the input locus is the second locus, a process designated by the input locus with respect to the object selected by the selection unit,
    wherein when a plurality of input loci determined as the first loci are input, the selection unit selects objects with regard to respective ones of the plurality of input loci, and
    the execution unit groups the objects selected by the plurality of input loci determined as the first loci for respective input loci having similar shapes, and selectively executes a process designated by the input locus determined as the second locus for respective grouped objects.

2. The apparatus according to claim 1, wherein the selection unit selects objects which intersect with the input locus on the screen, and
    the execution unit executes the process in turn from an object which intersects with the input locus earlier when the input locus determined as the first locus is input.

3. The apparatus according to claim 1, wherein when the determination unit cannot determine whether or not the input locus is the second locus, the determination unit inquires a user about designation of the first locus or the second locus.

4. The apparatus according to claim 1, wherein the execution unit assigns metadata to respective objects selected by the grouped input loci.

5. The apparatus according to claim 1, wherein when the input locus is not the second locus, the determination unit compares the input locus with a third locus which is defined in advance as a locus used to instruct to cancel selection of objects by the selection unit, and determines whether the input locus is the first locus or the third locus, and
    when the determination unit determines that the input locus is the third locus, the selection unit cancels selection of objects based on the input locus.

6. The apparatus according to claim 1, further comprising a presentation processing unit configured to present a result of the process by the execution unit to a user.

7. A processing method for an information processing apparatus, comprising:

inputting a coordinate value of a position designated on a screen which displays one or a plurality of objects;

comparing an input locus expressed by a coordinate value string input in the inputting, and a second locus which is defined in advance as a locus used to instruct to execute a process for the object, and determining whether the input locus is a first locus or the second locus;

selecting, when it is determined in the determining that the input locus is the first locus, object from the one or plurality of objects based on display positions of the input locus and the object on the screen; and executing, when it is determined in the determining that the input locus is the second locus, a process designated by the input locus with respect to the object selected in the selecting, wherein when a plurality of input loci determined as the first loci are input, the selecting step selects objects with regard to respective ones of the plurality of input loci, and the executing step groups the objects selected by the plurality of input loci determined as the first loci for respective input loci having similar shapes, and selectively executes a process designated by the input locus determined as the second locus for respective grouped objects.

8. A computer-readable storage medium storing a computer program for making a computer function as:

an input unit configured to input a coordinate value of a position designated on a screen which displays one or a plurality of objects;

a determination unit configured to compare an input locus expressed by a coordinate value string input by the input unit, and a second locus which is defined in advance as a locus used to instruct to execute a process for the object, and to determine whether the input locus is a first locus or the second locus;

a selection unit configured to select, when the determination unit determines that the input locus is the first locus, object from the one or plurality of objects based on display positions of the input locus and the object on the screen; and an execution unit configured to execute, when the determination unit determines that the input locus is the second locus, a process designated by the input locus with respect to the object selected by the selection unit, wherein when a plurality of input loci determined as the first loci are input, the selection unit selects objects with regard to respective ones of the plurality of input loci, and the execution unit groups the objects selected by the plurality of input loci determined as the first loci for respective input loci having similar shapes, and selectively executes a process designated by the input locus determined as the second locus for respective grouped objects.

9. An information processing apparatus having an input unit configured to input coordinates, comprising:

a first acceptance unit configured to accept, as a target locus, a locus of coordinates input via the input unit so as to designate an object as a processing target from objects displayed on a screen;

a second acceptance unit configured to accept, as a process locus, a locus of coordinates input via the input unit so as to designate process contents to be executed for the object as the processing target;

a positional relationship determination unit configured to determine a positional relationship between the target locus and the process locus;

a processing target decision unit configured to decide objects as processing targets based on the target locus, and the positional relationship determined by the positional relationship determination unit; and an execution unit configured to execute a process based on the process contents accepted by the second acceptance unit with respect to the objects as the processing targets decided by the processing target decision unit, wherein the target locus has a closed curve shape, and when the process locus is located entirely within the target locus, the processing target decision unit defines the entire area inside the target locus as a processing target area, and decides all objects located entirely or partially within the processing target area as the processing targets.

10. The apparatus according to claim 9, wherein the target locus has a closed curve shape, and when the process locus is located on the target locus, the processing target decision unit defines an area on the target locus as a processing target area, and decides objects located on the processing target area as the processing targets.

11. The apparatus according to claim 9, wherein the target locus has a closed curve shape, and when the process locus is located outside the target locus, the processing target decision unit defines an area outside the target locus as a processing target area, and decides objects located within the processing target area as the processing targets.

12. The apparatus according to claim 9, wherein the target locus has a closed curve shape, and the first acceptance unit sets a plurality of coordinate points on the target locus, and when an angle a plurality of continuous coordinate points make is smaller than a predetermined threshold, the first acceptance unit excludes a coordinate point located at a center of the plurality of continuous coordinate points from the target locus.

13. A processing method for an information processing apparatus having an input unit configured to input coordinates, comprising:

accepting, as a target locus, a locus of coordinates input via the input unit so as to designate an object as a processing target from objects displayed on a screen;

accepting, as a process locus, a locus of coordinates input via the input unit so as to designate process contents to be executed for the object as the processing target;

determining a positional relationship between the target locus and the process locus;

deciding objects as processing targets based on the target locus, and the positional relationship determined in the determining; and executing a process based on the process contents accepted in the accepting the process locus with respect to the objects as the processing targets decided in the deciding the processing target, wherein the target locus has a closed curve shape, and when the process locus is located entirely within the target locus, the deciding step defines the entire area inside the target locus as a processing target area, and decides all objects located entirely or partially within the processing target area as the processing targets.

14. A computer-readable storage medium storing a computer program for making a computer incorporated in an information processing apparatus, which has an input unit configured to input coordinates, function as:
- a first acceptance unit configured to accept, as a target locus, a locus of coordinates input via the input unit so as to designate an object as a processing target from objects displayed on a screen;
- a second acceptance unit configured to accept, as a process locus, a locus of coordinates input via the input unit so as to designate process contents to be executed for the object as the processing target;
- a positional relationship determination unit configured to determine a positional relationship between the target locus and the process locus;
- a processing target decision unit configured to decide objects as processing targets based on the target locus, and the positional relationship determined by the positional relationship determination unit; and
- an execution unit configured to execute a process based on the process contents accepted by the second acceptance unit with respect to the objects as the processing targets decided by the processing target decision unit, wherein the target locus has a closed curve shape, and
when the process locus is located entirely within the target locus, the processing target decision unit defines the entire area inside the target locus as a processing target area, and decides all objects located entirely or partially within the processing target area as the processing targets.

* * * * *